(12) United States Patent
Shiono et al.

(10) Patent No.: US 9,053,714 B2
(45) Date of Patent: Jun. 9, 2015

(54) INFORMATION RECORDING MEDIUM INCLUDING A FIRST RESONANCE ENHANCING FILM AND RECORDING LAYER, INFORMATION DEVICE, AND METHOD FOR PRODUCING INFORMATION RECORDING MEDIUM

(75) Inventors: Teruhiro Shiono, Osaka (JP); Noboru Yamada, Osaka (JP); Keiichi Matsuzaki, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/131,542

(22) PCT Filed: Aug. 7, 2012

(86) PCT No.: PCT/JP2012/005011
§ 371 (c)(1),
(2), (4) Date: Jan. 8, 2014

(87) PCT Pub. No.: WO2013/021625
PCT Pub. Date: Feb. 14, 2013

(65) Prior Publication Data
US 2014/0160914 A1 Jun. 12, 2014

(30) Foreign Application Priority Data

Aug. 9, 2011 (JP) .................. 2011-173919
Jan. 11, 2012 (JP) .................. 2012-003400
Apr. 18, 2012 (JP) .................. 2012-094814

(51) Int. Cl.
*G11B 7/24035* (2013.01)
*G11B 7/24065* (2013.01)
(Continued)

(52) U.S. Cl.
CPC ............. *G11B 7/24035* (2013.01); *Y10T 29/49* (2015.01); *G11B 7/24065* (2013.01); *G11B 7/1387* (2013.01); *G11B 7/26* (2013.01); *G11B 7/266* (2013.01)

(58) Field of Classification Search
None
See application file for complete search history.

(56) References Cited

U.S. PATENT DOCUMENTS

2003/0228462 A1* 12/2003 Chen .......................... 428/336
2004/0219455 A1* 11/2004 Tseng et al. ............. 430/270.11
(Continued)

FOREIGN PATENT DOCUMENTS

JP       2002063722 A  *  2/2002  ........... G11B 7/0045
JP       2004-213702       7/2004
(Continued)

OTHER PUBLICATIONS

International Search Report issued Oct. 2, 2012 in International (PCT) Application No. PCT/JP2012/005011.

*Primary Examiner* — Wayne Young
*Assistant Examiner* — Mark Fischer
(74) *Attorney, Agent, or Firm* — Wenderoth, Lind & Ponack, L.L.P.

(57) ABSTRACT

An information device is an information device that records information on or reproduces information from an information recording medium (3). The information device includes a light source (14) and a near-field light generating element (9) including a resonating section (22) configured such that plasmon resonance occurs between the resonating section (22) and a recording region (4). The resonating section (22) causes the plasmon resonance when emission light from the light source is irradiated on the near-field light generating element (9). A resonance enhancing film enhances the plasmon resonance between the resonating section (22) and the recording region (4). The resonating section (22) generates near-field light and irradiates the near-field light on the recording region (4) from a recording layer side.

16 Claims, 19 Drawing Sheets

(51) Int. Cl.
*G11B 7/1387* (2012.01)
*G11B 7/26* (2006.01)

(56) References Cited

U.S. PATENT DOCUMENTS

2005/0007894 A1  1/2005  Hasegawa
2009/0161499 A1  6/2009  Aikoh et al.
2009/0207703 A1* 8/2009  Matsumoto et al. ....... 369/13.33
2009/0310446 A1* 12/2009 Nakaoki et al. ............ 369/13.02
2012/0020199 A1  1/2012  Hisada et al.
2012/0113772 A1  5/2012  Shiono et al.

FOREIGN PATENT DOCUMENTS

| WO | 03/073420    | 9/2003  |
| WO | 2007/111304  | 10/2007 |
| WO | 2010/116707  | 10/2010 |
| WO | 2011/010447  | 1/2011  |

\* cited by examiner

INFORMATION RECORDING MEDIUM INCLUDING A FIRST RESONANCE ENHANCING FILM AND RECORDING LAYER, INFORMATION DEVICE, AND METHOD FOR PRODUCING INFORMATION RECORDING MEDIUM

TECHNICAL FIELD

The present invention relates to an information recording medium, an information device, and a method for producing an information recording medium and, more particularly, to an information recording medium that records information satisfactorily and at high density using near-field light, an information device that records information on or reproduces information from the information recording medium, and a method for producing the information recording medium.

BACKGROUND ART

As an information device that optically records and/or reproduces information, an optical memory system in which an optical disk such as a CD (compact disc), a DVD, or a BD (Blu-Ray disc), an optical card, or the like is used as an information recording medium is put to practical use.

In order to realize a further increase in a recorded information amount, there have been proposed an information device that performs high-density optical recording using near-field light capable of realizing a very small spot equal to or smaller than a diffraction limit of light and an information recording medium used in the information device. For example, an information recording medium disclosed in Patent Document 1 is proposed. A conventional information device in which such an information recording medium is used is explained below.

FIG. 33 is a perspective view showing a near-field light generation element and the information recording medium of the conventional information device. In a conventional information recording medium 103 shown in FIG. 33, a plurality of recording regions 104 having a size (about 3 to 30 nm) sufficiently smaller than the wavelength of recording light 105 are regularly arrayed two-dimensionally on a substrate 101. The recording regions 104 are configured from a phase change recording material such as GeTe—$Sb_2Te_3$. Note that array periods of the recording regions 104 in the X direction and the Y direction in the figure are respectively indicated by Λx and Λy, the height of the recording regions 104 is indicated by h, the size (the width) of the recording regions 104 in the Y direction is indicated by w, and an interval between the recording regions 104 is indicated by s. Λx, Λy, w, and s are sizes equal to or smaller than the diffraction limit of light and sufficiently smaller than a recording wavelength, and Λy=w+s.

In a near-field light generating element 109, a triangular metal film is arranged in parallel to an arrangement surface (the XY plane) of the recording regions 104 such that the longitudinal direction thereof is set as the Y direction and is arranged close to the recording regions 104 such that a working distance WD is about several tens nm from the arrangement surface.

Recording light 105 of linearly polarized light in the Y direction (a polarization direction 108), in which plasmon resonance tends to occur, is irradiated on the near-field light generating element 109. As a result, surface plasmon resonance is induced in the metal film of the near-field light generating element 109. Near-field light (near-field light having a polarization direction parallel to the polarization direction 108) with electric field intensity greatly increased compared with incident light is generated from a distal end portion (near the vertex of the triangular shape) of the near-field light generating element 109 (the near-field light is not shown in the figure).

The generated near-field light is irradiated on the recording region 104 arranged near the distal end portion, whereby the recording region 104 changes in a phase (from crystal to amorphous or from amorphous to crystal). Information can be recorded with one recording region set as a minimum unit.

However, the conventional information device explained above has a problem in that, when the recording regions 104 of the information recording medium 103 are further increased in density, information cannot be satisfactorily recorded.

Patent Document 1: WO 2010/116707

SUMMARY OF THE INVENTION

It is an object of the present invention to provide an information recording medium and an information device that can satisfactorily record information in recording regions arrayed at high density using near-field light, and a method for producing the information recording medium.

An information recording medium according to an aspect of the present invention comprises: a substrate; a recording layer which includes recording regions including a recording material and arrayed in an island shape; and a first resonance enhancing film formed between the substrate and the recording layer and configured to enhance plasmon resonance, wherein the first resonance enhancing film includes a material having a dielectric constant with a real part of which sign is negative.

An information device according to another aspect of the present invention is an information device that records information on or reproduces information from the information recording medium, the information device comprising: a light source; and a near-field light generating element including a resonating section configured such that plasmon resonance occurs between the resonating section and the recording region, wherein the resonating section causes the plasmon resonance when emission light from the light source is irradiated on the near-field light generating element, the first resonance enhancing film enhances the plasmon resonance between the resonating section and the recording region, and the resonating section generates near-field light and irradiates the near-field light on the recording region from the recording layer side.

A method for producing an information recording medium according to still another aspect of the present invention is a method for producing an information recording medium including a substrate, the method comprising: a step of forming a recording layer which includes recording regions including a recording material and arrayed in an island shape; and a step of forming, between the substrate and the recording layer, a first resonance enhancing film that includes a material having a dielectric constant with a real part of which sign is negative, and is configured to enhance plasmon resonance.

With the configuration explained above, it is possible to satisfactorily record, using near-field light, information in recording regions arrayed at high density.

Objects, characteristics, and advantages of the present invention are made more obvious by the following detailed explanation and the accompanying drawings.

BEST MODE FOR CARRYING OUT THE INVENTION

Embodiments of the present invention are explained below with reference to the drawings. Note that the embodiments explained below are embodied examples of the present invention and do not limit the technical scope of the present invention.

(First Embodiment)

First, an information device and an information recording medium in a first embodiment of the present invention are explained in detail with reference to FIGS. 1 to 9 with a coordinate system defined as shown in the figures.

Figure 1:
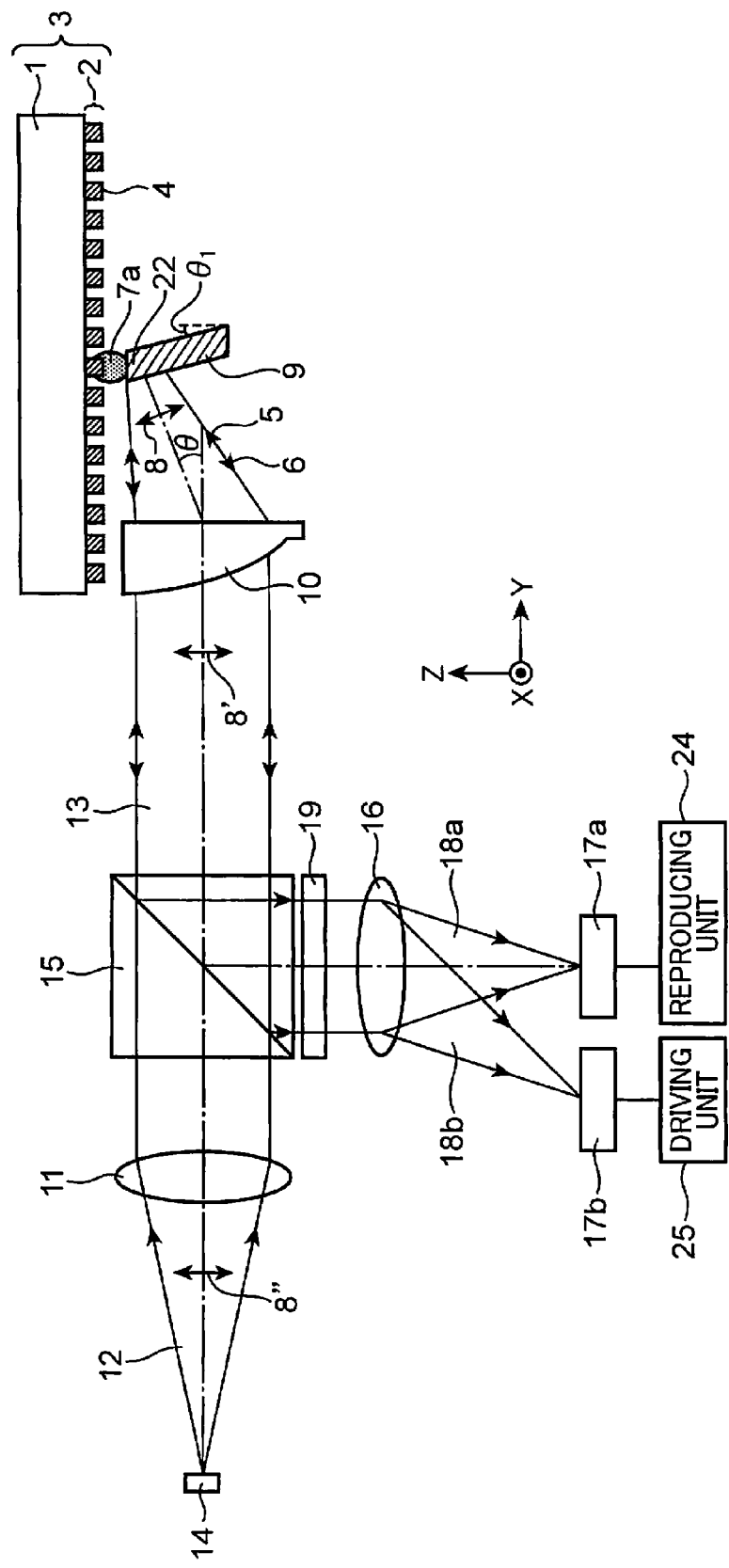
FIG. 1 is a schematic diagram showing the configurations of an information device and an information recording medium in a first embodiment of the present invention.
Figure 2:
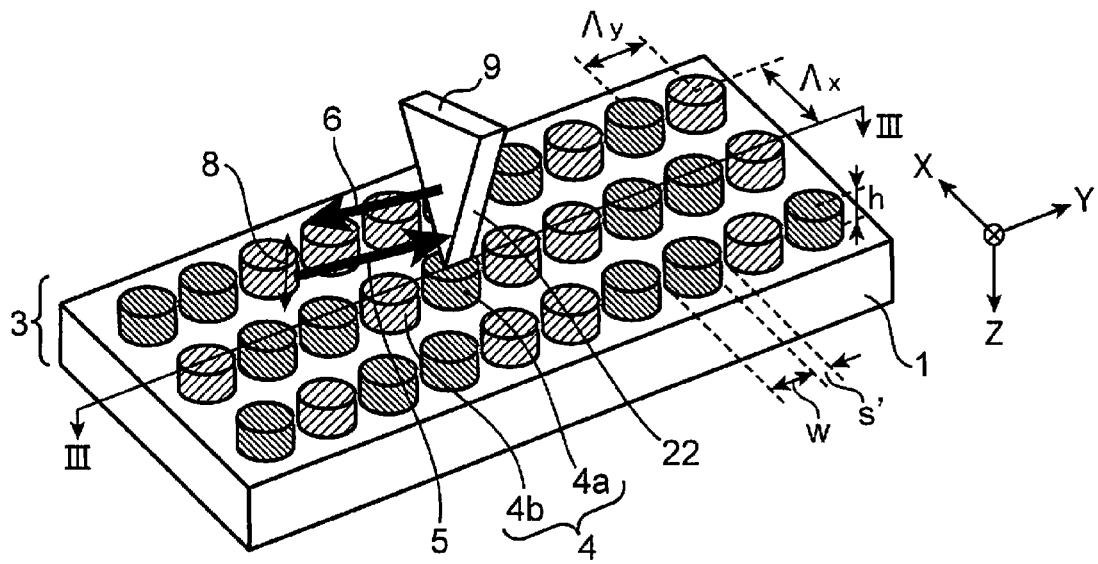
FIG. 2 is an explanatory diagram showing a near-field light generating element of the information device and a state in which information is recorded on or reproduced from the information recording medium in the first embodiment of the present invention.
Figure 3:
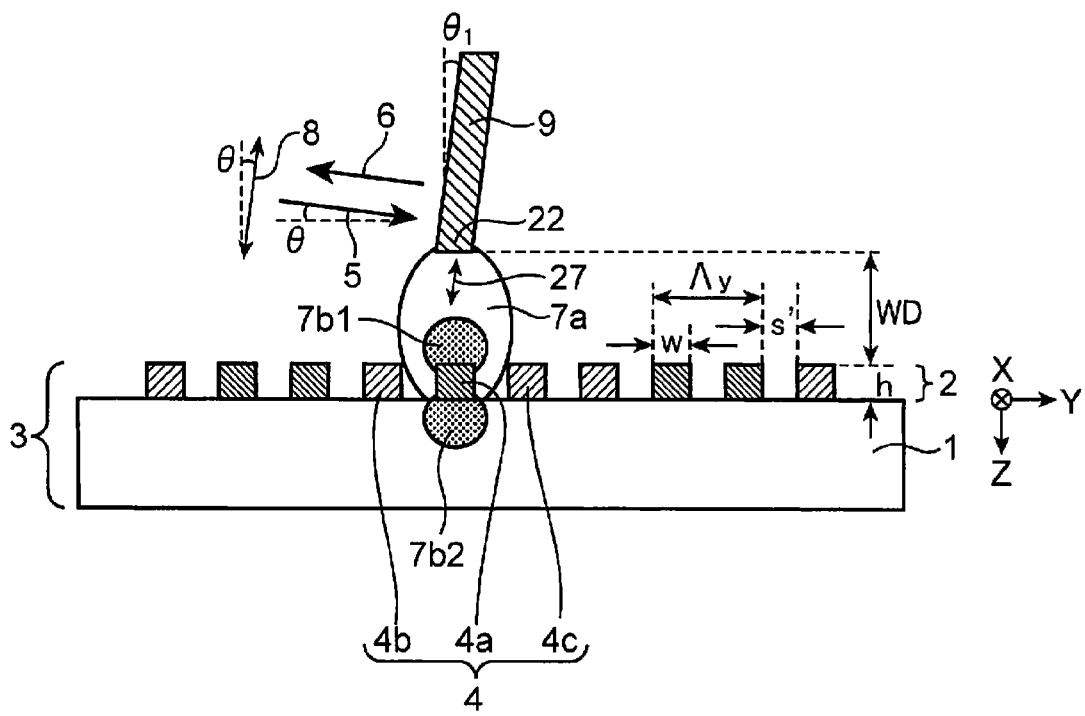
FIG. 3 is a sectional view taken along line III-III in FIG. 2 showing a state in which near-field light is generated between the near-field light generating element of the information device and a recording region of the information recording medium in the first embodiment of the present invention.

FIG. 1 is a schematic diagram showing the configurations of an information device and an information recording medium in a first embodiment of the present invention. FIG. 2 is an explanatory diagram showing a near-field light generating element of the information device and a state in which information is recorded on or reproduced from the information recording medium in the first embodiment of the present invention. FIG. 3 is a sectional view taken along line in FIG. 2 showing a state in which near-field light is generated between the near-field light generating element of the information device and a recording region of the information recording medium in the first embodiment of the present invention.

The information device in this embodiment is an information device that records or reproduces information using near-field light obtained by making use of surface plasmon resonance (hereinafter simply referred to as "plasmon resonance" as well). The information device includes a near-field light generating element 9, an objective lens 10, a collimator lens 11, a light source 14, a beam splitter 15, a detection lens 16, photodetectors 17a and 17b, an optical element for servo signal detection 19, a reproducing unit 24, and a driving unit 25. The information recording medium 3 includes a substrate 1 and includes, on the substrate 1, a recording layer 2 including a recordable plurality of recording regions 4 arrayed in an island shape. The recording region 4 is formed of, for example, particulates including a recording material.

Figure 4:
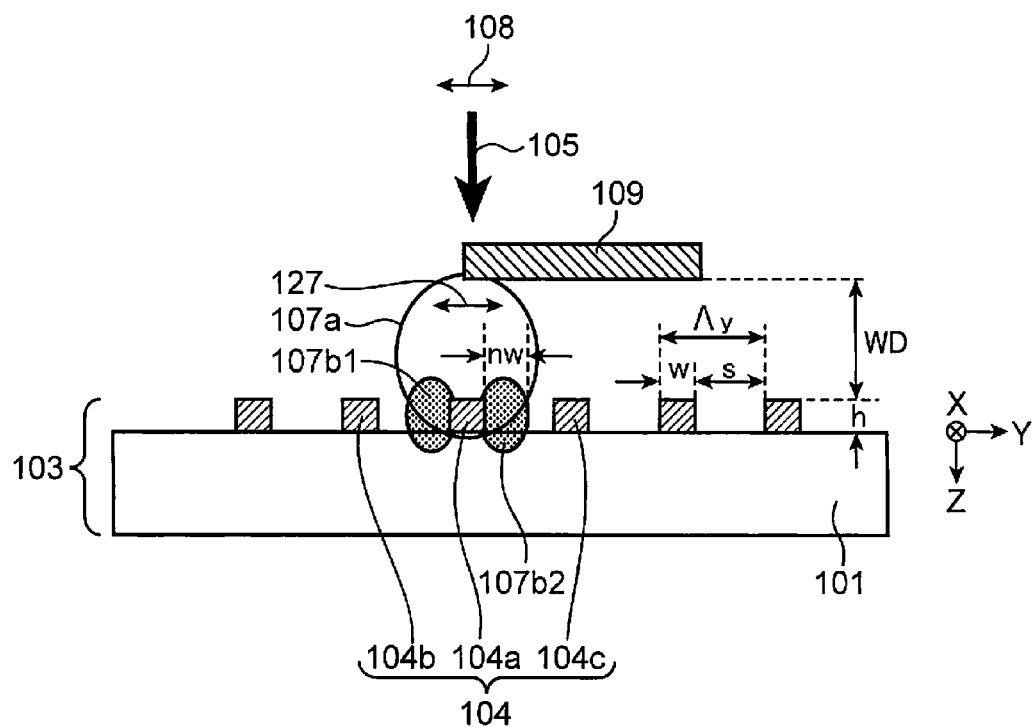
FIG. 4 is a sectional view taken along line IV-IV in FIG. 33 showing a state in which near-field light is generated between a near-field light generating element in a conventional information device and a recording region of an information recording medium.
Figure 5:
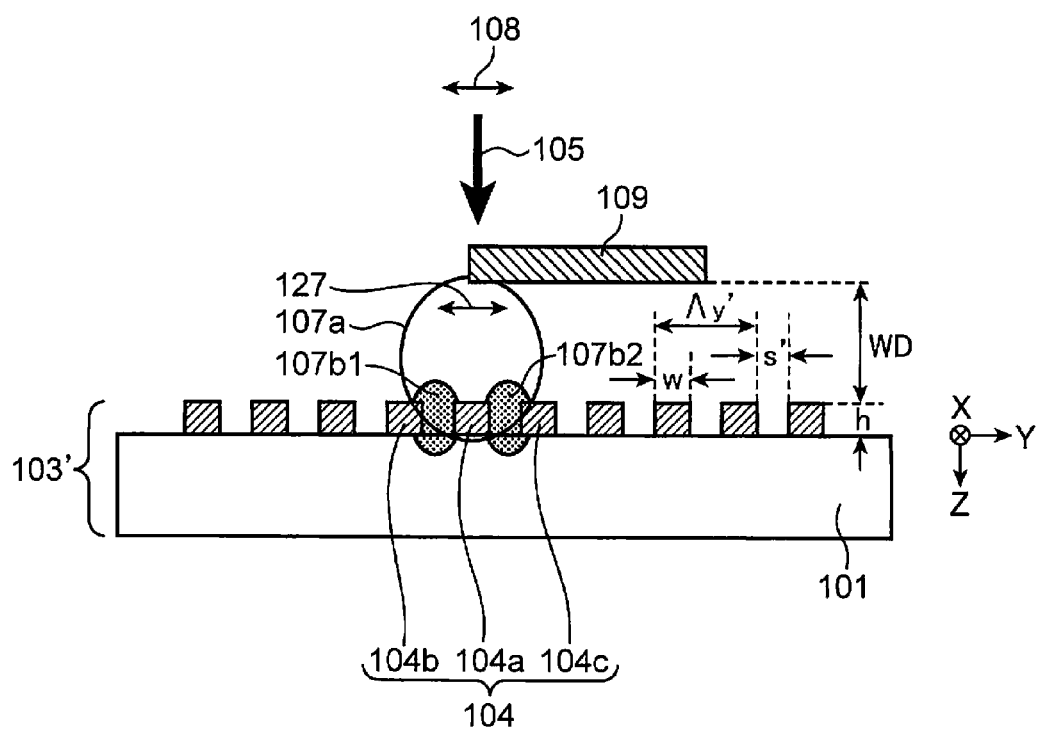
FIG. 5 is a sectional view showing a state in which near-field light is generated between a recording region of an information recording medium further increased in density than the information recording medium shown in FIG. 4 and the near-field light generating element.
Figure 33:
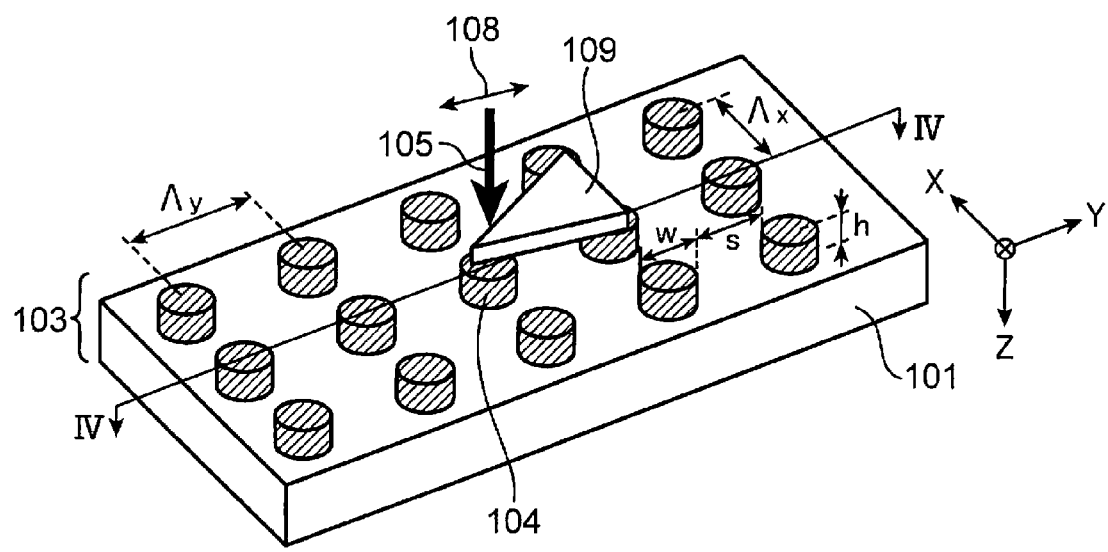
FIG. 33 is a perspective view showing a near-field light generating element of a conventional information device and an information recording medium.

Problems of a conventional information device found by the inventors anew are explained. FIG. 4 is a sectional view taken along line IV-IV in FIG. 33 showing a state in which near-field light is generated between a near-field light generating element in the conventional information device and a recording region of an information recording medium. FIG. 5 is a sectional view showing a state in which near-field light is generated between a recording region of an information recording medium further increased in density than the information recording medium shown in FIG. 4 and the near-field light generating element.

In an information recording medium 103 shown in FIG. 4, an interval s among recording regions 104 is larger than a size w of the recording regions 104, i.e., w<s. On the other hand, in an information recording medium 103' increased in density shown in FIG. 5, an interval s' among the recording regions 104 is equal to or smaller than the size w of the recording regions 104, i.e., w≥s'. Therefore, an array period Λy' of the recording regions 104 of the information recording medium 103' increased in density shown in FIG. 5 is smaller than an array period Λy of the recording regions 104 of the information recording medium 103 shown in FIG. 4. Therefore, the information recording medium 103' can increase a recorded information amount.

In the near-field light generating element 109, a triangular metal film is arranged in parallel to an arrangement surface (the XY plane) of the recording regions 104 such that the longitudinal direction thereof is set as the Y direction and is arranged close to the recording regions 104 such that a working distance WD is about several tens nm from the arrangement surface.

Recording light 105 of linearly polarized light in the Y direction (a polarization direction 108), in which the plasmon resonance tends to occur, is irradiated on the near-field light generating element 109. As a result, surface plasmon resonance is induced in the metal film of the near-field light generating element 109. Near-field light 107a (near-field light having a polarization direction 127 parallel to the polarization direction 108) with electric field intensity greatly increased compared with incident light is generated from a distal end portion (near the vertex of the triangular shape) of the near-field light generating element 109.

The generated near-field light 107a is irradiated on a recording region 104a arranged close to the near-field light generating element 109, whereby the recording region 104a changes in a phase (from crystal to amorphous or from amorphous to crystal). Recording can be performed with one recording region set as a minimum unit.

As explained above, the near-field light generating element 109 is arranged in parallel to the arrangement surface (the XY plane) of the recording regions 104 (so-called horizontal arrangement with respect to the recording regions 104). The recording light 105 having a polarization direction in the Y direction (the polarization direction 108) parallel to an array direction of the recording regions 104 is irradiated on the near-field light generating element 109. At this point, near-field light 107a having a polarization direction 127 in the Y direction same as the polarization direction of the recording light 105 is generated and phase change recording of the recording region 104 is performed. Note that, although near-field light having polarization in directions other than the Y direction is also generated, a rate of generation of the near-field light 107a polarized in the Y direction same as the recording light 105 is extremely large.

The recording regions 104 are isolated in an island shape in a plane and separated from one another on the XY plane. In this case, when the near-field light 107a polarizing in the Y direction is irradiated on the recording region 104a set as a target to be recorded, as shown in FIG. 4, near-field light 107b1 and near-field light 107b2 having size nw substantially the same as the size w of the recording regions 104 are incidentally generated in ±polarization directions (±Y directions) from the side surfaces of the recording region 104a on which the near-field light 107a is irradiated.

Specifically, the near-field light 107b1 and near-field light 107b2 are localized to cling to the respective side surfaces of the recording region 104a. The intensity of the near-field light 107b1 and near-field light 107b2 decreases further away from the side surfaces. For example, a distance at which the intensity of the near-field light 107b1 and near-field light 107b2 decreases to $1/e^2$ of maximum intensity is nw.

The interval s among the recording regions 104 shown in FIG. 4 is sufficiently smaller than the wavelength of the recording light 105 but is larger than the distance nw in which the near-field light 107b1 and near-field light 107b2 spread. That is, as in an example shown in FIG. 4, at the time of relatively low density of nw<s, the near-field light 107b1 and near-field light 107b2 less easily affect adjacent recording regions 104b and 104c.

On the other hand, the interval s' among the recording regions 104 shown in FIG. 5 is not only sufficiently smaller than the wavelength of the recording light 105 but also smaller than the distance nw in which the near-field light 107b1 and near-field light 107b2 spread. That is, the inventors have found that there is a new problem in that, as in an example shown in FIG. 5, at the time of high density of nw≥s, the near-field light 107b1 and near-field light 107b2 generated from the irradiated side surfaces of the recording region 104a respectively adversely affect the adjacent recording regions 104b and 104c, cross-write light is generated, and only the target recording region 104a cannot be satisfactorily recorded.

That is, it has been found that, since the cross-write is generated, information is likely to be recorded or erased in the adjacent recording regions 104b and 104c by mistake and cannot be satisfactorily recorded in the information recording medium 103' increased in density.

In order to solve the problems of the conventional information device including the problems explained above, this embodiment is configured as explained below. That is, an information device in this embodiment is an optical information recording and reproducing device including the light source 14 and the near-field light generating element 9 including a resonating section 22 configured such that the plasmon resonance occurs between the resonating section 22 and the recording region 4 of the recording layer 2. The resonating section 22 is arranged close to the recording region 4. Irradiation light 5 from the light source 14 is irradiated on the near-field light generating element 9. The optical information recording and reproducing device records information in the recording region 4 using at least a part of near-field light 7 generated by the resonating section 22. The light source 14 is arranged such that the amplitude of a polarized component in the vertical direction (the Z direction) of the near-field light 7 is larger than the amplitude of a polarized component in the horizontal direction (the Y direction) with respect to the arrangement surface (the XY plane) of the recording regions 4.

Further, the information device in this embodiment includes the photodetector 17a and detects reflected light 6 from the near-field light generating element 9 with the photodetector 17a. The reproducing unit 24 determines on the basis of a detection signal from the photodetector 17a whether the recording region 4 is in a recorded state or an unrecorded state and reproduces information recorded in the recording region 4.

An optical information recording and reproducing method in this embodiment is an optical information recording and reproducing method for the information recording medium 3 including the substrate 1 and including, on the substrate 1, the recording layer 2 including the recordable recording regions 4 arrayed in an island shape. The optical information recording and reproducing method includes a step of using the light source 14 and the near-field light generating element 9 including the resonating section 22 configured such that the plasmon resonance occurs between the resonating section 22 and the recording region 4 of the recording layer 2 and arranging the resonating section 22 close to the recording region 4, a step of irradiating the irradiation light 5 from the light source 14 on the near-field light generating element 9, and a step of recorded information in the recording region 4 using at least a part of the near-field light 7 generated by the resonating section 22 and includes a step in which the light source 14 is arranged such that the amplitude of a polarized component in the vertical direction of the near-field light 7 is larger than the amplitude of the polarized component in the horizontal direction thereof with respect to the arrangement surface (the XY plane) of the recording regions 4.

As explained below, instead of the arranging step for the light source 14, a step of using a polarization control optical element that converts a polarization state of the irradiation light 5 and setting the amplitude of the polarized component in the vertical direction of the near-field light 7 to be larger than the amplitude of the polarized component in the horizontal direction thereof with respect to the arrangement surface (the XY plane) of the recording regions 4.

Further, the optical information recording and reproducing method includes a step of using the photodetector 17a and detecting the reflected light 6 from the near-field light generating element 9 (or transmitted light transmitted through the near-field light generating element 9) with the photodetector 17a and a step of determining on the basis of a detection signal from the photodetector 17a whether the recording region 4 is in the recorded state or the unrecorded state and reproducing information recorded in the recording region 4.

The information recording medium 3 in this embodiment includes at least the substrate 1 and the recording layer 2. The recording regions 4 of the recording layer 2 have a columnar shape having height h and width (diameter) w and are arranged in an island shape on the substrate 1. A part or all of the recording region 4 is formed of a recording material. One recording region 4 is in the recorded state or the unrecorded state. One recording region 4 corresponds to a conventional recording mark and has recorded information.

In FIG. 2, a recording region 4a indicates the recorded state and a recording region 4b indicates the unrecorded state. The recording regions 4 having a size sufficiently smaller than the wavelength of the irradiation light 5 which is recording light or reproduction light from the light source 14, for example, about 3 to 30 nm are regularly two-dimensionally arrayed. Arrangement periods of the recording regions 4 in the X direction and the Y direction are respectively indicated by Λx and Λy. The size (the width) of the recording regions 4 in the Y direction is indicated by w and an interval between the recording regions 4 is indicated by s'. Λx, Λy, w, and s' are sizes sufficiently smaller than a recording and reproducing wavelength equal to or smaller than the diffraction limit of light, and Λy=w+s. Note that, in this embodiment, the array period, the size of the recording regions 4, and the interval between the recording regions 4 in the X direction are respectively the same as those in the Y direction. However, the array period, the size of the recording regions 4, and the interval between the recording regions 4 in the X direction are not specifically limited to this example and may be different from those in the Y direction.

In the information recording medium 3 in this embodiment, the interval s' among the recording regions 4 is substantially the same as or smaller than the size w of the recording regions 4 and a high density configuration of s≤w is adopted. However, a configuration of s>w may be adopted. In FIG. 2, all the recording regions 4 are regularly arrayed. However, the recording regions 4 do not always need to be regularly arrayed. An array interval or a method of array may be changed according to information to be recorded. Position information and the like of the recording regions 4 can be included by variously changing the array interval or the method of array.

Next, the information device in this embodiment is explained in detail. The information device shown in FIG. 1 includes a semiconductor laser light source as the light source 14 for recording and production. The collimator lens 11, the beam splitter 15, the objective lens 10, and the near-field light generating element 9 are arranged in an optical path from the light source 14 to the information recording medium 3. The optical element for servo signal detection 19 and the detection lens 16 are arranged in a return optical path from the beam splitter 15 to the photodetectors 17a and 17b.

The resonating section 22 in the distal end region of the near-field light generating element 9 and the recording region 4 are arranged close to each other, for example, in a distance within about 100 nm, preferable a distance of about 3 to 30 nm. As a result, near-field light 7a generated from the resonating section 22 by the plasmon resonance can be irradiated on the recording region 4.

Laser light (emission light of recording light) 12 of linearly polarized light in the Z-axis direction (a polarization direction is 8″) emitted from the light source 14 along the Y-axis direction is changed to substantially parallel light 13 (a polarization direction is 8′) by the collimator lens 11 and transmitted through the beam splitter 15. The objective lens 10 causes the near-field light generating element 9 to condense the irradiation light 5 centering on the vicinity of the resonating section 22 at the distal end. At this point, a polarization direction on the optical axis of the irradiation light 5 is a direction indicated by 8. Note that the irradiation light 5 may be irradiated on the recording region 4 and the like in regions close to the resonating section 22.

The objective lens 10 is a condensing lens of a so-called off-axis type. When the substantially parallel light 13, the optical axis of which is parallel to the Y-axis direction, is made incident on the objective lens 10, the irradiation light 5, the optical axis of which tilts by $\theta$ in the Z-axis direction from the Y axis on the YZ plane, is condensed in the resonating section 22. Since the objective lens 10 of the off-axis type is used, there is an effect that contact of the objective lens 10 and the information recording medium 3 is prevented and the irradiation light 5 is easily condensed in the vicinity of the resonating section 22 of the near-field light generating element 9 from an oblique lateral direction.

Note that, in this embodiment, the recording light and the reproduction light emitted from the light source 14 is irradiated on the near-field light generating element 9 by the objective lens 10. However, the present invention is not specifically limited to this example. The recording light or the reproduction light emitted from the light source 14 may be irradiated on the near-field light generating element 9 by, for example, an optical wave guide or an optical fiber.

The near-field light generating element 9 is formed of metal containing Ag, Au, or the like as a main component. As shown in FIG. 2, the near-field light generating element 9 has a triangular prism shape pointed at the distal end thereof. A method for arranging the near-field light generating element 9 is so-called vertical arrangement with respect to the recording region 4 in a state in which the resonating section 22 present at the distal end is set close to the recording region 4 of the recording layer 2. The near-field light generating element 9 is arranged to be tilted by $\theta 1$ with respect to the ZX plane.

Note that, besides the triangular shape, the near-field light generating element 9 only has to have a pointed shape at the distal end such that the plasmon resonance easily occurs. Various changes are possible for an overall shape of the near-field light generating element 9. The material of the near-field light generating element 9 is preferably selected according to a wavelength in use such that the plasmon resonance with a recording material and enhancement of the plasmon resonance can be performed. When it is desired to reduce a dielectric loss (absorption) in the near-field light generating element 9 in a visible light region to an infrared region, a material containing Ag as a main component rather than Au is preferable. For example, by using AgPdCu, AgBi, AgGaCu, or the like obtained by adding another material such as Pd, Cu, or Bi of about several % to between 0.1 to 1.0% in Ag, it is possible to configure the near-field light generating element 9 low in absorption and robust resistant against corrosion. A material containing Cu as a main component also has the effect of the dielectric loss reduction.

The near-field light generating element 9 desirably has a flat section. In this embodiment, $\theta \cong \theta 1$ is set such that the triangular flat section of the near-field light generating element 9 is substantially perpendicular to the optical axis of the irradiation light 5. As a result, the irradiation light 5 to the flat section of the near-field light generating element 9 can be reflected as the reflected light 6 at substantially the same angle and in the opposite direction. This is preferable because efficiency of light utilization for reproduction signal or servo signal detection increases. In order to irradiate the irradiation light 5 on the flat section of the near-field light generating element 9 and satisfactorily extract the reflected light 6, the near-field light generating element 9 desirably includes, for example, a flat section, the area of which is about 1000 to several ten thousand $nm^2$ or larger.

According to the irradiation of the irradiation light 5, electrons present in the near-field light generating element 9 cause interaction with the irradiation light 5, induce (surface) plasmon resonance, and cause the resonating section 22 in the distal end region to generate the near-field light 7a according to the induction of the plasmon resonance. At this point, at least a part of the near-field light 7a is irradiated on the recording region 4 close to the resonating section 22. Optical characteristics such as a refractive index and an extinction coefficient of the recording region 4 change and information is recorded.

The reflected light 6 reflected by the near-field light generating element 9 returns in the opposite direction and passes through the objective lens 10. The reflected light 6 passed through the objective lens 10 is made incident on the optical element for servo signal detection 19 with an optical axis thereof bent in the −Z-axis direction by the beam splitter 15. The reflected light 6 is divided into at least two light beams by the optical element for servo signal detection 19 and divided into two kinds of convergent light 18a and convergent light 18b by the detection lens 16. The convergent light 18b is made incident on the photodetector 17b. A servo signal during recording is detected.

The information device in this embodiment includes the driving unit 25 configured to integrally move the near-field light generating element 9 and the objective lens 10. The driving unit 25 moves the near-field light generating element 9 on the basis of the servo signal from the photodetector 17b to thereby perform fine position control including control of, for example, a space between the near-field light generating element 9 and the recording layer 2.

For the plasmon resonance for generating near-field light, a polarization direction of the irradiation light 5 is important. It is known that the plasmon resonance occurs better and stronger near-field light is generated as the polarization direction 8 of the irradiation light 5 is closer to parallel to the longitudinal direction of the near-field light generating element 9 in which electrons are present. Therefore, in the arrangement of the near-field light generating element 9 shown in FIG. 1, it is preferable to set $\theta=\theta 1$. Note that, even if $\theta 1=0$ or $\theta \neq \theta 1$ is set, the plasmon resonance occurs when a polarized component of the irradiation light 5 with respect to the longitudinal direction of the near-field light generating element 9 is present.

Therefore, in the information device in this embodiment shown in FIG. 1, to generate the near-field light 7a from the resonating section 22 with the plasmon resonance, the light source 14 is arranged such that the amplitude of a polarized component in the vertical direction (the Z-axis direction) has a larger characteristic than the amplitude of a polarized component in another polarization direction, for example, the horizontal direction (the Y-axis direction) with respect to the arrangement surface (the XY plane) of the recording regions 4 on an optical path of the irradiation light 5 irradiated on the near-field light generating element 9. For example, it is preferable to arrange the light source 14 to emit, along the Y-axis direction, the irradiation light 5 having linearly polarized light in the Z-axis direction such that $0° \leq \theta < 45°$ is set.

In this embodiment, for example, $\theta=10$ to $30°$ is set such that the irradiation light 5 slightly has an oblique component ($\theta > 0°$). According to such an arrangement of the light source 14, in the near-field light 7a generated from the resonating section 22, the amplitude of the polarized component in the vertical direction (the Z direction) is larger than the amplitude of the polarized component in the horizontal direction (the Y direction) with respect to the arrangement surface (the XY plane) of the recording regions 4. In FIG. 3, the polarization direction of the near-field light 7a is indicated by 27 and is the same direction as the polarization direction 8 of the irradiation light 5. Note that, although near-field light having a polarization direction different from the polarization direction of the irradiation light 5 is also generated, a rate of the near-field light is small. The near-field light 7a having the same polarization direction as the irradiation light 5 is predominant.

As a result, as shown in FIG. 3, a direction of generation of the near-field light 7b1 and near-field light 7b2, which are incidentally generated from the recording region 4a on which the near-field light 7a is irradiated, is parallel to a polarization direction 27 of the near-field light 7a. That is, the direction is closer to the $\pm Z$ direction, which is the vertical direction in the figure. Even in the high density configuration of $s \leq w$, the near-field light 7b1 and near-field light 7b2 less easily affect the adjacent recording regions 4b and 4c and deterioration due to cross-write during recording is suppressed. Note that, as s' is smaller compared with w, it is preferable that the polarization direction of the near-field light 7a is closer to the vertical direction (the Z direction) with respect to the arrangement surface (the XY plane) of the recording regions 4. However, there is no problem as long as the near-field light generating element 9 is arranged such that the near-field light 7b1 and near-field light 7b2 incidentally generated from the recording region 4a less easily affect the adjacent recording regions 4b and 4c. For example, in a range of $0° \leq \theta < 45°$, there is a sufficient effect of cross-write reduction.

It is also possible that a polarization control optical element such as a wavelength plate that converts a polarization state of emission light 12 emitted from the light source 14 or the parallel light 13 is arranged in an optical path between the light source 14 and the objective lens 10 and the amplitude of a polarized component of the emission light 12 or the parallel light 13 polarized in the vertical direction (the Z-axis direction) with respect to the arrangement surface (the XY surface) of the recording regions 4 is set larger than the amplitude of a component in the polarization direction (the Y-axis direction) of the horizontal component.

Figure 6:
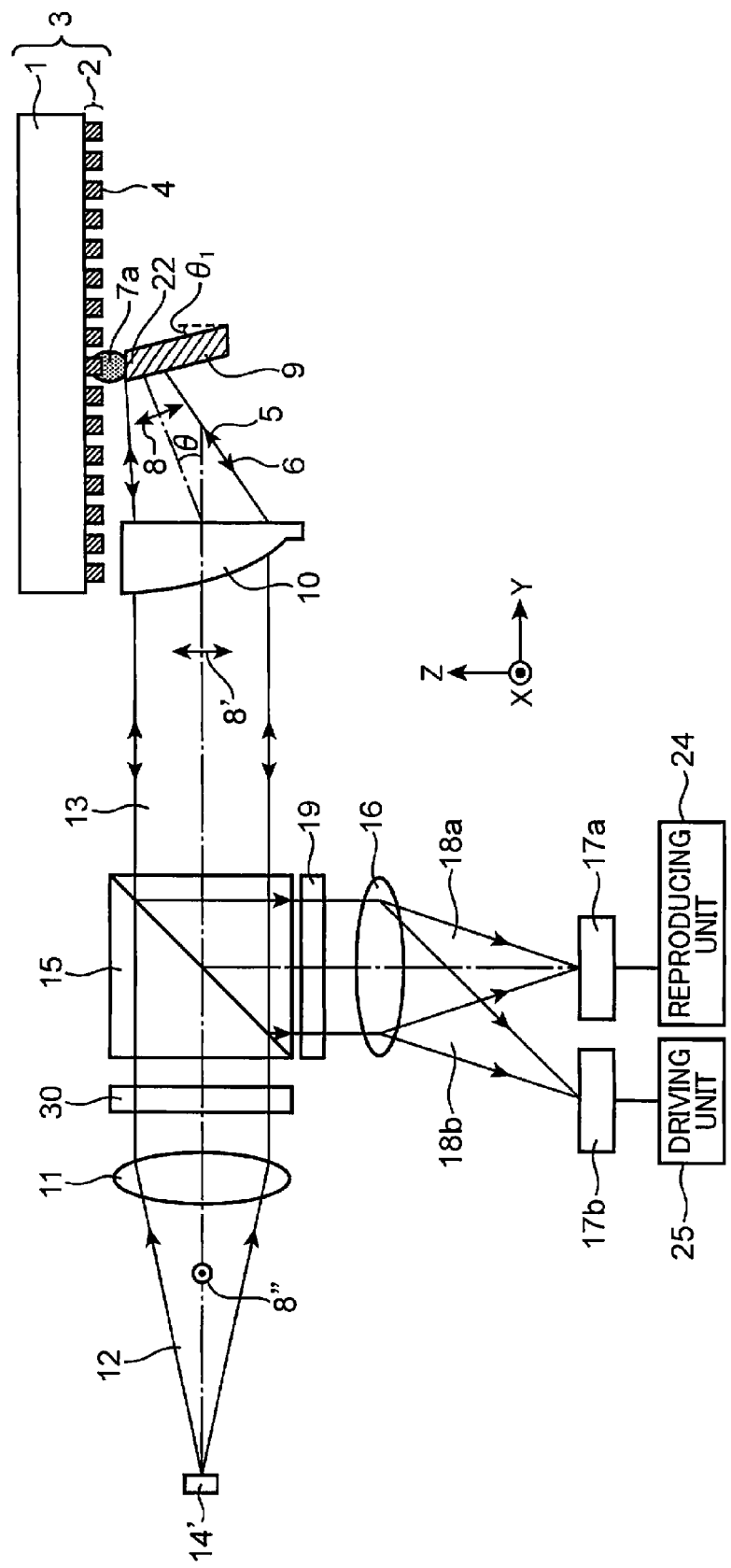
FIG. 6 is a schematic diagram showing the configuration of an information device of another form in the first embodiment of the present invention.

FIG. 6 is a schematic diagram showing the configuration of an information device of another form according to the first embodiment of the present invention. The information device shown in FIG. 6 is different from the information device shown in FIG. 1 in that a polarization control optical element 30 is arranged between the collimator lens 11 and the beam splitter 15 and a light source 14' emits laser light 12 of linearly polarized light (a polarization direction is 8") in the X-axis direction. That is, the information device shown in FIG. 6 further includes the polarization control optical element 30 configured to convert a polarization state of the irradiation light 5. The polarization control optical element 30 converts a polarization direction of the laser light 12 from the light source 14' such that the amplitude of a polarized component in the vertical direction (the Z direction) of the near-field light 7a is larger than the amplitude of a polarized component in the horizontal direction (the Y direction) with respect to the arrangement surface (the XY plane) of the recording regions 4.

Specifically, a wave plate such as a half wave plate is used as the polarization control optical element 30. When the polarization direction of the emission light 12 from the light source 14' is the X-axis direction, the polarization control optical element 30 is arranged in an optical path between the collimator lens 11 and the beam splitter 15. The emission light 12 is changed to linearly polarized light in a direction (the polarization direction 8) in which the polarization direction of the irradiation light 5 to the near-field light generating element 9 tilts by $\theta$ from the Z direction or elliptical polarized light having a major axis in a direction tilting by $\theta$ from the Z direction.

With the arrangement explained above, in this example, as in the information device shown in FIG. 1, the amplitude of a polarized component in the vertical direction (the Z-axis direction) of the near-field light 7a is larger than the amplitude of a polarized component in the horizontal direction (the Y-axis direction) and deterioration due to cross-write during recording is suppressed.

Figure 7:
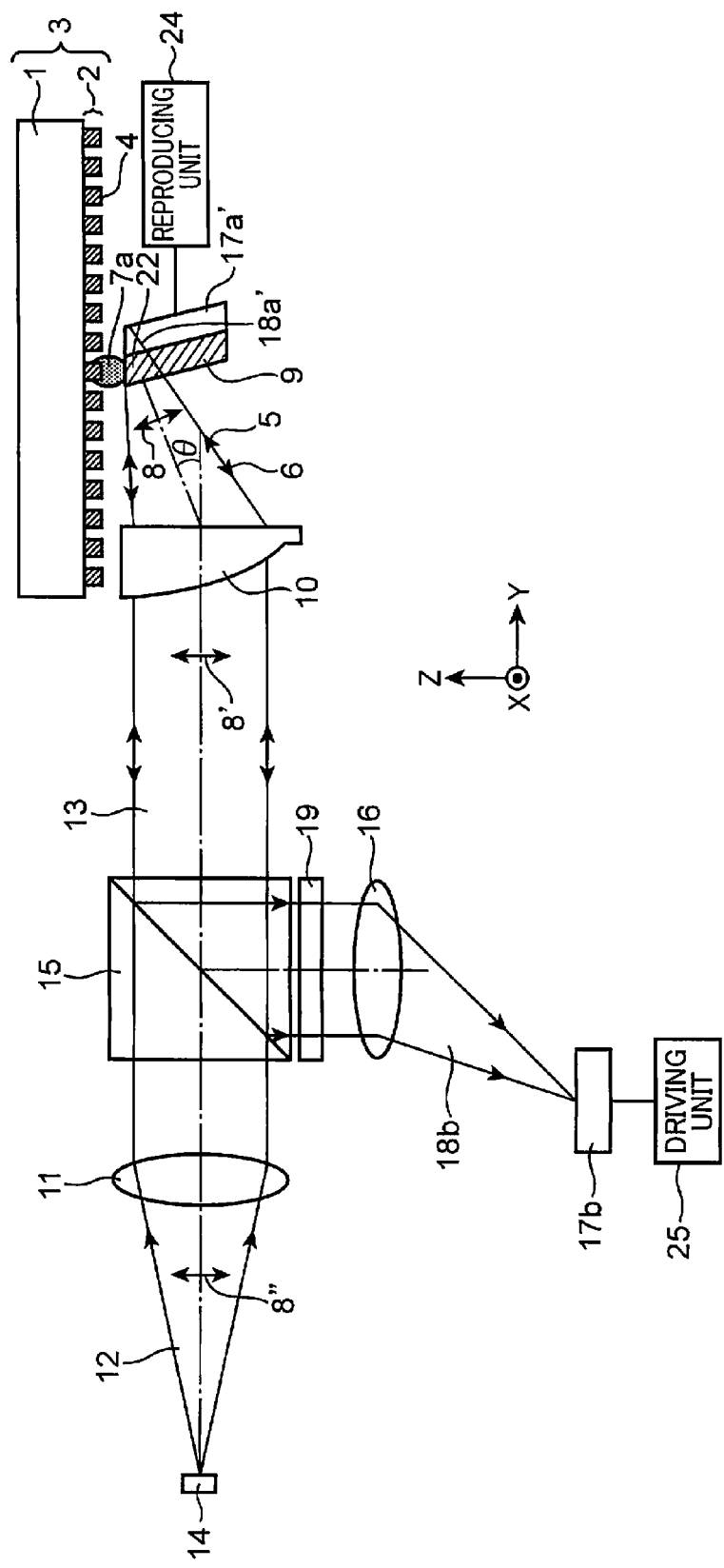
FIG. 7 is a schematic diagram showing the configuration of an information device of still another form in the first embodiment of the present invention.

Instead of detecting reflected light with the photodetector 17a, transmitted light transmitted through the near-field light generating element 9 may be detected. FIG. 7 is a schematic diagram showing the configuration of an information device of still another form in the first embodiment of the present invention. Note that, in this example, the configuration of the information device is the same as the configuration of the information device shown in FIG. 1 except a component for reproducing information recorded in the recording region 4 by detecting transmitted light 18a'. Therefore, detailed explanation of the configuration is omitted.

The information device shown in FIG. 7 is different from the information device shown in FIG. 1 in that a photodetector 17a' configured to detect the transmitted light 18a' transmitted through the near-field light generating element 9 is used instead of the photodetector 17a. Whereas the information device shown in FIG. 1 detects the reflected light 6 from the near-field light generating element 9, the information device shown in FIG. 7 detects the transmitted light 18a' from the near-field light generating element 9.

The photodetector 17a' is arranged on the opposite side of the near-field light generating element 9 to the objective lens 10 and detects the transmitted light 18a' transmitted through the near-field light generating element 9. The reproducing unit 24 determines on the basis of a detection signal from the photodetector 17a' whether the recording region 4 is in the recorded state or the unrecorded state and reproduces information recorded in the recording region 4.

Specifically, a transmitted light amount changes according to a degree of the plasmon resonance between the resonating section 22 of the near-field light generating element 9 and the recording region 4 in the recorded state or the recording region 4 in the unrecorded state. For example, the change in the transmitted light amount is larger when the degree of the plasmon resonance between the resonating section 22 of the near-field light generating element 9 and the recording region 4 in the recorded state or the recording region 4 in the unrecorded state is larger.

Note that, it is considered that, when the plasmon resonance between the near-field light generating element 9 and the recording region 4 is enhanced, a dielectric loss (absorption) in the near-field light generating element 9 increases. In general, the transmitted light amount from the near-field light generating element 9 decreases.

In this way, the transmitted light 18a' is detected by the photodetector 17a' and it is determined on the basis of the detection signal from the photodetector 17a' whether the recording region 4 is in the recorded state or the unrecorded state. Consequently, it is possible to reproduce the information recorded in the recording region 4.

With the configuration explained above, in this example, as in the information device shown in FIG. 1, the amplitude of a polarized component in the vertical direction (the Z-axis direction) of the near-field light 7a is larger than the amplitude of a polarized component in the horizontal direction (the Y-axis direction) and deterioration due to cross-write during recording is suppressed.

Note that, in this example, the photodetector 17a' is arranged in contact with a surface opposed to a surface on a light incident side of the near-field light generating element 9. However, the present invention is not specifically limited to this example. Various changes are possible, for example, the photodetector 17a' is provided in a position apart from the near-field light generating element 9 and a lens for guiding light transmitted through the near-field light generating element 9 to the photodetector 17a' is provided between the near-field light generating element 9 and the photodetector 17a'.

The longitudinal direction of the near-field light generating element 9 in this embodiment tilts by θ with respect to the arrangement surface (the XY plane) of the recording regions 4. A method for placing the near-field light generating element 9 is so-called vertical arrangement. However, a polarization direction of the near-field light 7a generated from the resonating section 22 when the plasmon resonance occurs between the resonating section 22 and the recording region 4 is more important than the method for placing the near-field light generating element 9. That is, in the near-field light 7a generated from the resonating section 22, the amplitude of a polarized component in the vertical direction (the Z direction) is larger than the amplitude of a polarized component in the horizontal direction (the Y direction) with respect to the arrangement surface (the XY plane) of the recording region 4. Therefore, as a result, effects are obtained, for example, it is possible to prevent the near-field light 7b1 and near-field light 7b2 generated from the recording regions 4 from affecting the adjacent recording regions 4b and 4c and reduce cross-write. For example, even in the horizontal arrangement in which a main body portion of the near-field light generating element 9 is generally parallel to the arrangement surface (the XY plane) of the recording regions 4, effects same as the effects in this embodiment can be attained if the components are combined to arrange the region of the resonating section 22 in the vertical arrangement and the conditions explained above are satisfied.

Next, reproduction of information from the information recording medium 3 is explained. The size of the recording regions 4 is sufficiently small with respect to a reproduction wavelength. Therefore, even if the near-field light 7a can be condensed in about the size of the recording regions 4 and irradiated on the recording region 4, a light amount of returning scattered light is extremely small. For example, in the recording regions of about w=20 nm, a light amount of returning scattered light is, for example, 0.001% with respect to a light amount of irradiated near-field light. Efficiency of conversion of reproduction light is low. When the efficiency is estimated as 1% at most, the light amount of the returning scattered light is about 1% of the above-mentioned value, that is, about 0.00001% at most with respect to the light amount of the reproduction light. Therefore, it has been found that, in the method for detecting scattered light from the recording regions 4, it is difficult to reproduce information.

The inventors have found that, when the resonating section 22 and the recording region 4 interact with each other and an enhancement degree of the plasmon resonance changes in the recorded state and the unrecorded state of the recording region 4, a light amount of the reflected light 6 from the near-field light generating element 9 or the transmitted light 18a' transmitted through the near-field light generating element 9 changes. That is, it is considered that, when the plasmon resonance between the near-field light generating element 9 and the recording regions 4 is enhanced, a dielectric loss (absorption) increases in the near-field light generating element 9. As a result, a reflected light amount or a transmitted light amount from the near-field light generating element 9 changes. Depending on the design of the near-field light generating element 9, when the plasmon resonance is enhanced, the reflected light amount increases in some case and the reflected light amount decreases in other cases. However, concerning the change in the transmitted light amount, in general, the transmitted light amount is smaller when a degree of the plasmon resonance is larger.

Specifically, even if the size of the recording regions 4 is equal to or smaller than the diffraction limit, the degree of the resonance can be changed according to whether the recording region 4 is in the recorded state or the unrecorded state. Therefore, it is possible to detect the reflected light 6 or the transmitted light 18a' with the photodetector 17a or the photodetector 17a', determine whether the recording region 4 is in the recorded state or the unrecorded state according to a detection light of the photodetector 17a or the photodetector 17a', and reproduce information recorded in the recording region 4.

The size of the near-field light generating element 9 is not subjected to spatial limitation. Therefore, it is possible to set the near-field light generating element 9 larger than the recording region 4. Further, the reproduction light is directly irradiated on the near-field light generating element 9 rather than the near-field light and the reflected light or the transmitted light from the near-field light generating element 9 is detected. Therefore, it is possible to set a reflected light amount, a transmitted light amount, a light amount change of the reflected light amount, and a light amount change of the transmitted light amount sufficiently large and improve a modulation degree of a reproduction signal.

In some case, a polarization state such as a polarization angle of the reflected light or the transmitted light from the near-field light generating element 9 changes according to a plasmon resonance degree. In this case, it is possible to change the change in the polarization state to a light amount change of the reflected light or the transmitted light by combining optical elements such as an analyzer. Therefore, it is possible to reproduce information in the same manner by detecting, with a photodetector, emission light from the optical element such as the analyzer.

A part or all of the recording region 4 is formed of a recording material. However, to enhance the plasmon resonance, it is desirable that the recording material has a metallic characteristic. Specifically, it is desirable that a sign of a real part of the dielectric constant of the recording material is minus. Further, the real part of the relative dielectric constant of the recording material preferably is equal to or smaller than −5 because a degree of the plasmon resonance increases. For example, actual metal is explained as an example. When the reproduction light is in a range of visible light to infrared light, a wavelength is equal to or larger than 0.54 μm in Au, the wavelength is equal to or larger than 0.44 μm in Ag, the wavelength is equal to or larger than 0.506 μm in Cu, the real part of the relative dielectric constant of each kind of the metal is equal to or smaller than −5. As a result, the plasmon resonance degree is high in the range. It is possible to determine standards of resonance degrees of other recording materials according to values of real parts of relative dielectric constants.

For example, when the recording material of the recording regions 4 indicates a metallic characteristic in one of the recorded state and the unrecorded state and indicates a non-metallic characteristic in the other, a change in a reflected light amount or a transmitted light amount from the near-field light generating element 9 is larger in the former than in the latter. Therefore, when the real part of the dielectric constant in the recorded state and the real part of the dielectric constant in the unrecorded state of the recording material are compared, in the state of the recording material having the smaller real part, the reflected light amount or the transmitted light amount changes. As a result, a modulation degree of reproduction increases and satisfactory reproduction can be expected.

That is, a part or all of the recording region 4 of the recording layer 2 only has to be formed of the recording material and a sign of the real part of the dielectric constant in the recorded state of the recording material and a sign of the real part of the dielectric constant in the unrecorded state of the recording material only have to be different from each other with respect to the wavelength of the reproduction light. Therefore, as the information recording medium 3 used in this embodiment, it is preferable to use an information recording medium including at least the substrate 1 and the recording layer 2. In the information recording medium, the recording regions 4 of the recording layer 2 are arrayed in an island shape, a part or all of the recording region 4 is formed of a recording material, and, at the wavelength of the reproduction light, a sign of a real part of the dielectric constant of the recording material in the recorded state and a sign of a real part of the dielectric constant of the recording material in the unrecorded state are different from each other.

Further, at the wavelength of the reproduction light, if one of a real part of the relative dielectric constant of the recording material in the recorded state and a real part of the relative dielectric constant of the recording material in the unrecorded state is set to be equal to or smaller than −5 and the other is set to be larger than −5, there is an effect that a plasmon resonance degree in one of the recorded state and the unrecorded state increases and the modulation degree of reproduction further improved. Therefore, as the information recording medium 3 used in this embodiment, it is preferable to use an information recording medium including at least the substrate 1 and the recording layer 2. In the information recording medium 3, the recording regions 4 of the recording layer 2 are arrayed in an island shape, a part or all of the recording region 4 is formed of a recording material, and, at the wavelength of the reproduction light, one of a real part of the relative dielectric constant of the recording material in the recorded state and a real part of the relative dielectric constant of the recording material in the unrecorded state is equal to or smaller than −5 and the other is larger than −5.

As the recording material, a phase change recording material, an inorganic material such as bismuth oxide or titanium oxide, a photochromic material such as diarylethene, an organic dye, and the like are known. In all the recording materials, if the conditions are satisfied at the wavelength of the reproduction light, it is possible to increase the modulation degree of reproduction.

In this embodiment, as a main component of the recording material, for example, a chalcogenide phase change recording material of a GeTe—$Sb_2Te_3$ base such as $Ge_2Sb_2Te_5$ containing GeTe and $Sb_2Te_3$ at a rate of 2:1 is used. The recorded state corresponds to crystal and the unrecorded state corresponds to amorphous. However, the recorded state may correspond to amorphous and the unrecorded state may correspond to crystal. Note that the main component indicates a component of a material having a largest volume ratio that forms the recording regions 4. The main component is preferably 50% or more in the volume ratio because the modulation degree of reproduction increases.

In general, the phase change recording material has a characteristic that, when the phase change material changes to crystal, a wavelength range is different depending on a composition but indicates a metallic characteristic in a certain wavelength region.

For example, in the case of $Ge_2Sb_2Te_5$, which is a typical phase change material, it is preferable that a wavelength λ of reproduction light suitable for conversion of the light source 14 into a semiconductor laser satisfies, for example, 0.35 μm≤λ≤0.45 μm. For example, when the wavelength λ of reproduction light of a blue-violet semiconductor laser is 0.41 μm, a real part of the relative dielectric constant of a crystalline recording material is −8.7 and a real part of the relative dielectric constant of an amorphous recording material is 0.57. In this case, a condition that the real part of the relative dielectric constant of the crystalline recording material is equal to or smaller than −5 and the real part of the relative dielectric constant of the amorphous recording material is larger than −5 is satisfied. Therefore, it is preferable to use $Ge_2Sb_2Te_5$ as the main component of the recording material.

Similarly, when the wavelength λ of red reproduction light satisfying 0.6 μm≤λ≤0.7 μm suitable for conversion of the light source 14 into a semiconductor laser is, for example, 0.65 μm, a real part of the relative dielectric constant of a crystalline recording material is −3.3 and a real part of the relative dielectric constant of an amorphous recording material is 12. When the wavelength λ of infrared reproduction light satisfying 0.73 μm≤λ≤0.83 μm suitable for conversion of the light source 14 into a semiconductor laser is, for example, 0.78 μm, a real part of the relative dielectric constant of a crystalline recording material is 5.9 and a real part of the relative dielectric constant of an amorphous recording material is 17.

Therefore, when the recording material is $Ge_2Sb_2Te_5$, in wavelengths from blue light to red light (0.35 μm≤λ≤0.7 μm), since signs of the real part of the dielectric constant are different from each other in crystal and amorphous, it is preferable to use $Ge_2Sb_2Te_5$ as the main component of the recording material. In particular, at the wavelength of blue light (0.35 μm≤λ≤0.45 μm), the real part of the relative dielectric constant of the crystalline recording material is equal to or smaller than −5 and the real part of the relative dielectric constant of the amorphous recording material is larger than −5. Therefore, it is more preferable to use $Ge_2Sb_2Te_5$ as the main component of the recording material. A recording material formed by $Ge_{22}Sb_2Te_{25}$ with the component ratio of GeTe and $Sb_2Te_3$ changed to 22:1 or other component ratios shows the same tendency. Reproduction at the wavelength of the blue light is preferable.

When the recording material is $Ge_{31}Bi_2Te_{34}$ of a GeTe—$Bi_2Te_3$ base, with respect to the wavelength of the blue light, the real part of the relative dielectric constant of the crystalline recording material is −9.3 and the real part of the relative dielectric constant of the amorphous recording material is 3.9. With respect to the wavelength of the red light, the real part of the relative dielectric constant of the c crystalline recording material is −2.9 and the real part of the relative dielectric constant of the amorphous recording material is 14. With respect to the wavelength of the infrared light, the real part of the relative dielectric constant of the crystalline recording material is 15 and the real part of the relative dielectric constant of the amorphous recording material is 15.

As in the case of the $Ge_2Sb_2Te_5$, in $Ge_{31}Bi_2Te_{34}$, at the wavelengths of the blue light to the red light, since signs of the real part of the dielectric constant are different from each other in crystal and amorphous, it is preferable to use $Ge_{31}Bi_2Te_{34}$ as the main component of the recording material. In particular, at the wavelength of blue light, the real part of the relative dielectric constant of the crystalline recording material is equal to or smaller than −5 and the real part of the relative dielectric constant of the amorphous recording material is larger than −5. Therefore, it is considered to be more preferable to use $Ge_{31}Bi_2Te_{34}$ as the main component of the recording material. Other recording materials of the GeTe—$Bi_2Te_3$ base with the component ratio changed show the same effect.

When the recording material is $Ge_{10}Sb_{90}$ of a Ge—Sb base, at the wavelength of the blue light, for example, 0.41 μm, the real part of the relative dielectric constant of the crystalline recording material is −11.0 and the real part of the relative dielectric constant of the amorphous recording material is −4.3. At the wavelength of the red light, for example, 0.65 μm, the real part of the relative dielectric constant of the crystalline recording material is −10.8 and the real part of the relative dielectric constant of the amorphous recording material is 13.2. At the wavelength of the infrared light, for example, 0.78 μm, the real part of the relative dielectric constant of the crystalline recording material is −5.6 and the real part of the relative dielectric constant of the amorphous recording material is 17.9. At a wavelength of 0.83 μm, the real part of the relative dielectric constant of the crystalline recording material is −0.62 and the real part of the relative dielectric constant of the amorphous recording material is 20.2. At a wavelength of 0.86 μm, the real part of the relative dielectric constant of the crystalline recording material is 2.7 and the real part of the relative dielectric constant of the amorphous recording material is 21.3

In the case of $Ge_{10}Sb_{90}$, at wavelengths of 0.492 μm to 0.835 μm, since signs of the real part of the dielectric constant are different from each other in crystal and amorphous, a reproduction characteristic is improved and it is preferable to use $Ge_{10}Sb_{90}$. In particular, at wavelengths of 0.492 μm to 0.787 μm, since the real part of the relative dielectric constant of the crystalline recording material is equal to or smaller than −5 and the real part of the relative dielectric constant of the amorphous recording material is larger than −5, it is considered to be more preferable to use $Ge_{10}Sb_{90}$ as the main component of the recording material. Other recording materials of the Ge—Sb base with the component ratio changed show the same effect.

A material including any one of $Te_{60}Ge_4Sn_{11}Au_{25}S$, $Ag_4In_4Sb_{76}Te_{16}$, GeTe, (Ge—Sn)Te, (Ge—Sn)Te—$Sb_2Te_3$, (Ge—Sn)Te—$Bi_2Te_3$, GeTe—(Sb—Bi)$_2Te_3$, (Ge—Sn)Te—(Sb—Bi)$_2Te_3$, GeTe—(Bi—In)$_2Te_3$, (Ge—Sn)Te—(Bi—In)$_2Te_3$, Sb—Ga, (Sb—Te)—Ga, (Sb—Te)—Ge, Sb—In, (Sb—Te)—In, Sb—Mn—Ge, Sb—Sn—Ge, Sb—Mn—Sn—Ge, and (Sb—Te)—Ag—In, which are other phase change materials, has a characteristic that the material indicates a metallic characteristic in a certain wavelength region when the material changes to crystal. Therefore, it is possible to effectively use, focusing on a value of the real part of the relative dielectric constant, the material including any one of the above components in a range of a wavelength satisfying the preferable condition explained above.

As the substrate 1 of the information recording medium 3, it is preferable that flatness of the surface on which the recording layer 2 is formed is high and stability at the time when the information recording medium 3 is rotated is high. As the material of the substrate 1, for example, a glass substrate or a metal plate of aluminum or the like is preferable. Further, resin such as polycarbonate, PMMA (polymethylmethacrylate resin), norbornene resin (e.g., "ARTON" (manufactured by JSR Corporation)), or cycloolefin resin (e.g., "ZEONEX" (manufacture by Zeon Corporation)) can also be used.

In the case of a thin film shape in which recording layers are continuously connected, when a recording mark or the like is formed on a recording material, heat diffuses in the recording material and a large recording mark exceeding a recording spot is recorded. A difference in the size of the recording mark starts to be conspicuous because of thermal diffusion when the recording mark is equal to or smaller than 30 nm.

Therefore, it is preferable that the recording regions 4 of the recording layer 2 are arrayed in an island shape and formed in a particulate structure having a size equal to or smaller than 30 nm. Consequently, since the recording regions 4 are arranged to be separated from one another, it is possible to satisfactorily record information in the recording region 4 (particulates) equal to or smaller than 30 nm while avoiding the influence of thermal diffusion in recording.

However, when the recording material changes to particles smaller than 3 nm, the number of atoms included in the particles decreases, a melting point is too low, and retention of recording in the recording materials becomes unstable because of thermal fluctuation. Therefore, it is preferable that the size of the recording regions 4 satisfies 3 nm≤w≤30 nm.

It is preferable in terms of high density of recording that the recording regions 4 are microminiaturized and reduced in size as much as possible and the recording regions 4 in an isolated state are provided as close as possible to one another. Even in such an information recording medium of a high-density array, the information device in this embodiment can reduce cross-write and satisfactorily record and reproduce information.

Note that, in this embodiment, the recording regions 4 indicate recording regions machined in a fine convex shape shown in FIG. 2. Besides the columnar shape shown in FIG. 2, the recording regions 4 may have a shape such as a cone, a triangular pyramid, a polygonal pyramid having four or more angles, a triangular prism, or a polygonal prism having four or more angles.

Figure 8:
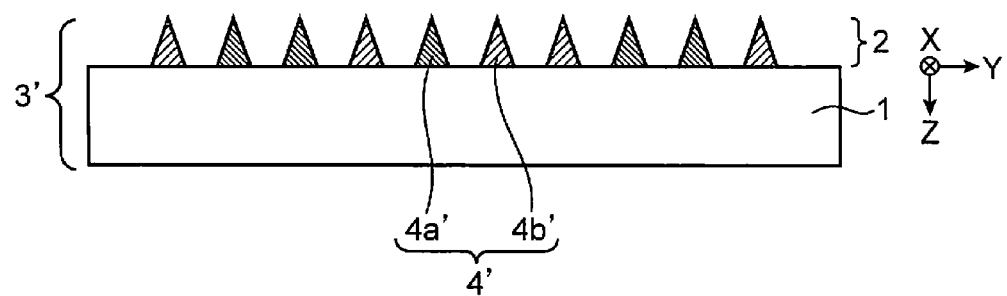
FIG. 8 is a diagram showing an example of an information recording medium including recording regions having a conical shape.
Figure 9:
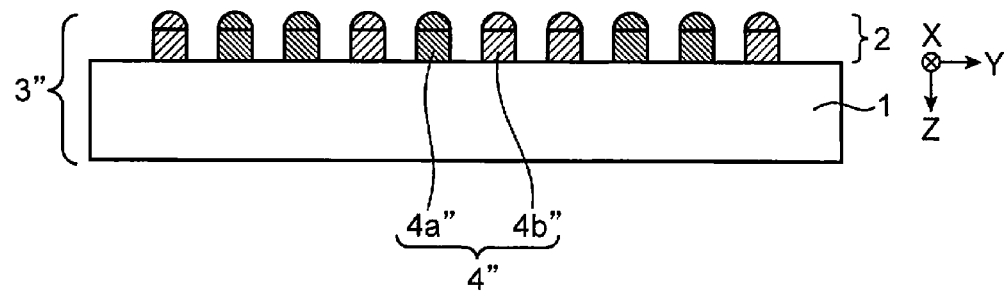
FIG. 9 is a diagram showing an example of an information recording medium including recording regions having a hemispherically rounded shape in a distal end portion of a column.

FIG. 8 is a diagram showing an example of an information recording medium 3' including conical recording regions 4'. FIG. 9 is a diagram showing an example of an information recording medium 3" including recording regions 4" having a hemispherically rounded shape in a distal end portion of a column.

In FIG. 8, the information recording medium 3' includes the substrate 1 and the recording layer 2. The recording layer 2 includes the conical recording regions 4'. The recording regions 4' include a recording region 4a' in the recorded state and a recording region 4b' in the unrecorded state. Distal end portions of the recording regions 4' have pointed cross sections. More specifically, the distal end portions have a conical shape.

In FIG. 9, the information recording medium 3" includes the substrate 1 and the recording layer 2. The recording layer 2 includes the recording regions 4" having the hemispherically rounded shape in the distal end portion of the column. The recording regions 4" include a recording region 4a" in the recorded state and a recording region 4b" in the unrecorded state. Distal end portions of the recording regions 4" have arcuate cross sections. More specifically, the recording regions 4" have a shape having a hemisphere formed in a distal end portion of a column. Note that the recording regions 4" may have a shape having a cone formed in a distal end portion of a column or may have a shape having a pyramid formed in a distal end portion of a prism.

The inventors have found that, since near-field light tends to be condensed or concentrated in the recording region 4' having a shape pointed at a distal end of a cone, a triangular pyramid, a polygonal pyramid having four or more angles as shown in FIG. 8 or the recording region 4" having a shape rounded or pointed at a distal end of a column, a triangular prism, or a polygonal prism having four or more angles as shown in FIG. 9, these shapes are preferable.

Note that all of portions of the recording regions 4 projecting from the substrate 1 may be formed of a recording material or only distal end portions of the portions projecting from the substrate 1 may be formed of the recording material.

Next, in the information device in this embodiment, the light source 14 is a one-wavelength light source that emits recording light and reproduction light and the near-field light generating element 9 has a configuration for both recording and reproduction. For example, the near-field light generating element 9 is formed of Au and has a diamond shape (however, a side surface shape is an elongated parallelogram shown in FIG. 1), the length in the longitudinal direction of which is 71 nm. The area of a flat section of the near-field light generating element 9 is 2500 nm$^2$. The wavelength $\lambda$, of the recording light and the reproduction light emitted from the light source 14 is 0.405 μm. The recording regions 4 are formed of $Ge_2Sb_2Te_5$. The diameter of the particulates (the recording regions 4) is 20 nm, the thickness of the recording layer 2 (the height of the recording regions 4) h is 100 nm, and a space between the resonating section 22 and the recording region 4 is 15 nm. In this case, reflectance of the recording regions 4 in the case of crystal is 1.00%, reflectance of the recording regions 4 in the case of amorphous is 1.44%, a change amount of the reflectance is 0.44%, and a modulation degree of reproduction is 31%. Fine values are respectively obtained. Note that the modulation degree of reproduction can be calculated by dividing the change amount of the reflectance by the larger reflectance of crystal and amorphous (=0.44/1.44).

In the configuration in which the near-field light generating element 9 functions as both elements for recording and for reproduction, in crystal in which plasmon resonance enhancement occurs more largely, recording sensitivity of the recording regions 4 is sometimes higher. Therefore, it is preferable to perform intensity control for the recording light taking into account a sensitivity difference in a phase state (crystal or amorphous) of the recording regions 4 before recording.

It is preferable to form a protection layer having a dielectric constant with a real part of which sign is positive, in an upper layer of the recording regions 4 of the recording layer 2 formed on the substrate 1. By providing the protection layer, there are effects such as improvement of resistance to environment of the recording regions 4 formed of the recording material and a reduction in damage due to contact of the distal end portion of the near-field light generating element 9 with the resonating section 22. Since the sign of the real part of the dielectric constant of the protection layer is positive, there is an effect of preventing unnecessary plasmon resonance between the projection layer and the resonating section 22 from occurring and, as a result, preventing a decrease in the modulation degree of reproduction due to an adverse effect from the protection layer.

As the protection layer having a dielectric constant with a real part of which sign is positive, inorganic materials of one or a plurality of oxides or the like selected out of, for example, $ZrSiO_4$, $(ZrO_2)_{25}(SiO_2)_{25}(Cr_2O_3)_{50}$, SiCr, $TiO_2$, $ZrO_2$, $HfO_2$, ZnO, $Nb_2O_5$, $Ta_2O_5$, $SiO_2$, $SnO_2$, $Al_2O_3$, $Bi_2O_3$, $Cr_2O_3$, $Ga_2O_3$, $In_2O_3$, $Sc_2O_3$, $Y_2O_3$, $La_2O_3$, $Gd_2O_3$, $Dy_2O_3$, $Yb_2O_3$, CaO, MgO, $CeO_2$, and $TeO_2$ can be used. One or a plurality of nitrides selected out of, for example, C—N, Ti—N, Zr—N, Nb—N, Ta—N, Si—N, Ge—N, Cr—N, Al—N, Ge—Si—N, and Ge—Cr—N can also be used.

Sulfides such as ZnS, carbides such as SiC, and fluorides such as $LaF_3$, $CeF_3$, and $MgF_2$ can also be used. The protection layer may be formed using a mixture of one or a plurality of materials selected out of the materials. Further, an organic material such as resin may be used as the protection layer. In this case, there is an effect that a shock during collision can be reduced more than the inorganic materials explained above. A mixed material of the organic material and the inorganic material may be used.

Unevenness of the surface of the protection layer is eliminated by optically planarizing the surface. Therefore, there is an effect of reducing contact with the near-field light generating element 9 due to the unevenness of the surface.

(Second Embodiment)

Next, concerning an information device and an information recording medium in a second embodiment of the present invention, differences from the information device and the information recording medium in the first embodiment are mainly explained with reference to FIGS. 10 to 13.

Figure 10:
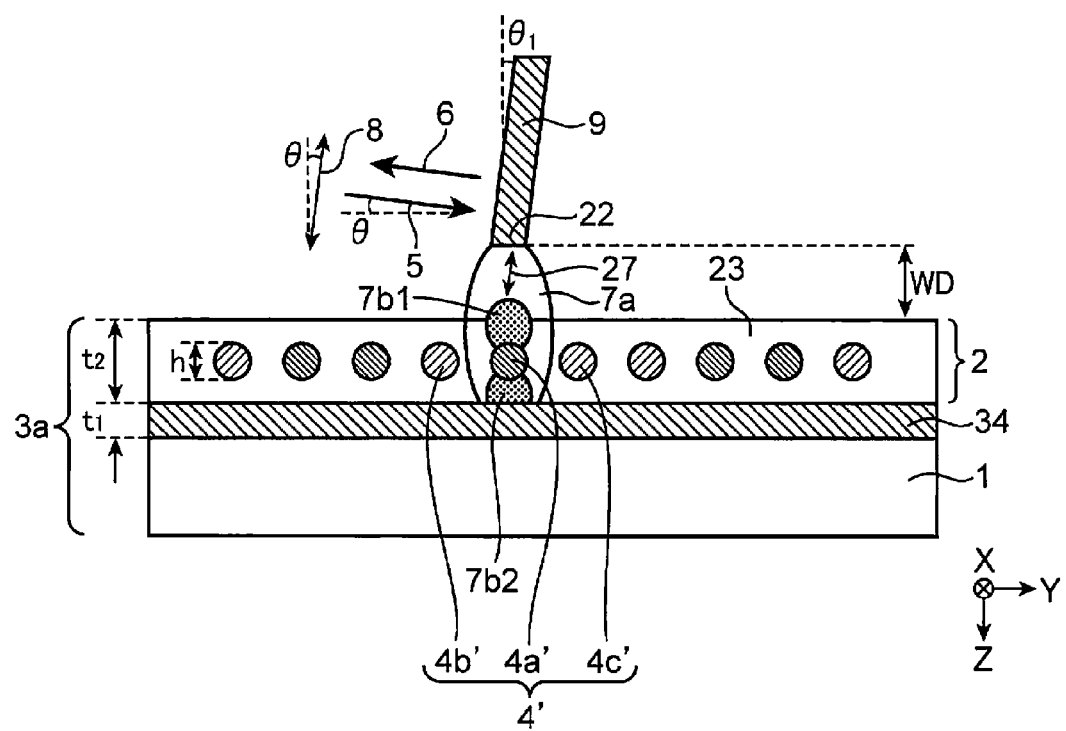
FIG. 10 is an explanatory diagram showing the configuration of an information recording medium and a state in which information is recorded on or reproduced from the information recording medium in a second embodiment of the present invention.
Figure 11:
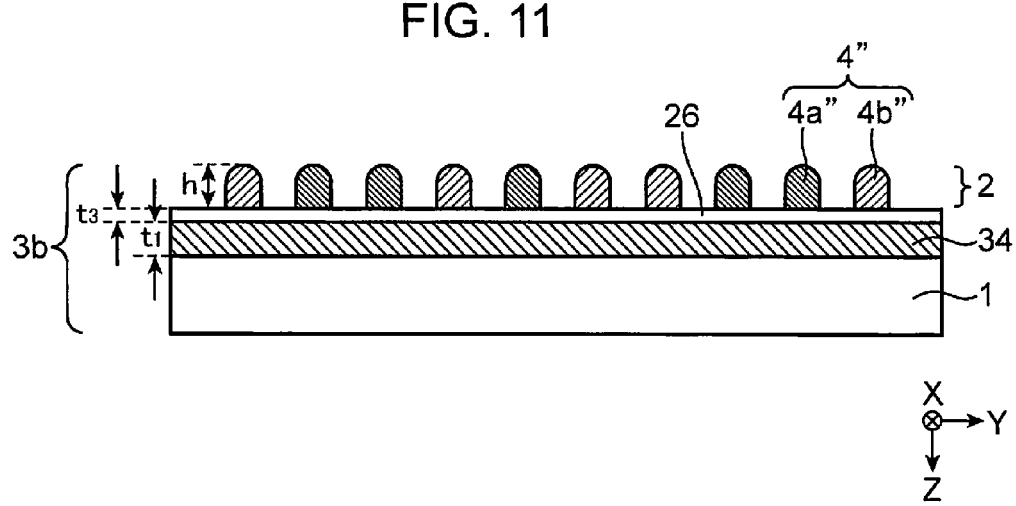
FIG. 11 is a sectional view showing the configuration of an information recording medium of another form in the second embodiment of the present invention.
Figure 12:
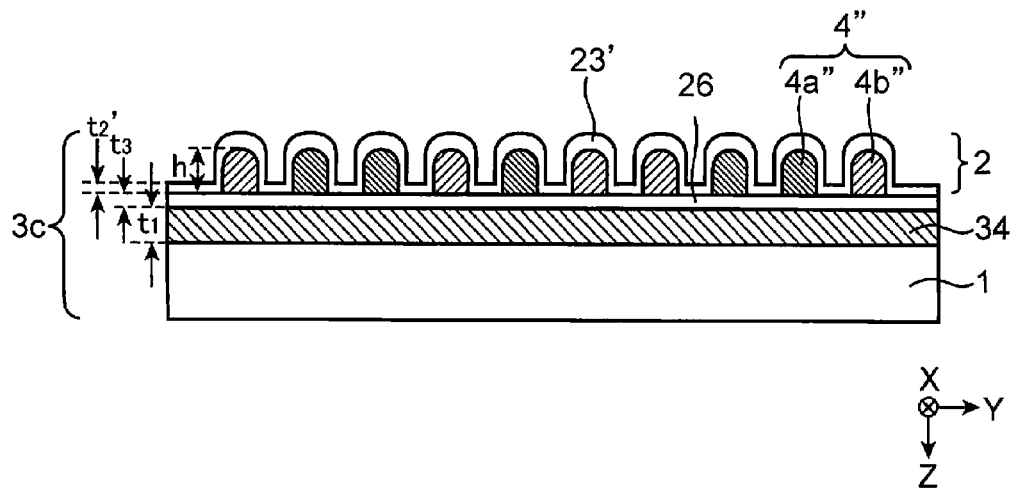
FIG. 12 is a sectional view showing the configuration of an information recording medium of still another form in the second embodiment of the present invention.
Figure 13:
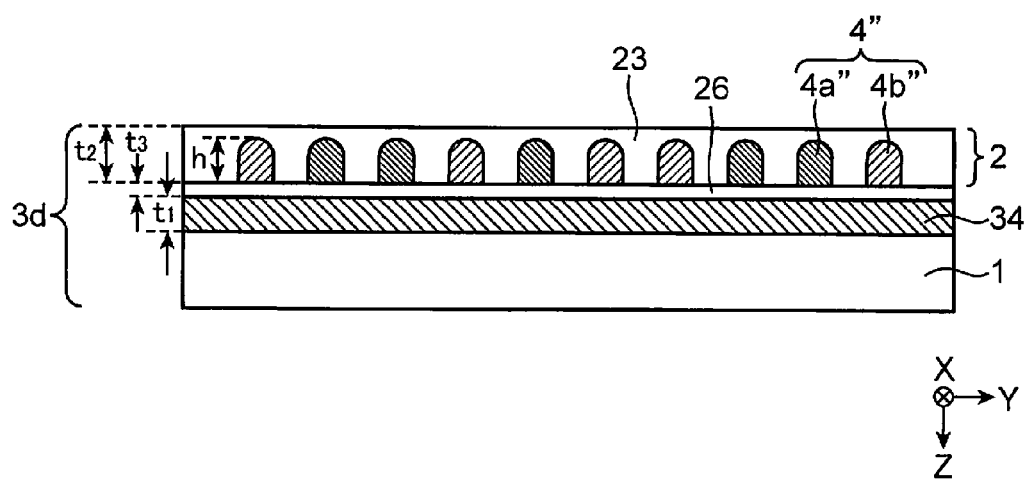
FIG. 13 is a sectional view showing the configuration of an information recording medium of still another form in the second embodiment of the present invention.

FIG. 10 is an explanatory diagram showing the configuration of the information recording medium and a state in which information is recorded on or reproduced from the information recording medium in the second embodiment of the present invention. FIG. 11 is a sectional view showing the configuration of an information recording medium of another form in the second embodiment of the present invention. FIG. 12 is a sectional view showing the configuration of an information recording medium of still another form in the second embodiment of the present invention. FIG. 13 is a sectional view showing the configuration of an information recording medium of still another form in the second embodiment of the present invention. Note that the configuration of the information device in this embodiment is the same as the configuration of the information device shown in FIG. 1 and the like. Therefore, the configuration is not shown in the figure and is explained using the reference numerals and signs shown in FIG. 1 and the like according to necessity.

As shown in FIG. 10, an information recording medium 3a in this embodiment is an information recording medium including at least the substrate 1 and the recording layer 2. In the information recording medium, the recording regions 4' are arrayed in an island shape in the recording layer 2 having thickness t2 and a part or all of the recording region 4' is formed of a recording material. The information recording medium further includes, between the substrate 1 and the recording layer 2, a resonance enhancing film 34 having thickness t1 formed of a material having a dielectric constant with a real part of which sign is negative with respect to the wavelength of the irradiation light 5.

The information device in this embodiment is an information device that records information on or reproduces information from the information recording medium 3a. The information device includes the light source 14 and the near-field light generating element 9 including the resonating section 22 configured such that plasmon resonance occurs between the resonating section 22 and the recording region 4' of the recording layer 2. The resonating section 22 is arranged close to the recording region 4'. The irradiation light 5 from the light source 14 is irradiated on the near-field light generating element 9. Information is recorded in the recording region 4' using at least a part of the near-field light 7a generated by the resonating section 22. The light source 14 is arranged such that the amplitude of a polarized component in the vertical direction (the Z direction) of the near-field light 7a is larger than the amplitude of a polarized component in the horizontal direction (the Y direction) with respect to the arrangement surface (the XY plane) of the recording regions 4' (see FIG. 1). Alternatively, the information device further includes the polarization control optical element 30 configured to convert a polarization state of the irradiation light 5. The polarization control optical element 30 may convert a polarization direction of the laser light 12 from the light source 14' such that the amplitude of the polarized component in the vertical direction (the Z direction) of the near-field light 7a is larger than the amplitude of the polarized component in the horizontal direction (the Y direction) with respect to the arrangement surface (the XY surface) of the recording regions 4' (see FIG. 6).

The information recording medium 3a in this embodiment includes the resonance enhancing film 34 (a first resonance enhancing film) formed of the material having a dielectric constant with a real part of which sign is negative. Therefore, when the distance between the near-field light generating element 9 and the resonance enhancing film 34 is sufficiently smaller than the wavelength of the irradiation light 5 (e.g., when (WD+t2+t1) is equal to or smaller than 100 nm), the near-field light generating element 9 and the resonance enhancing film 34 can interact with each other, improve an enhancement degree of the plasmon resonance, and increase recording sensitivity in the recording region 4' arranged between the near-field light generating element 9 and the resonance enhancing film 34.

In the recording layer 2, the recording regions 4' are arrayed in an island shape. Consequently, the enhancement of the plasmon resonance by the resonance enhancing film 34 can be more strongly generated. That is, when the recording layer 2 includes, for example, recording regions of a film shape rather than the island shape, since the recording regions spread in the XY plane, near-field light also spreads in the XY direction. As a result, resonance enhancement cannot be successfully performed in very small recording regions. The enhancement of the plasmon resonance by the resonance enhancing film 34 is not generated at sufficient strength.

However, in the recording layer 2, since the recording regions 4' are arrayed in the island shape, the resonating section 22 of the near-field light generating element 9, the resonance enhancing film 34, and the recording regions 4' arrayed in the island shape can closely interact with one another. Therefore, it is possible to more strongly generate the enhancement of the plasmon resonance. As a result, more intense near-field light 7a is concentrated in the recording regions 4' arrayed in the island shape. It is possible to increase the recording sensitivity.

Concerning the reproduction, since the information recording medium 3a includes the resonance enhancing film 34, compared with the information recording medium 3 in the first embodiment, in the information recording medium 3a, the height of the recording regions 4' can be further reduced. It is possible to improve the modulation degree of reproduction. This is considered to be because, since plasmon resonance degrees are different in the recording region 4a' in the recorded state and the recording region 4b' in the unrecorded state, the resonance enhancing film 34 acts on the recording region 4a' in the recorded state, which easily resonates, and can greatly enhance the plasmon resonance with the near-field light generating element 9 and, on the other hand, since the resonance enhancing film 34 does not act much on the recording region 4b' in the unrecorded state, which hardly resonates, and the plasmon resonance is not enhanced, even if the height of the recording regions 4' is greatly reduced, it is possible to improve the modulation degree of reproduction.

The information device in this embodiment includes the photodetector 17a (see FIG. 1 or 7). In this case, the resonating section 22 easily resonates with the recording region 4a' in the recorded state and less easily resonates with the recording region 4b' in the unrecorded state. Therefore, reflected light amount from the near-field light generating element 9 of the irradiated emission light or a transmitted light amount transmitted through the near-field light generating element 9 changes according to a degree of the plasmon resonance between the resonating section 22 and the recording region 4'. The photodetector 17a can detect the reflected light or the transmitted light. The reproducing unit 24 can determine on the basis of a detection signal from the photodetector 17a whether the recording region 4' is in the recorded state or the unrecorded state and reproduce information recorded in the recording region 4'.

At the wavelength of the reproduction light, it is preferable that a sign of a real part of the dielectric constant of the recording material in the recorded state and a sign of a real part of the dielectric constant of the recording material in the unrecorded state are different from each other. Further, at the wavelength of the reproduction light, it is preferable to set one of a real part of the relative dielectric constant of the recording material in the recorded state and a real part of the relative dielectric constant of the recording material in the unrecorded state to be equal to or smaller than −5 and set the other to be larger than −5. In this case, the effect of the resonance enhancing film 34 is greatly improved concerning reproduction.

As shown in FIG. 10, when the working distance WD increases, the near-field light 7a generated from the resonating section 22 of the near-field light generating element 9 spreads in the arrangement surface (XY surface) direction of the recording regions 4'. However, by providing the resonance enhancing film 34, the spread is suppressed and a condensing degree in the recording region 4a' set as a target increases. It is possible to reduce cross-write to the adjacent recording regions 4b' and 4c'. As a result, it is also possible to increase the working distance WD of the near-field light generating element 9.

If the resonance enhancing film 34 is formed of a material having a dielectric constant with a real part of which sign is negative with respect to the wavelength of the irradiation light 5, the resonance enhancing film 34 has an effect of enhancing the plasmon resonance. It is preferable that a real part of the relative dielectric constant of the material forming the resonance enhancing film 34 is equal to or smaller than −5. In this case, it is possible to further improve the enhancement degree of the plasmon resonance.

It is preferable that the resonance enhancing film 34 and the near-field light generating element 9 are formed of materials including the same main component, for example, Ag. When the resonance enhancing film 34 and the near-field light generating element 9 are formed of the materials including the same main component, the resonance enhancing film 34 and the near-field light generating element 9 interact with each other in the same manner. It is easy to improve the enhancement degree of the plasmon resonance. Note that the main component indicates a component of a material having a largest volume ratio that forms the resonance enhancing film 34 and the near-field light generating element 9.

In this embodiment, for example, as the resonance enhancing film 34, a metal film obtained by forming, with sputtering, evaporation, or the like, on the substrate 1, a thin film of Ag in which the wavelength $\lambda$, of the irradiation light 5 is set to 780 nm and a real part of the relative dielectric constant thereof is equal to or smaller than −5 (e.g., −24). In order to prevent corrosion, a compound of Ag such as AgPdCu, AgBi, or AgGaCu added with a small amount of other kinds of metal may be used. As the resonance enhancing film 34, it is also possible to use a metal film having a dielectric constant with a real part of which sign is negative at the wavelength $\lambda$ of the irradiation light 5 or a chalcogenide semiconductor film in a crystalline state having a dielectric constant with a real part of which sign is negative at the wavelength $\lambda$ of the irradiation light 5. In particular, as the wavelength of the irradiation light 5, for example, in a range of wavelengths of red to infrared satisfying 600 nm$\leq\lambda\leq$1000 nm in which absorption of the near-field light generating element 9 can be reduced, Ag and a compound of Ag were the best. When Cu or Au was used as a material, the effect of the resonance enhancing film 34 was second-largest.

For example, t1=8 nm was used as the thickness of the resonance enhancing film 34. In the case of the recording, when the thickness was set relatively large to, for example, 3 nm$\leq$t1$\leq$100 nm, the plasmon resonance degree tended to be improved. On the other hand, in the case of the reproduction, when the thickness was set relatively small to, for example, 2 nm$\leq$t1$\leq$25 nm, a difference in the plasmon resonance increased between the recorded state and the unrecorded state and the modulation degree of reproduction tended to be improved. Therefore, in order to improve the characteristics of recording and reproduction, it is preferable that the thickness of the resonance enhancing film 34 is 3 nm$\leq$t1$\leq$25 nm.

The recording regions 4' are formed in a protection film 23 having a dielectric constant with a real part of which sign is positive with respect to the wavelength of the irradiation light 5.

The shape of the recording regions 4' is a spherical shape. The upper surface of the protection film 23 is a flat shape. By setting the shape of the recording regions 4' to the spherical shape or a shape having an arcuate cross section close to the spherical shape, it is possible to improve a condensing degree or a concentration degree of the near-field light 7a in the recording region 4' that should be recorded.

By setting the upper surface of the protection film 23 to the flat shape, since unevenness of the surface of the information recording medium 3a is eliminated, there is an effect of reducing contact of the near-field light generating element 9 and the information recording medium 3a due to the unevenness. By forming the recording regions 4' including the recording material in the protection film 23, it is possible to improve resistance to environment of the recording material. Further, since the sign of the real part of the dielectric constant of the protection film 23 is positive, there is an effect of preventing unnecessary plasmon resonance between the protection film 23 and the resonating section 22 from occurring. As a result, there is an effect of preventing a decrease in a modulation degree of reproduction due to an adverse effect from the protection film 23.

As the protection film 23 having a dielectric constant with a real part of which sign is positive, inorganic materials of one or a plurality of oxides or the like selected out of, for example, $ZrSiO_4$, $(ZrO_2)_{25}(SiO_2)_{25}(Cr_2O_3)_{50}$, SiCr, $TiO_2$, $ZrO_2$, $HfO_2$, ZnO, $Nb_2O_5$, $Ta_2O_5$, $SiO_2$, $SnO_2$, $Al_2O_3$, $Bi_2O_3$, $Cr_2O_3$, $Ga_2O_3$, $In_2O_3$, $Sc_2O_3$, $Y_2O_3$, $La_2O_3$, $Gd_2O_3$, $Dy_2O_3$, $Yb_2O_3$, CaO, MgO, $CeO_2$, and $TeO_2$ can be used. One or a plurality of nitrides selected out of, for example, C—N, Ti—N, Zr—N, Nb—N, Ta—N, Si—N, Ge—N, Cr—N, Al—N, Ge—Si—N, and Ge—Cr—N can also be used.

As the protection film 23 having a dielectric constant with a real part of which sign is positive, sulfides such as ZnS, carbides such as SiC, and fluorides such as $LaF_3$, $CeF_3$, and $MgF_2$ can also be used. The protection film 23 may be formed using a mixture of one or a plurality of materials selected out of the materials. Further, an organic material such as resin may be used as the protection film 23. In this case, there is an effect that a shock during collision can be reduced more than the inorganic materials explained above. A mixed material of the organic material and the inorganic material may be used.

In the information recording medium 3a in this embodiment, for example, the resonance enhancing film 34 is formed of AgPdCu having thickness of 8 nm and including Ag as a main component. The recording regions 4' are formed of a phase change material $Ge_{10}Sb_{90}$. The diameter of the recording regions 4' is 20 nm and the height h of the recording regions 4' is 20 nm. The near-field light generating element 9 is formed of AgPdCu including Ag as a main component. The near-field light generating element 9 has a triangular shape, the length in the longitudinal direction of which is 130 nm, the thickness of which is 24 nm, and the area of the flat section of which is 4000 $nm^2$. When a recording and reproducing wavelength was $\lambda$=780 nm and the working distance WD was 20 nm, the reflectance from the near-field light generating element 9 in the case of the crystalline recording region 4' was 4.8% and the reflectance in the amorphous recording regions 4' was 3.9%. As a result, a change amount of the reflectance was 0.9% and a modulation degree of reproduction was 19%.

In this embodiment, as in the first embodiment, since the near-field light generating element 9 has the configuration for both recording and reproduction, the recording sensitivity of the recording regions 4' is sometimes higher in crystal in which plasmon resonance enhancement largely occurs. Therefore, it is preferable to perform intensity control for the recording light taking into account a sensitivity difference in a phase state (crystal or amorphous) of the recording regions 4' before recording.

A method for producing the information recording medium 3a in this embodiment is explained. The method for producing the information recording medium 3a in this embodiment is a method for producing an information recording medium including the substrate 1. The method includes a step of forming the recording layer 2 which includes the recording regions 4' including a recording material and arrayed in an island shape and a step of forming, between the substrate 1 and the recording layer 2, the resonance enhancing film 34 that includes a material having a dielectric constant with a real part of which sign is negative, and is configured to enhance plasmon resonance.

With the producing method, it is possible to produce the information recording medium 3a including the resonance enhancing film 34 formed of the material having a dielectric constant with a real part of which sign is negative. Consequently, the near-field light generating element 9, the resonance enhancing film 34, and the recording region 4' interact with one another and can improve the enhancement degree of the plasmon resonance.

Next, another form in the second embodiment of the present invention is explained. As shown in FIG. 11, an information recording medium 3b of the other form in this embodiment has a structure in which the resonance enhancing film 34 having thickness t1 and a dielectric film 26 having thickness t3 are formed in this order on the substrate 1 and the recording regions 4" of a bell shape having thickness h are formed on the dielectric film 26 as the recording layer 2. In this case, compared with the information recording medium 3a, it is easy to form the recording regions 4". For the dielectric film 26, a material same as the material of the protection film 23 can be used. As thickness t3 of the dielectric film 26, about several nm to 10 nm is preferable. By providing the dielectric film 26, there is an effect of preventing migration of the resonance enhancing film 34 and the recording regions 4".

A thin film of a chalcogenide semiconductor may be used instead of the dielectric film 26. In this case, there is an effect of accelerating crystallization of the recording region 4b" in the unrecorded state in contact with the thin film and improving recording sensitivity and recording speed.

FIG. 12 shows an information recording medium 3c of still another form. The information recording medium 3c has a structure in which a protection film 23' is formed thin on the bell-shaped recording regions 4" to correspond to the bell-shaped recording regions 4". By providing the protection film 23' on the recording region 4", there is an effect of improving the resistance to environment of a recording material. In this case, the protection film 23' only has to be deposited. Therefore, it is easy to form the protection film 23'.

FIG. 13 shows an information recording medium 3d of still another form. The information recording medium 3d has a structure in which the protection film 23 having a flat surface is formed on the bell-shaped recording regions 4". In this case, after forming the protection film 23 thick to a certain degree, it is necessary to planarize the surface of the protection film 23 with polishing, planarization etching, or the like. However, since unevenness of the surface of the information recording medium 3d is eliminated, it is possible to reduce contact of the near-field light generating element 9 and the information recording medium 3d due to the unevenness.

(Third Embodiment)

Next, concerning an information device and an information recording medium in a third embodiment of the present invention, differences from the information device and the information recording medium in the second embodiment are mainly explained with reference to FIGS. 14 to 18.

Figure 14:
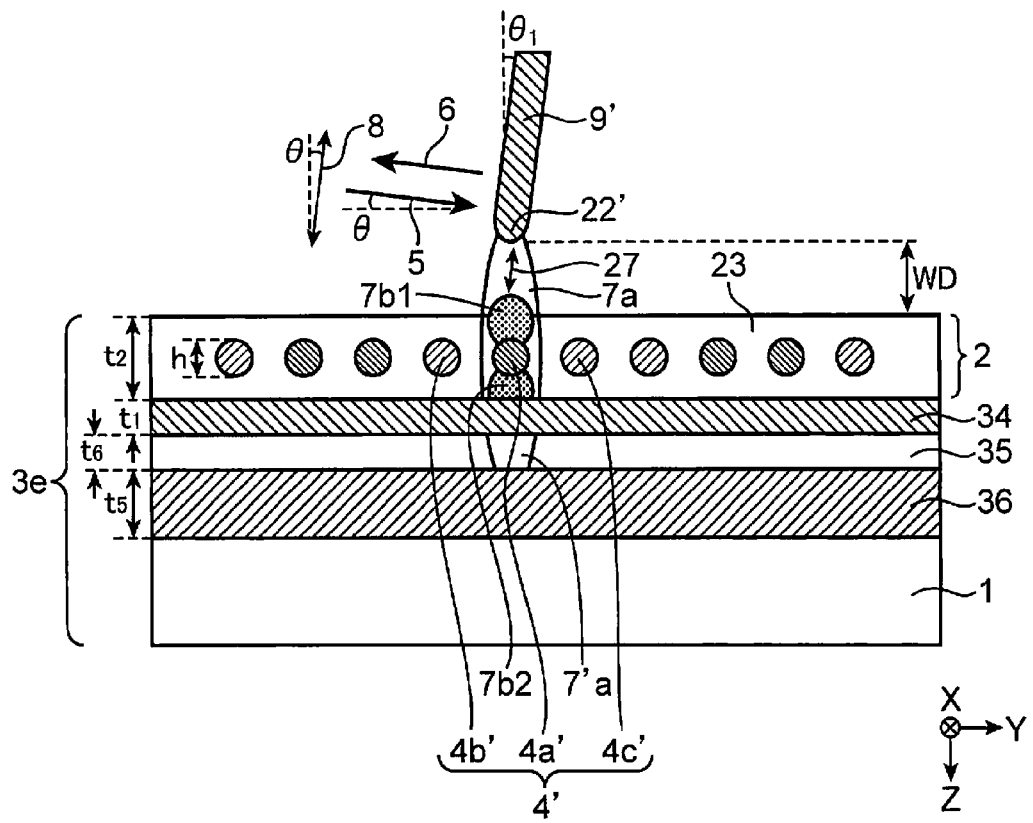
FIG. 14 is an explanatory diagram showing the configuration of an information recording medium and a state in which information is recorded on or reproduced from the information recording medium in a third embodiment of the present invention.
Figure 15:
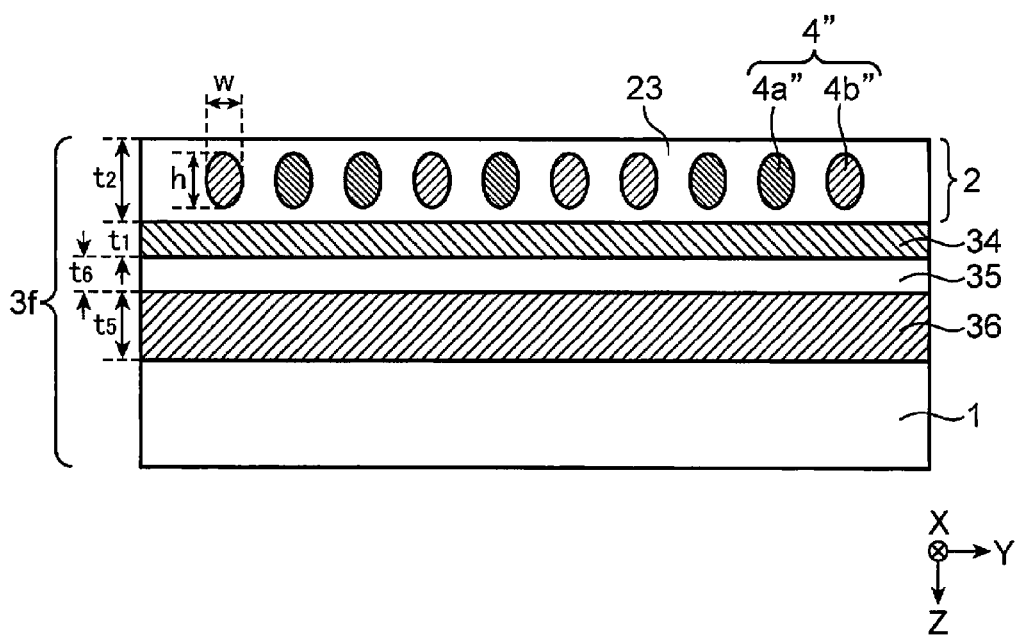
FIG. 15 is a sectional view showing the configuration of an information recording medium of another form in the third embodiment of the present invention.
Figure 16:
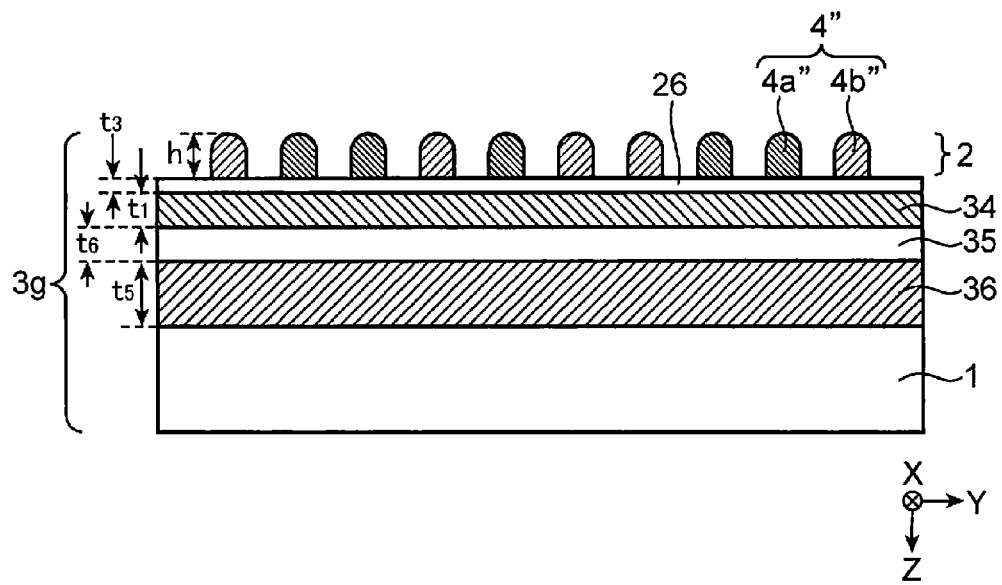
FIG. 16 is a sectional view showing the configuration of an information recording medium of still another form in the third embodiment of the present invention.
Figure 17:
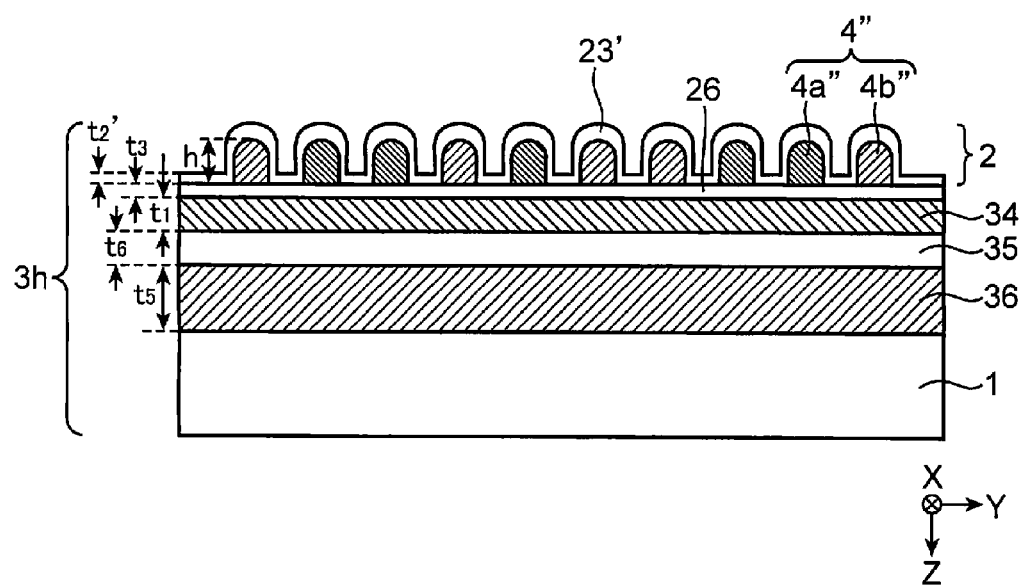
FIG. 17 is a sectional view showing the configuration of an information recording medium of still another form in the third embodiment of the present invention.
Figure 18:
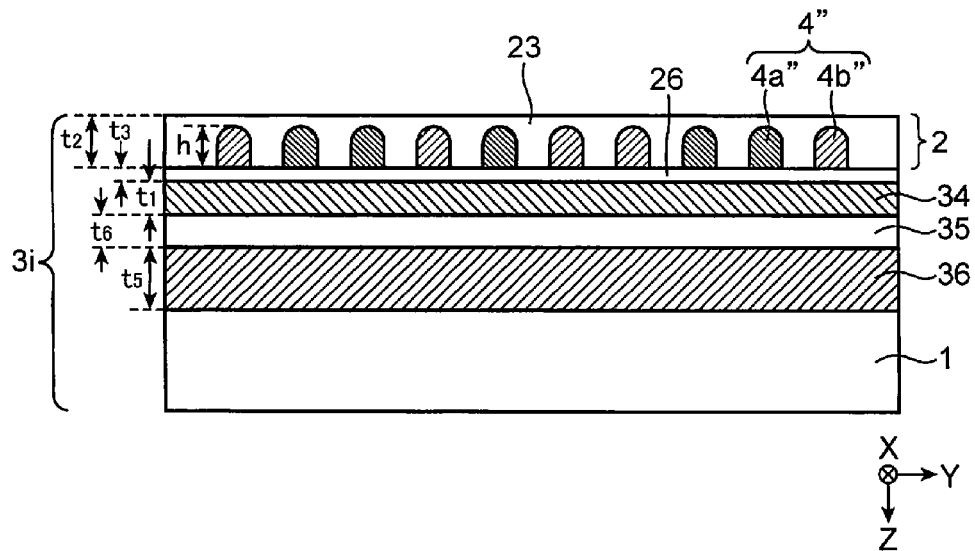
FIG. 18 is a sectional view showing the configuration of an information recording medium of still another form in the third embodiment of the present invention.

FIG. 14 is an explanatory diagram showing the configuration of the information recording medium and a state in which information is recorded on or reproduced from the information recording medium in the third embodiment of the present invention. FIG. 15 is a sectional view showing the configuration of an information recording medium of another form in the third embodiment of the present invention. FIG. 16 is a sectional view showing the configuration of an information recording medium of still another form in the third embodiment of the present invention. FIG. 17 is a sectional view showing the configuration of an information recording medium of still another form in the third embodiment of the present invention. FIG. 18 is a sectional view showing the configuration of an information recording medium of still another form in the third embodiment of the present invention. Note that the configuration of the information device in this embodiment is the same as the configuration of the information device shown in FIG. 1 and the like. Therefore, the configuration is not shown in the figure and is explained using the reference numerals and signs shown in FIG. 1 and the like according to necessity.

As shown in FIG. 14, an information recording medium 3e in this embodiment is an information recording medium including at least the substrate 1 and the recording layer 2. In the information recording medium 3e, the recording regions 4' are arrayed in an island shape in the recording layer 2 having thickness t2. A part or all of the recording region 4' is formed of a recording material. The information recording medium 3e further includes, between the substrate 1 and the recording layer 2, a resonance confining film 36 formed of a material having a dielectric constant with a real part of which sign is negative with respect to the wavelength of the irradiation light 5, an intermediate film 35 formed of a material having a dielectric constant with a real part of which sign is positive with respect to the wavelength, and the resonance enhancing film 34 formed of a material having a dielectric constant with a real part of which sign is negative with respect to the wavelength, from the substrate 1 side in this order.

The information device in this embodiment is an information device that records information on and reproduces information from the information recording medium 3e. The information device includes the light source 14 and a near-field light generating element 9' including a resonating section 22' configured such that plasmon resonance occurs between the resonating section 22' and the recording region 4' of the recording layer 2. The resonating section 22' is arranged close to the recording region 4'. The irradiation light 5 from the light source 14 is irradiated on the near-field light generating element 9'. Information is recorded in the recording region 4' using at least a part of the near-field light 7a generated by the resonating section 22'. The light source 14 is arranged such that the amplitude of a polarized component in the vertical direction (the Z direction) of the near-field light 7a is larger than the amplitude of a polarized component in the horizontal direction (the Y direction) with respect to the arrangement surface (the XY plane) of the recording regions 4' (see FIG. 1). Alternatively, the information device may further include the polarization control optical element 30 configured to convert a polarization state of the irradiation light 5. The polarization control optical element 30 may convert a polarization direction of the laser light 12 from the light source 14' such that the amplitude of the polarized component in the vertical direction (the Z direction) of the near-field light 7a is larger than the amplitude of the polarized component in the horizontal direction (the Y direction) with respect to the arrangement surface (the XY plane) of the recording regions 4' (see FIG. 6).

The information recording medium 3e in this embodiment is different from the information recording medium 3a in the second embodiment in that the information recording medium 3e includes, between the substrate 1 and the resonance enhancing film 34, the resonance confining film 36 (a second resonance enhancing film) having thickness t5 formed of the material having a dielectric constant with a real part of which sign is negative with respect to the wavelength of the irradiation light 5, and the intermediate film 35 having thickness t6 formed of the material having a dielectric constant with a real part of which sign is positive with respect to the wavelength of the irradiation light 5 and that a distal end portion of the resonating section 22' of the near-field light generating element 9' is formed in a shape having a curvature such as an arcuate cross section.

The information recording medium 3e includes the intermediate film 35 and the resonance confining film 36 in addition to the resonance enhancing film 34. Therefore, when the distance between the near-field light generating element 9' and the resonance enhancing film 34 and the resonance confining film 36 is sufficiently smaller than the wavelength of the irradiation light 5 (e.g., (WD+t2+t1+t6+t5) is equal to or smaller than 100 nm), not only the near-field light generating element 9' and the resonance enhancing film 34 interact with each other but also the resonance enhancing film 34 and the resonance confining film 36 interact with each other via the intermediate film 35. Near-field light 7'a is generated in the intermediate film 35. As a result, it is possible to further improve the enhancement degree of the plasmon resonance and further increase recording sensitivity to the recording region 4' arranged between the near-field light generating element 9' and the resonance enhancing film 34.

Concerning the reproduction, the interaction of the resonance enhancing film 34 and the resonance confining film 36 across the intermediate film 35 is added. It is possible to further improve the modulation degree of reproduction than the information recording medium 3a in the second embodiment. This is considered to be because, since plasmon resonance degrees are different between the recording region 4a' in the recorded state and the unrecorded state 4b', the resonance enhancing film 34 and the resonance confining film 36 across the intermediate film 35 act on the recording region 4a' in the recorded state, which easily resonated, and can further enhance the plasmon resonance with the near-field light generating element 9' and, on the other hand, the resonance enhancing film 34 and the resonance confining film 36 do not act much on the recording region 4b' in the unrecorded state, which less easily resonate, and the plasmon resonance is not enhanced, it is possible to further improve the modulation degree of reproduction.

At the wavelength of the reproduction light, it is preferable that a sign of a real part of the dielectric constant of the recording material in the recorded state and a sign of a real part of the dielectric constant of the recording material in the unrecorded state are different from each other. Further, at the wavelength of the reproduction light, it is preferable to set one of a real part of the relative dielectric constant of the recording material in the recorded state and a real part of the relative dielectric constant of the recording material in the unrecorded state to be equal to or smaller than −5 and set the other to be larger than −5. In this case, the effect of the resonance enhancing film 34 and the resonance confining film 36 across the intermediate film 35 is greatly improved with respect to reproduction.

As shown in FIG. 14, when the working distance WD increases, the near-field light 7a generated from the resonating section 22' of the near-field light generating element 9' spreads in the arrangement surface (XY surface) direction of the recording regions 4'. However, by providing the resonance enhancing film 34, the intermediate film 35, and the resonance confining film 36, the spread is further suppressed and a condensing degree in the recording region 4a' set as a target increases. Therefore, it is possible to reduce cross-write to the adjacent recording regions 4b' and 4c'. As a result, it is also possible to increase the working distance WD of the near-field light generating element 9'.

If the resonance enhancing film 34 and the resonance confining film 36 are formed of the material having a dielectric constant with a real part of which sign is negative with respect to the wavelength of the irradiation light 5, as explained above, the resonance enhancing film 34 and the resonance confining film 36 have an effect of enhancing the plasmon resonance. It is preferable that a real part of the relative dielectric constant of the material forming the resonance enhancing film 34 and the resonance confining film 36 is equal to or smaller than −5. In this case, it is possible to further improve the enhancement degree of the plasmon resonance.

It is preferable that the resonance enhancing film 34, the resonance confining film 36, and the near-field light generating element 9' are formed of materials including the same main component, for example, Ag. When the resonance enhancing film 34, the resonance confining film 36, and the near-field light generating element 9' are formed of the materials including the same main component, the resonance enhancing film 34, the resonance confining film 36, and the near-field light generating element 9' interact with one another in the same manner. It is easy to improve the enhancement degree of the plasmon resonance. Note that the main component indicates a component of a material having a largest volume ratio that forms the resonance enhancing film 34, the resonance confining film 36, and the near-field light generating element 9'.

In this embodiment, for example, as the resonance enhancing film 34, the intermediate film 35, and the resonance confining film 36, the resonance confining film 36 having thickness t5=20 nm is formed by forming, with sputtering, evaporation, or the like, on the substrate 1, a thin film of Ag in which the wavelength 2 of the emission light is set to 780 nm and a real part of the relative dielectric constant thereof is equal to or smaller than −5 (e.g., −24), the intermediate film 35 having thickness t6=4 nm is formed by forming, in the same manner, a dielectric film of $SiO_2$ or the like having a dielectric constant with a real part of which sign is positive, on the resonance confining film 36, and the resonance enhancing film 34 having thickness t6=8 nm is formed by forming, in the same manner, a thin film of Ag having a dielectric constant with a real part of which sign is equal to or smaller than −5, on the intermediate film 35. Note that, in order to prevent corrosion, a compound of Ag such as AgPdCu, AgBi, or AgGaCu added with a small amount of other kinds of metal may be used for the thin film of Ag.

As the resonance enhancing film 34 and the resonance confining film 36, it is also possible to use a metal film having a dielectric constant with a real part of which sign is negative at the wavelength $\lambda$ of the irradiation light 5 or a chalcogenide semiconductor film in a crystalline state having a dielectric constant with a real part of which sign is negative at the wavelength $\lambda$ of the irradiation light 5. In particular, as the wavelength of the irradiation light 5, for example, in a range of wavelengths of red to infrared satisfying 600 nm≤$\lambda$≤1000 nm in which absorption of the near-field light generating element 9' can be reduced, Ag and a compound of Ag were the best. When Cu or Au was used as a material, the effect of the resonance enhancing film 34 and the resonance confining film 36 was second-largest.

The thicknesses of the resonance enhancing film 34, the intermediate film 35, and the resonance confining film 36 are respectively set to, for example, t1=8 nm, t6=4 nm, and t5=20 nm. However, in order to allow resonance enhancement to easily occur, it is desirable that the thickness t1 of the resonance enhancing film 34 is smaller than the thickness t5 of the resonance confining film 36 (t1<t5). In order to improve the characteristics of recording and reproduction, it is preferable that ranges of the respective film thicknesses are 3 nm≤t1≤14 nm, 2 nm≤t6≤30 nm, and 10 nm≤t5≤30 nm. In the ranges, a preferred combination of the film thicknesses is present according to the specifications of the information recording medium 3e and the near-field light generating element 9'.

As the intermediate film 35, a dielectric film same as the protection film 23 can be used. As the intermediate film 35 having a dielectric constant with a real part of which sign is positive, inorganic materials of one or a plurality of oxides or the like selected out of, for example, $ZrSiO_4$, $(ZrO_2)_{25}(SiO_2)_{25}(Cr_2O_3)_{50}$, SiCr, Tin $ZrO_2$, ZnO, $Nb_2O_5$, $Ta_2O_5$, $SiO_2$, $Al_2O_3$, $Bi_2O_3$, $Cr_2O_3$, $Ga_2O_3$, $In_2O_3$, $Sc_2O_3$, $Y_2O_3$, $La_2O_3$, $Gd_2O_3$, $Dy_2O_3$, $Yb_2O_3$, CaO, MgO, $CeO_2$, and $TeO_2$ can be used. One or a plurality of nitrides selected out of, for example, C—N, Ti—N, Zr—N, Nb—N, Ta—N, Si—N, Ge—N, Cr—N, Al—N, Ge—Si—N, and Ge—Cr—N can also be used.

Sulfides such as ZnS, carbides such as SiC, and fluorides such as $LaF_3$, $CeF_3$, and $MgF_2$ can also be used. The intermediate film 35 may be formed using a mixture of one or a plurality of materials selected out of the materials. Further, an organic material such as resin may be used as the intermediate film 35. A mixed material of the organic material and the inorganic material may be used.

The distal end of the resonating section 22' of the near-field light generating element 9' is formed in a shape having a curvature. Therefore, there is an effect that it is easy to produce the near-field light generating element 9' and the plasmon resonance easily occurs. The curvature of the distal end portion of the resonating section 22' is desirably equivalent to the curvature of the recording regions 4'. This is because the plasmon resonance efficiently occurs.

In the information recording medium 3e in this embodiment, for example, the thicknesses of the resonance enhancing film 34 and the resonance confining film 36 are respectively t1=8 nm and t5=20 nm. Both of the resonance enhancing film 34 and the resonance confining film 36 are formed of AgPdCu including Ag as a main component. The intermediate film 35 is formed of $SiO_2$, the thickness of which is t6=4 nm. The recording regions 4' are formed of a phase change material $Ge_{10}Sb_{90}$. The diameter of the recording regions 4' is 20 nm and the height h of the recording regions 4' is 20 nm. The near-field light generating element 9' is formed of AgPdCu including Ag as a main component and has a triangular shape, the length in the longitudinal direction of which is 120 nm, the thickness of which is 24 nm, and the area of the flat section of which is 3700 $nm^2$. When a recording and reproducing wavelength was $\lambda$=780 nm and the working distance WD was 20 nm, the reflectance from the near-field light generating element 9' in the case of the crystalline recording region 4' was 4.9% and the reflectance in the amorphous recording regions 4' was 3.6%. As a result, a change amount of the reflectance was 1.3% and a modulation degree of reproduction was 27%.

Preferred length in the longitudinal direction of the near-field light generating element 9' in this embodiment tended to be smaller than preferred length in the longitudinal direction of the near-field light generating element 9 in the second embodiment. This is considered to be because the thickness t5 of the resonance confining film 36 affects the entire plasmon resonance and the preferred length of the near-field light generating element 9' decreases.

In this embodiment, as in the first and second embodiments, since the near-field light generating element 9' has the configuration for both recording and reproduction, the recording sensitivity of the recording regions 4' is sometimes higher in crystal in which plasmon resonance enhancement largely occurs. Therefore, it is preferable to perform intensity control for the recording light taking into account a sensitivity difference in a phase state (crystal or amorphous) of the recording regions 4' before recording.

A method for producing the information recording medium 3e in this embodiment is explained. The method for producing the information recording medium 3e shown in FIG. 14 further includes, in addition to the method for producing the information recording medium 3a shown in FIG. 10, a step of forming, between the substrate 1 and the resonance enhancing film 34, the resonance confining film (a second resonance enhancing film) 36 that includes a material having a dielectric constant with a real part of which sign is negative, and is configured to enhance the plasmon resonance, and a step of forming, between the resonance enhancing film 34 and the resonance confining film 36, the intermediate film 35 including a material having a dielectric constant with a real part of which sign is positive.

With the producing method, it is possible to produce the information recording medium 3e including the intermediate film 35 and the resonance confining film 36 in addition to the resonance enhancing film 34. Consequently, in addition to the interaction of the resonance enhancing film 34, the resonance enhancing film 34 and the resonance confining film 36 interact with each other via the intermediate film 35 and can further improve the enhancement degree of the plasmon resonance.

Next, another form in the third embodiment of the present invention is explained. As shown in FIG. 15, an information recording medium 3f of the other form in this embodiment has a structure in which the resonance confining film 36 having the thickness t5, the intermediate film 35 having the thickness t6, and the resonance enhancing film 34 having the thickness t1 are formed in this order on the substrate 1 and the protection film 23 embedded with the recording regions 4" of a vertically long ellipsoid having height h and width w is formed on the resonance enhancing film 34 as the recording layer 2. In this case, the recording regions 4" having a vertically long ellipsoidal shape, a ratio of the height h and the width w of which is, for example, about 1.5 to 3.0 is arranged on the arrangement surface of the recording regions 4", whereby the plasmon resonance more easily occurs and it is possible to improve the recording sensitivity and a reproduction modulation degree. Note that, since the effect of the height h works on the arrangement surface of the recording regions 4, there is an effect if the vertically long ellipsoidal shape is a substantially vertically long shape even if the vertically long ellipsoidal shape is different a little.

A information recording medium 3g of still another form in the third embodiment of the present invention has a structure in which, as shown in FIG. 16, the resonance confining film 36 having the thickness t5, the intermediate film 35 having the thickness t6, the resonance enhancing film 34 having the thickness t1, and the dielectric film 26 having the thickness t3 are formed in this order on the substrate 1 and the recording regions 4" of a bell-shape having height h are formed on the dielectric film 26 as the recording layer 2. In this case, it is easy to form the recording regions 4" compared with the information recording medium 3e shown in FIG. 14. For the dielectric film 26, a material same as the material of the protection film 23 can be used. As the film thickness t3, about several nm to 10 nm is preferable. By providing the dielectric film 26, there is an effect of preventing migration of the resonance enhancing film 34 and the recording regions 4".

A thin film of a chalcogenide semiconductor may be used instead of the dielectric film 26. In this case, there is an effect of accelerating crystallization of the recording region 4b" in the unrecorded state in contact with the thin film and improving the recording sensitivity and the recording speed.

FIG. 17 shows an information recording medium 3h of still another form. The information recording medium 3h has a structure in which the protection film 23' is formed thin on the bell-shaped recording regions 4" to correspond to the bell-shaped recording regions 4". By providing the protection film 23' on the recording region 4", there is an effect of improving the resistance to environment of a recording material. In this case, the protection film 23' only has to be deposited. Therefore, it is easy to form the protection film 23'.

FIG. 18 shows an information recording medium 3i of still another form. The information recording medium 3i has a structure in which the protection film 23 having a flat surface is formed on the bell-shaped recording regions 4''. In this case, after forming the protection film 23 thick to a certain degree, it is necessary to planarize the surface of the protection film 23 with polishing, planarization etching, or the like. However, since unevenness of the surface of the information recording medium 3i is eliminated, it is possible to reduce contact of the near-field light generating element 9' and the information recording medium 3i due to the unevenness.

(Fourth Embodiment)

Next, concerning an information device and an information recording medium in a fourth embodiment of the present invention, differences from the information recording medium in the second embodiment are mainly explained with reference to FIGS. 19 to 21.

Figure 19:
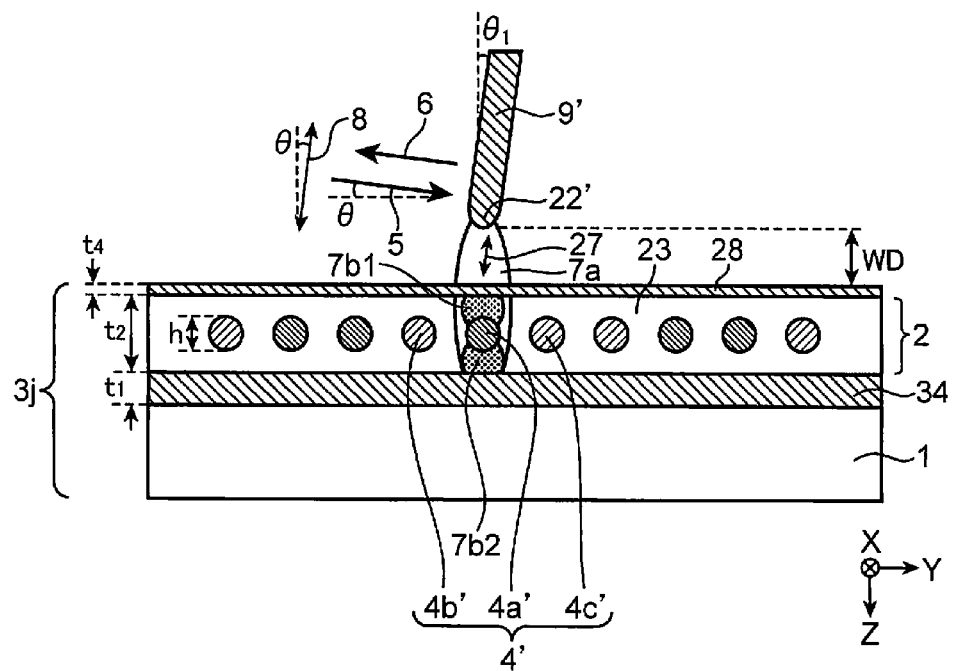
FIG. 19 is an explanatory diagram showing the configuration of an information recording medium and a state in which information is recorded on or reproduced from the information recording medium in a fourth embodiment of the present invention.

FIG. 19 is an explanatory diagram showing the configuration of the information recording medium and a state in which information is recorded on or reproduced from the information recording medium in the fourth embodiment of the present invention. FIG. 20 is a sectional view showing the configuration of an information recording medium of another form in the fourth embodiment of the present invention. FIG. 21 is a sectional view showing the configuration of an information recording medium of still another form in the fourth embodiment of the present invention. Note that the configuration of the information device in this embodiment is the same as the configuration of the information device shown in FIG. 1 and the like. Therefore, the configuration is not shown in the figure and is explained using the reference numerals and signs shown in FIG. 1 and the like according to necessity.

As shown in FIG. 19, an information recording medium 3j in this embodiment has a configuration substantially the same as the configuration of the information recording medium 3a in the second embodiment. However, the information recording medium 3j is different from the information recording medium 3a in that a resonance control film 28 having thickness t4 formed of a material having a dielectric constant with a real part of which sign is negative with respect to the wavelength of the irradiation light 5, is formed on an upper layer of the recording region 4' close to the resonating section 22'.

The information device in this embodiment is an information device that records information on or reproduces information from the information recording medium 3j. The information device includes the light source 14 and the near-field light generating element 9' including the resonating section 22' configured such that plasmon resonance occurs between the resonating section 22' and the recording region 4' of the recording layer 2. The resonating section 22' is arranged close to the recording region 4'. The irradiation light 5 from the light source 14 is irradiated on the near-field light generating element 9'. Information is recorded in the recording region 4' using at least a part of the near-field light 7a generated by the resonating section 22'. The light source 14 is arranged such that the amplitude of a polarized component in the vertical direction (the Z direction) of the near-field light 7a is larger than the amplitude of a polarized component in the horizontal direction (the Y direction) with respect to the arrangement surface (the XY plane) of the recording regions 4' (see FIG. 1). Alternatively, the information device further includes the polarization control optical element 30 configured to convert a polarization state of the irradiation light 5. The polarization control optical element 30 may convert a polarization direction of the laser light 12 from the light source 14' such that the amplitude of the polarized component in the vertical direction (the Z direction) of the near-field light 7a is larger than the amplitude of the polarized component in the horizontal direction (the Y direction) with respect to the arrangement surface (the XY surface) of the recording regions 4' (see FIG. 6).

In this embodiment, as in the first to third embodiments, the enhancement degree of the plasmon resonance is improved by the interaction of the near-field light generating element 9' and the resonance enhancing film 34. However, the resonance control film 28 has a function of controlling the plasmon resonance. That is, when the working distance WD increases, the near-field light 7a generated from the resonating section 22' at the distal end of the near-field light generating element 9' spreads in the arrangement surface (XY surface) direction of the recording regions 4'. However, the resonance control film 28 formed of a material having a dielectric constant with a real part of which sign is negative, is provided between the near-field light generating element 9' and the resonance enhancing film 34, whereby the spread is further suppressed and a condensing degree in the recording region 4a' set as a target increases. Therefore, it is possible to reduce cross-write to the adjacent recording regions 4b' and 4c'. As a result, it is also possible to increase the working distance WD between the near-field light generating element 9' and the information recording medium 3j.

The resonance control film 28 has thickness smaller than the thickness of the resonance enhancing film 34. For example, $t4=2$ nm is set, which is one fourth of the thickness $t1=8$ nm of the resonance enhancing film 34. When $t4<t1$ is satisfied, as the thickness of the resonance control film 28, for example, $1 \leq t4 \leq 10$ nm is a preferable range. As the thickness of the resonance enhancing film 34, for example, $3\text{ nm} \leq t1 \leq 30$ nm is a preferable range. In this case, the plasmon resonance is not unnecessarily enhanced between the near-field light generating element 9' and the resonance control film 28. Therefore, it is possible to prevent a decrease in recording sensitivity without hindering the interaction of the plasmon resonance between the resonance enhancing film 34 and the near-field light generating element 9'.

In the case of $t4 \geq t1$, the plasmon resonance is enhanced between the near-field light generating element 9' and the resonance control film 28. Therefore, the interaction of the plasmon resonance between the resonance enhancing film 34 and the near-field light generating element 9' is adversely affected and the recording sensitivity decreases.

It is preferable that the resonance enhancing film 34, the resonance control film 28, and the near-field light generating element 9' are formed of materials including the same main component, for example, Ag. Since the resonance enhancing film 34, the resonance control film 28, and the near-field light generating element 9' interact with one another in the same manner, it is easy to improve the enhancement degree and controllability of the plasmon resonance.

A method for producing the information recording medium 3j in this embodiment is explained. The method for producing the information recording medium 3j shown in FIG. 19 further includes, in addition to the method for producing the information recording medium 3a shown in FIG. 10, a step of forming, on the opposite side of the recording regions 4' to the substrate 1, the resonance control film 28 including the material having a dielectric constant with a real part of which sign is negative.

With the producing method, it is possible to produce the information recording medium 3j including the resonance control film 28 formed of the material having a dielectric constant with a real part of which sign is negative. Consequently, the spread of the near-field light is further suppressed. Therefore, a concentration degree in the recording region 4a' set as a target increases and cross-write to the adjacent recording regions 4b' and 4c' is reduced. Further, it is possible to further increase the working distance WD between the near-field light generating element 9' and the information recording medium 3j.

Next, another form in the fourth embodiment of the present invention is explained. As shown in FIG. 20, an information recording medium 3k of the other form in this embodiment has a configuration same as the configuration of the information recording medium 3d shown in FIG. 13 and further has a structure in which the resonance control film 28 is formed on the protection film 23.

Figure 20:
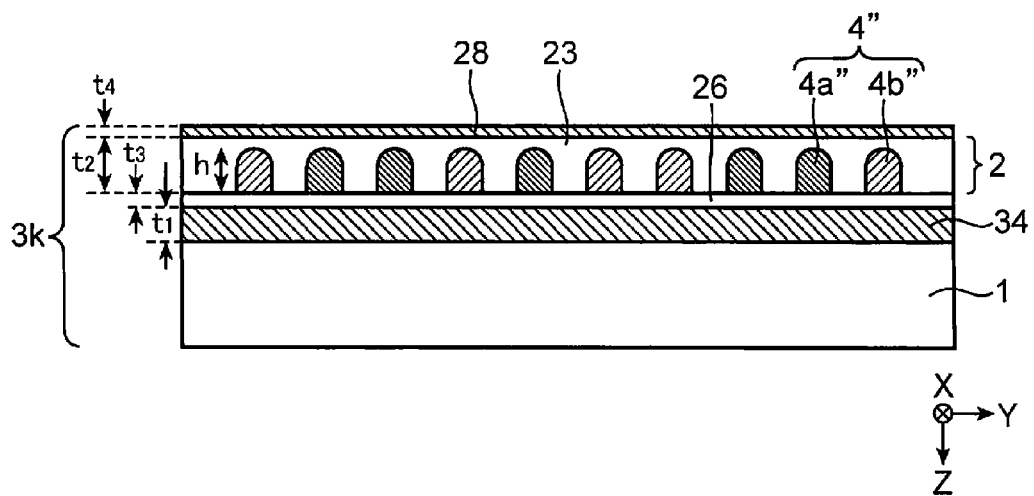
FIG. 20 is a sectional view showing the configuration of an information recording medium of another form in the fourth embodiment of the present invention.

The structure shown in FIG. 20 is a structure for directly forming the recording regions 4" on the dielectric film 26 formed on the substrate 1. Therefore, it is easier to produce the information recording medium 3k than the information recording medium 3j shown in FIG. 19. A thin film of a chalcogenide semiconductor may be used instead of the dielectric film 26. In this case, there is an effect of accelerating crystallization of the recording region 4b" in the unrecorded state in contact with the thin film and improving the recording sensitivity and the recording speed.

Figure 21:
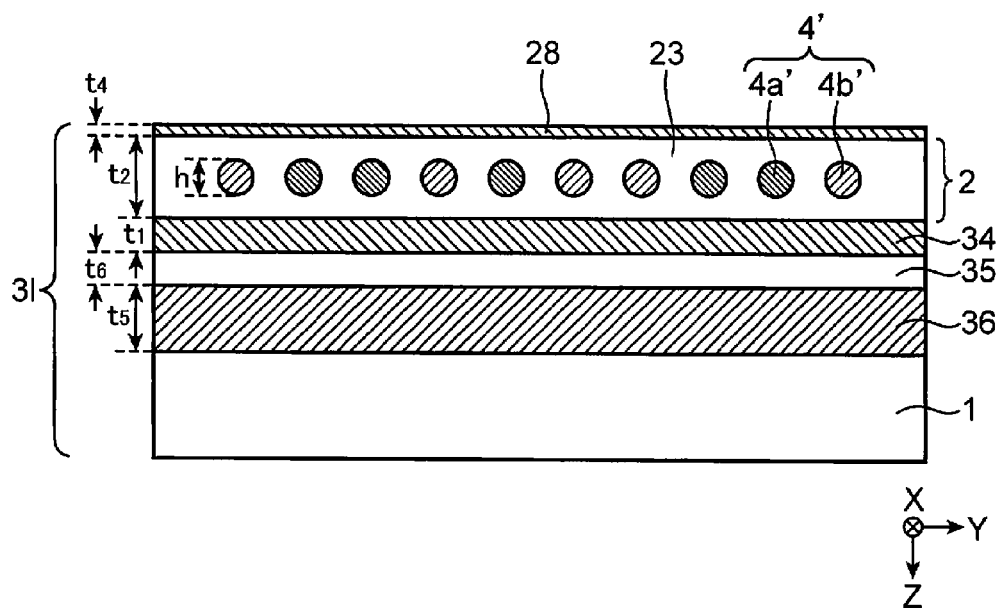
FIG. 21 is a sectional view showing the configuration of an information recording medium of still another form in the fourth embodiment of the present invention.

FIG. 21 shows an information recording medium 31 of still another form. The information recording medium 31 has a structure in which the intermediate film 35 and the resonance confining film 36 are formed between the substrate 1 and the resonance enhancing film 34 in the structure of the information recording medium 3j shown in FIG. 19. In this case, the plasmon resonance is further enhanced between the resonance enhancing film 34 and the resonance confining film 36 via the intermediate film 35. Therefore, the information recording medium 31 has a further effect of improving the recording sensitivity and the modulation degree of reproduction than the information recording medium 3j shown in FIG. 19.

(Fifth Embodiment)

Next, concerning an information device and an information recording medium in a fifth embodiment of the present invention, differences from the optical information recording and reproducing device in the first embodiment are mainly explained with reference to FIGS. 22 to 24.

Figure 22:
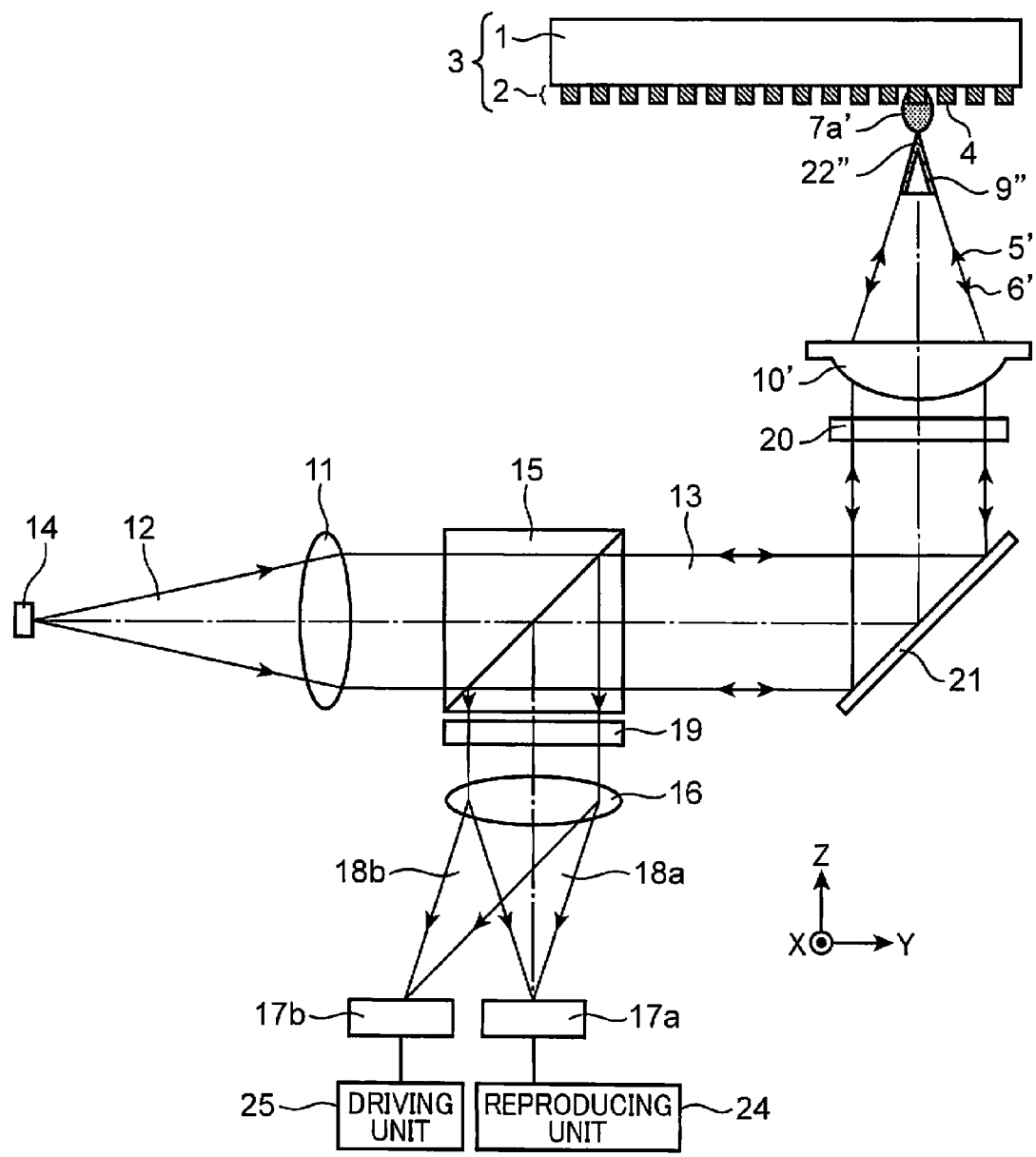
FIG. 22 is a schematic diagram showing the configurations of an information device and an information recording medium in a fifth embodiment of the present invention.
Figure 23:
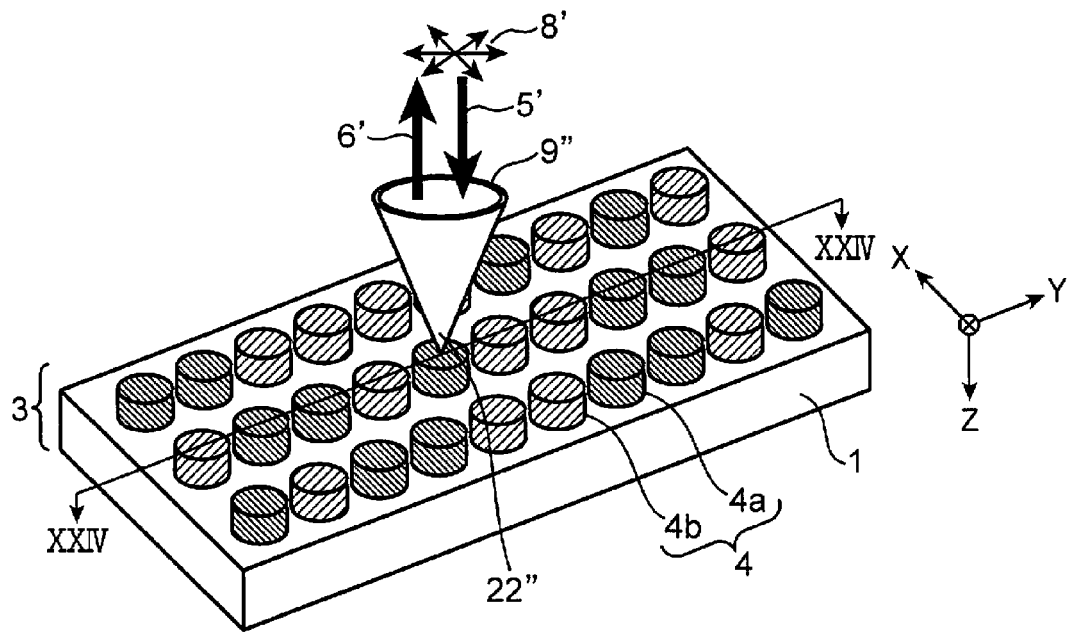
FIG. 23 is an explanatory diagram showing a near-field light generating element of the information device and a state in which information is recorded on or reproduced from the information recording medium in the fifth embodiment of the present invention.

FIG. 22 is a schematic diagram showing the configurations of the information device and the information recording medium in the fifth embodiment of the present invention. FIG. 23 is an explanatory diagram showing a near-field light generating element of the information device and a state in which information is recorded on or reproduced from the information recording medium in the fifth embodiment of the present invention. FIG. 24 is a sectional view taken along line XXIV-XXIV in FIG. 23 showing a state in which near-field light is generated between the near-field light generating element of the information device and a recording region of the information recording medium in the fifth embodiment of the present invention.

The information device in this embodiment is different from the information device in the first embodiment in the shape of a near-field light generating element 9" and the shape of an objective lens 10'. The information device in this embodiment further includes a radially polarized light generating element 20 and a mirror 21 in an optical path between the light source 14 and the near-field light generating element 9", in this embodiment, in an optical path between the beam splitter 15 and the objective lens 10'.

The near-field light generating element 9" is a conical prism coated with a metal film on a surface other than the bottom surface. The conical prism includes a resonating section 22" near the vertex. The objective lens 10' is a normal in-line type lens in which an optical axis of incident light and an optical axis of emission light coincide with each other.

The radially polarized light generating element 20 is arranged in the optical path between the light source 14 and the near-field light generating element 9'. The radially polarized light generating element 20 includes radially polarized light (a polarization direction is 8') in reproduction light condensed in the near-field light generating element 9'. Since the radially polarized light generating element 20 is arranged, the radially polarized light can be included in light 5' condensed in the near-field light generating element 9" by the objective lens 10'. When the irradiation light 5' including the radially polarized light is made incident on the bottom surface of the conical prism, which is the near-field light generating element 9", surface plasmon of a propagation type is propagated to an interface between the metal film coated on the side surface and the conical prism. Near-field light 7a', the polarization direction 27 of which is the Z-axis direction, is generated in the resonating section 22" at the distal end. A part of the near-field light 7a' is irradiated on the recording region 4 of the recording layer 2 and information is recorded.

Figure 24:
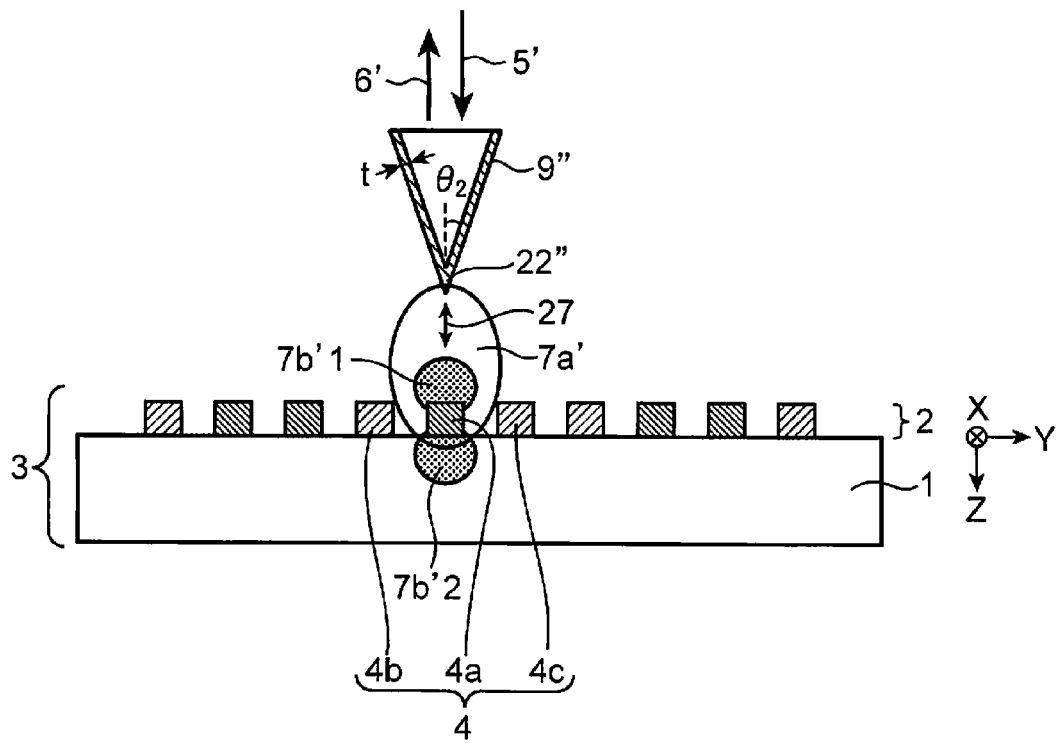
FIG. 24 is a sectional view taken along line XXIV-XXIV in FIG. 23 showing a state in which near-field light is generated between the near-field light generating element of the information device and a recording region of the information recording medium in the fifth embodiment of the present invention.

As shown in FIG. 24, the polarization direction 27 of the near-field light 7a' irradiated on the recording region 4 is a direction perpendicular to the arrangement surface (the XY plane) of the recording region 4. Therefore, near-field light 7b'1 and near-field light 7b'2 are respectively generated from the upper and lower surfaces of the recording region 4a. Since a direction in which the near-field light 7b'1 and near-field light 7b'2 are generated is the Z direction, the near-field light 7b'1 and near-field light 7b'2 do not reach the adjacent recording regions 4b and 4c and cross-write is less easily generated. As a result, it is possible to satisfactorily record information even in the information recording medium 3 of the high-density array.

An enhancement degree of the plasmon resonance between the resonating section 22" and the recording region 4 changes according to whether the recording region 4 is the recording region 4a in the recorded state or the recording region 4b in the unrecorded state. Therefore, by detecting the reflected light 6' from the near-field light generating element 9", as in the information device in the first embodiment, it is possible to determine whether the recording region 4 is in the recorded state or the unrecorded state and reproduce information recorded in the recording region 4.

As shown in FIG. 22, the information device in this embodiment condenses light perpendicularly to the substrate 1 or the formation surface (the XY plane) of the recording layers 2 of the information recording medium 3 using the normal in-line type lens 10'. A degree of freedom of design of an optical system is large and it is easy to arrange the optical system. It is also easy to attain high NA of the objective lens 10'. As a result, there is an effect that it is possible to increase the intensity of the near-field light 7a' generated from the resonating section 22".

As shown in FIG. 24, the vertical angle of the near-field light generating element 9" is $2\theta_2$. The near-field light generating element 9" has, for example, a shape formed by coating a metal film of Au, Al, or the like on a conical prism made of glass or plastics. This shape makes it possible to efficiently change the irradiation light 5' of radially polarized light to surface plasmon by using so-called Kretschmann configuration. For example, when the wavelength of the irradiation light 5', which is recording light and reproduction light, is $\lambda=0.405$ μm, a shape formed by coating Al having $\theta_2=43.4°$ and thickness t=16.3 nm on a prism is preferable. In this case, it is possible to change the irradiation light 5' of nearly 100% to propagation type surface plasmon.

When the vertical angle is set small to, for example, $2\theta_2=8°$, a mode called superfocusing can be present. In this case, it is known that, as the propagation type surface plasmon is propagated in the direction of the resonating section 22" at the distal end, the wavelength of the propagation type surface plasmon decreases. It is possible to enhance the plasmon resonance with the finer recording region 4. This is preferable in terms of recording and reproduction of a high-density information recording medium because a modulation degree of reproduction with respect to the finer recording region 4 is satisfactory.

(Sixth Embodiment)

Next, concerning an information device and an information recording medium in a sixth embodiment of the present invention, differences from the information device and the information recording medium in the first embodiment are mainly explained with reference to FIGS. 25 and 26.

Figure 25:
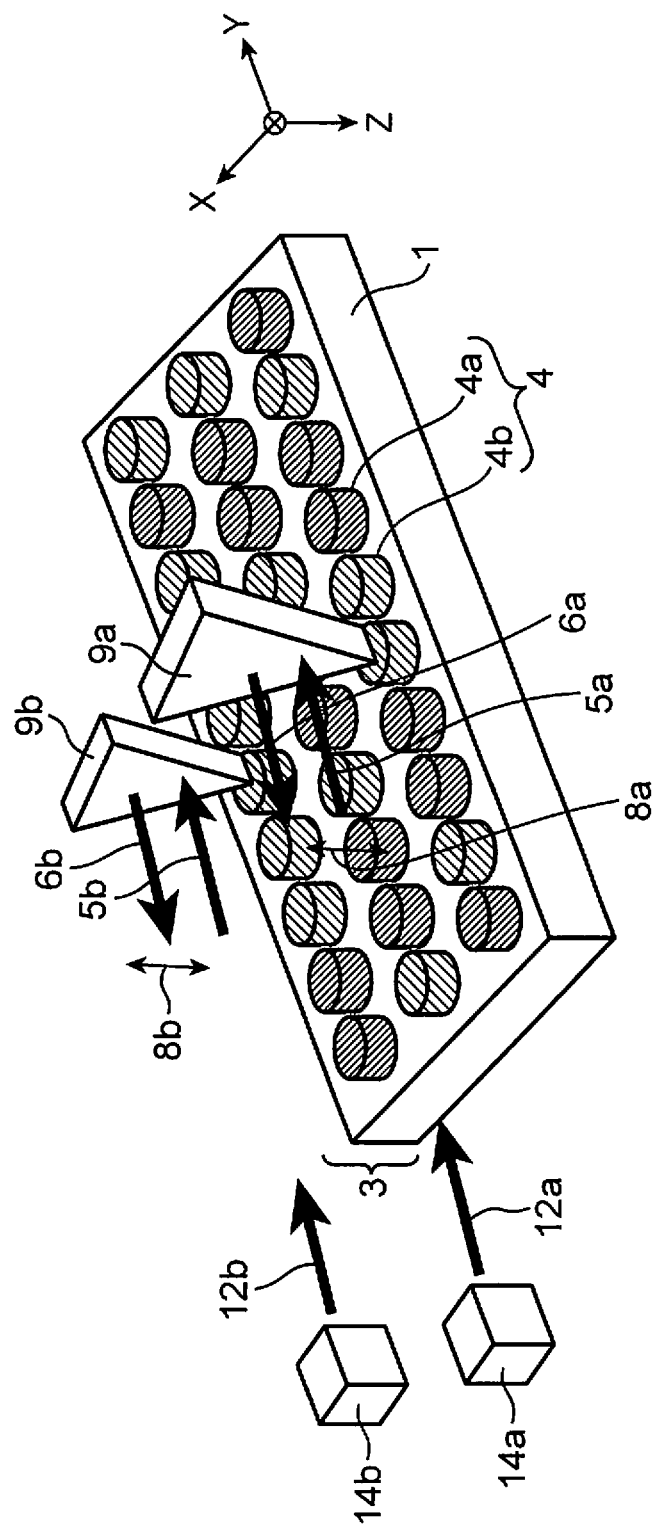
FIG. 25 is an explanatory diagram showing a near-field light generating element and a two-wavelength light source of an information device and a state in which information is recorded in and reproduced from an information recording medium in a sixth embodiment of the present invention.

FIG. 25 is an explanatory diagram showing a near-field light generating element and a two-wavelength light source of the information device and a state in which information is recorded in and reproduced from the information recording medium in the sixth embodiment of the present invention. FIG. 26 is an explanatory diagram showing a near-field light generating element of the information device of another form and a state in which information is recorded in and reproduced from the information recording medium in the sixth embodiment of the present invention. Note that the configuration of the information device in this embodiment is basically the same as the configuration of the information device shown in FIG. 1 and the like. Therefore, the entire configuration is not shown in the figure and is explained using the reference numerals and signs shown in FIG. 1 and the like according to necessity. The same applies to embodiments explained below.

The information device in this embodiment has a configuration substantially the same as the configuration of the information device in the first embodiment shown in FIG. 1. However, the information device in this embodiment is different from the information device in the first embodiment in that light sources 14a and 14b form a two-wavelength light source that emits recording light and reproduction light having different wavelengths and that the information device is an optical information reproducing device including a near-field light generating element for recording 9a and a near-field light generating element for reproduction 9b corresponding to the wavelengths.

The light source 14b is a light source for reproduction and emits reproduction light 12b having a wavelength $\lambda 1$ satisfying 600 nm$\leq \lambda 1 \leq$700 nm. For example, a red semiconductor laser having $\lambda 1$=660 nm can be used as the light source 14b. The light source 14a is a light source for recording and emits recording light 12a having a wavelength $\lambda 2$ satisfying 700 nm$\leq \lambda 2 \leq$900 nm. For example, an infrared semiconductor laser having $\lambda 2$=860 nm can be used as the light source 14a. Therefore, in this embodiment, an optical system same as the optical system of the information device in the first embodiment shown in FIG. 1 can be used.

Note that the configuration of the two-wavelength light source is not specifically limited to the example explained above. Various changes of the configuration are possible. As the two-wavelength light source, a two-wavelength light source in which, for example, a red semiconductor laser chip having $\lambda 1$=660 nm satisfying 600 nm$\leq \lambda 1 \leq$700 nm for reproduction and, for example, an infrared semiconductor laser chip having $\lambda 2$=860 nm satisfying 700 nm$\leq \lambda 2 \leq$900 nm for recording are set close to each other and integrated may be used.

The near-field light generating element for reproduction 9b and the near-field light generating element for recording 9a are arranged adjacent to each other in the X direction such that incident surfaces face substantially the same direction. Both the near-field light generating element for reproduction 9b and the near-field light generating element for recording 9a are formed of the same material, include, for example, Ag as a main component, and are formed on the same substrate (not shown in the figure) also functioning as a heat sink. The respective near-field light generating elements 9b and 9a have lengths in the Z direction (the longitudinal direction) corresponding to the wavelengths. The near-field light generating element for reproduction 9b has, for example, length of 110 nm in the longitudinal direction. The near-field light generating element for recording 9a has, for example, length of 145 nm. Since the reproduction wavelength is smaller than the recording wavelength, the length in the Z direction of the near-field light generating element for reproduction 9b is set smaller than the length in the Z direction of the near-field light generating element for recording 9a according to the wavelengths. Characteristics of the near-field light generating elements are optimized with respect to the respective wavelengths.

Since the characteristics are optimized according to the respective wavelengths, when recording light 5a protrudes or deviates to be irradiated on the near-field light generating element for reproduction 9b or when the reproduction light 5b is irradiated on the near-field light generating element for recording 9a by mistake, the plasmon resonance less easily occurs with respect to irradiation at different wavelengths and it is possible to suppress an adverse effect due to wrong irradiation. Therefore, it is unnecessary to intentionally separate respective condensing spots of the recording light 5a and the reproduction light 5b on the near-field light generating elements 9a and 9b. It is easy to design and align an optical system.

In the information device in this embodiment, when a track direction of recording and reproduction is the Y direction, the near-field light generating elements for recording and reproduction 9a and 9b cannot immediately trace the same track. However, when a fixed time is consumed for recording and erasing, by separating the near-field light generating elements for recording and reproduction 9a and 9b from each other by a distance equivalent to the time, it is possible to perform write verification for enabling check of a recording state after recording.

When, for example, a blue semiconductor laser chip having $\lambda 1$=405 nm satisfying, for example, 350 nm$\leq \lambda 1 \leq$450 nm for reproduction is used as the two-wavelength light source, for the near-field light generating element for reproduction 9b, Al is preferable as a material for easily generating near-field light. Therefore, it is preferable to use, for example, Al and Ag respectively as a material of a main component of the near-field light generating element for reproduction 9b and a material of a main component of the near-field light generating element for recording 9a because the characteristics are improved.

When a part or all of the recording region 4 is formed of a recording material, a main component of the recording material is a phase change recording material, and each of the recorded state and the unrecorded state is associated with one of amorphous and crystal, in general, the dielectric constant of the phase change material is positive in the amorphous state. However, when a wavelength decreases, a sign of the dielectric constant easily changes to negative in the crystalline state. This is suitable for the reproduction that makes use of the plasmon resonance. Therefore, when the wavelength is long, since the sign of the dielectric constant is positive in both the crystalline and amorphous states and a difference in the plasmon resonance corresponding to a phase state is reduced, there is an effect that recording sensitivity is the same.

In the information recording medium in this embodiment, it is preferable that a part or all of the recording region 4 is formed of a recording material, a sign of a real part of the dielectric constant of the recording material in the recorded state and a sign of a real part of the dielectric constant of the recording material in the unrecorded state are different from each other at a wavelength of the reproduction light, and a sign of a real part of the dielectric constant of the recording material in the recorded state and a sign of a real part of the dielectric constant of the recording material in the unrecorded state are the same at a wavelength of the recording light.

For example, in the information recording medium in this embodiment, $Ge_{10}Sb_{90}$ is used as the recording material and, when a reproduction wavelength is set to λ1=660 nm, a real part of the relative dielectric constant is −12.8 in the crystalline state, a real part of the relative dielectric constant is 11.4 in the amorphous state, and plasmon resonance degrees are different. Therefore, a modulation degree of reproduction is high.

Note that, when the reproduction wavelength is set to, for example, λ1=780 nm, a real part of the relative dielectric constant is −5.6 in the crystalline state, a real part of the relative dielectric constant is 17.9 in the amorphous state, and plasmon resonance degrees are different. Therefore, in this case, a modulation degree of reproduction is also high. In the case of $Ge_{10}Sb_{90}$, at wavelengths of 0.492 μm to 0.835 μm, since signs of real parts of the dielectric constant are different from each other in crystal and amorphous, the reproduction characteristic is improved. In particular, at wavelengths of 0.492 μm to 0.787 μm, a real part of the relative dielectric constant is equal to or smaller than −5 in crystal and is larger than −5 in amorphous. Therefore, the wavelengths are considered to be more preferable.

On the other hand, when the recording wavelength is set to, for example, λ2=860 nm, a real part of the relative dielectric constant is 2.7 in the crystalline state, a real part of the relative dielectric constant is 21.3 in the amorphous state, and both real parts of the dielectric constant are positive. Therefore, it is possible to reduce a sensitivity difference of recording between the crystalline state and the amorphous state. Note that, if λ2≥835 nm, since both real parts of are positive, it is preferable that the recording wavelength is λ2≥835 nm.

Figure 26:
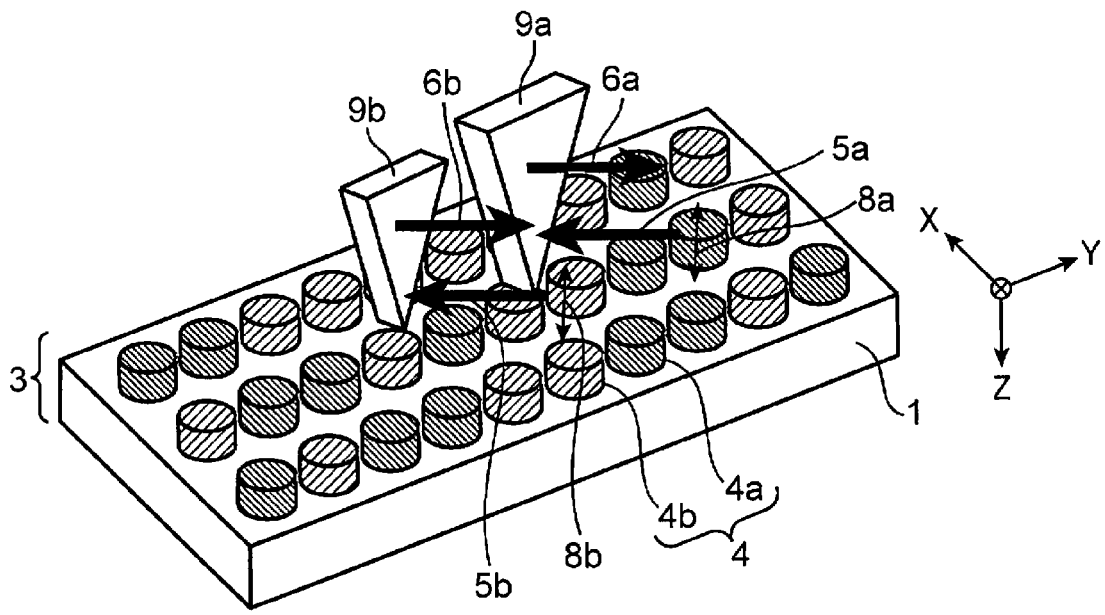
FIG. 26 is an explanatory diagram showing a near-field light generating element of the information device of another form and a state in which information is recorded in and reproduced from the information recording medium in the sixth embodiment of the present invention.

Next, an information device of another form shown in FIG. 26 is explained. The information device shown in FIG. 26 has a configuration substantially the same as the configuration of the information device shown in FIG. 25. However, the information device shown in FIG. 26 is different from the information device shown in FIG. 25 in that the near-field light generating element for reproduction 9b and the near-field light generating element for recording 9a are arranged adjacent to each other in the Y direction such that the incident surfaces of the recording light 5a and the reproduction light 5b face in substantially the same direction.

When a track direction of recording and reproduction is the Y direction, in the information device shown in FIG. 25, the near-field light generating elements for recording and reproduction 9a and 9b cannot simultaneously trace the same track. However, in this example, since the near-field light generating elements for recording and reproduction 9a and 9b are present on the same track, it is possible to immediately reproduce information after recording and it is possible to perform write verification for enabling check of a recording state after recording.

(Seventh Embodiment)

Next, concerning an information device and an information recording medium in the seventh embodiment of the present invention, differences from the information device in the sixth embodiment are mainly explained with reference to FIG. 27.

Figure 27:
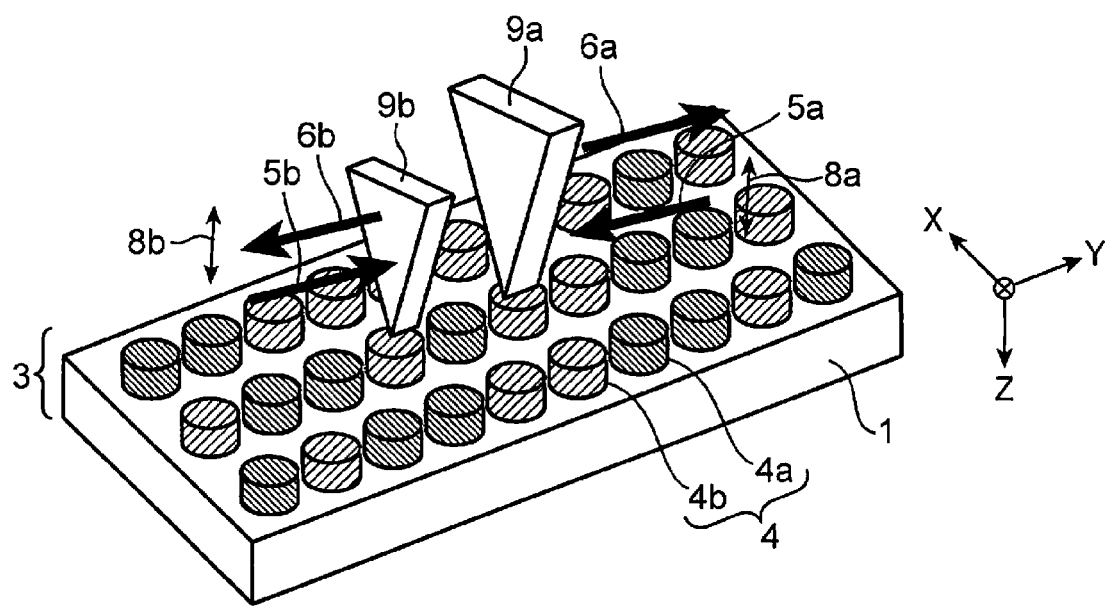
FIG. 27 is an explanatory diagram showing a near-field light generating element of an information device and a state in which information is recorded on or reproduced from an information recording medium in a seventh embodiment of the present invention.

FIG. 27 is an explanatory diagram showing a near-field light generating element of the information device and a state in which information is recorded in or from the information recording medium in the seventh embodiment of the present invention.

The information device in this embodiment is different from the information device shown in FIGS. 25 and 26 in that the near-field light generating element for reproduction 9b and the near-field light generating element for recording 9a are arranged such that the rear surfaces (surfaces on which emission light is not irradiated) thereof are opposed to each other.

The near-field light generating element for reproduction 9b and the near-field light generating element for recording 9a are respectively formed on the back and the front of the same substrate (not shown in the figure) also functioning as a heat sink. The recording light 5a irradiates the near-field light generating element 9a along the −Y direction. The reproduction light 5b irradiates the near-field light generating element 9a along the opposite Y direction. Therefore, in this embodiment, an optical system for recording is arranged on the right side of the drawing and an optical system for reproduction is arranged on the left side of the drawing, whereby it is possible to separate the optical system for recording and the optical system for reproduction. Therefore, it is easy to arrange the optical systems.

In this embodiment, as in the embodiments explained above, when a track direction of recording and reproduction is the Y direction, since the near-field light generating elements for recording and reproduction 9a and 9b are present on the same track, it is possible to immediately reproduce information after recording and it is possible to perform write verification for enabling check of a recording state after recording.

(Eighth Embodiment)

Next, concerning an information device and an information recording medium in an eighth embodiment of the present invention, differences from the information device in the sixth embodiment are mainly explained with reference to FIGS. 28 and 29.

Figure 28:
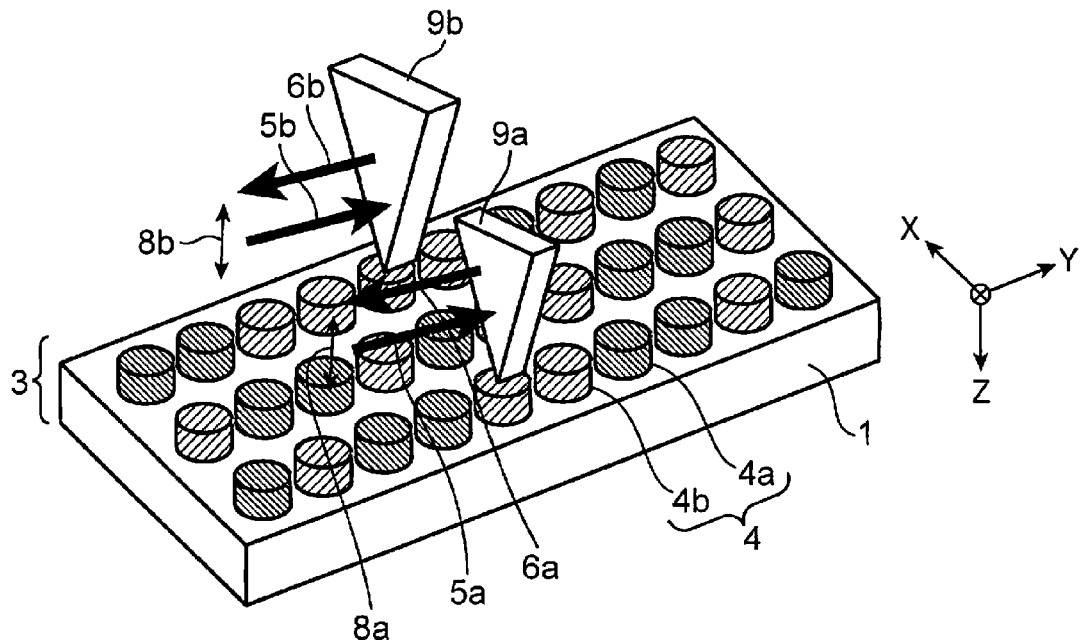
FIG. 28 is an explanatory diagram showing a near-field light generating element of an information device and a state in which information is recorded on or reproduced from an information recording medium in an eighth embodiment of the present invention.

FIG. 28 is an explanatory diagram showing a near-field light generating element of the information device and a state in which information is recorded on or reproduced from the information recording medium in the eighth embodiment of the present invention. FIG. 29 is an explanatory diagram showing a near-field light generating element of an information device of another form and a state in which information is recorded on or reproduced from the information recording medium in the eighth embodiment of the present invention.

The information device in this embodiment is similar to the configuration of the information device shown in FIG. 25 in that the information device in this embodiment includes the near-field light generating element for recording 9a and the near-field light generating element for reproduction 9b. However, the information device in this embodiment is different from the information device shown in FIG. 25 in that a one-wavelength light source that emits recording light and reproduction light is used as the light source 14 and the length in the longitudinal direction of the near-field light generating element for recording 9a is smaller than the length in the longitudinal direction of the near-field light generating element for reproduction 9b.

As the light source 14, a one-wavelength light source of an infrared semiconductor laser chip having, for example, λ1=780 nm satisfying 700 nm≤λ1≤900 nm is used. Therefore, it is possible to simplify the configuration of the light source.

The near-field light generating element for reproduction 9b and the near-field light generating element for recording 9a are arranged adjacent to each other in the X direction such that incident surfaces face substantially the same direction. Both the near-field light generating elements have a triangular prism shape, are formed of the same material, include, for example, Ag as a main component, and are formed on the same substrate (not shown in the figure) also functioning as a heat sink. For example, the length in the longitudinal direction of the near-field light generating element for recording 9a is 110 nm and the length in the longitudinal direction of the near-field light generating element for reproduction 9b is 145 nm. The near-field light generating element for recording 9a has the length in the longitudinal direction smaller than the length in the longitudinal direction of the near-field light generating element for reproduction 9b.

It is preferable to set the near-field light generating element for reproduction 9b to length for easily causing resonance enhancement between the near-field light generating element for reproduction 9b and the recording region 4a in the recorded state. It is preferable to set the near-field light generating element for recording 9a to length for somewhat less easily causing resonance enhancement between the near-field light generating element for recording 9a and the recording region 4a in the recorded state. In this case, a modulation degree of reproduction is obtained and, at the same time, in recording, since resonance enhancement somewhat less easily occurs, it is possible to suppress a difference between recording sensitivities in the recording region 4a in the recorded state and the recording region 4b in the unrecorded state.

Note that, in recording, from the viewpoint of somewhat less easily causing resonance enhancement, the length in the longitudinal direction of the near-field light generating element for recording 9a may be set larger than the length in the longitudinal direction of the near-field light generating element for reproduction 9b.

Figure 29:
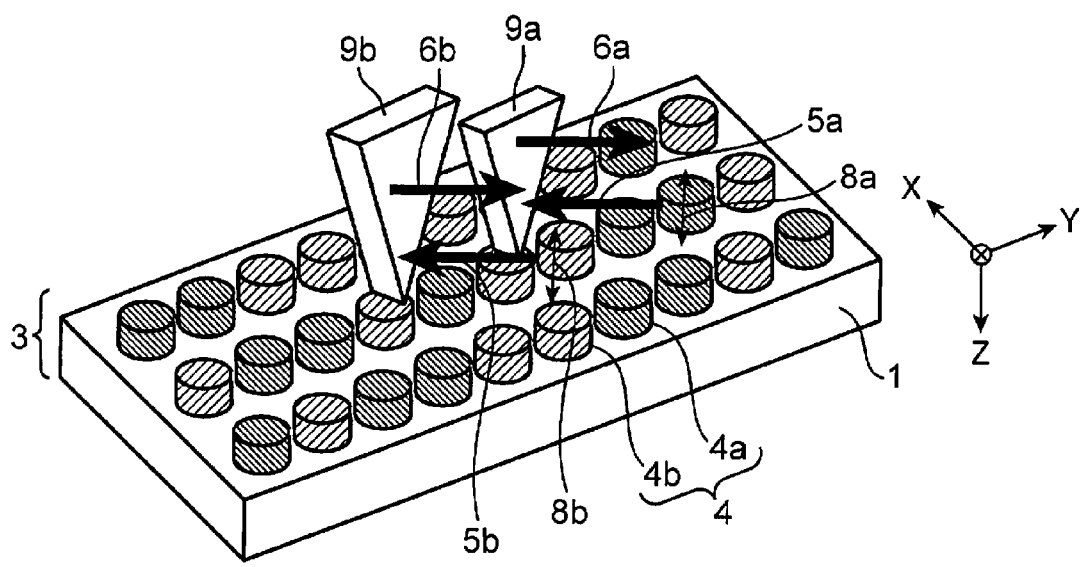
FIG. 29 is an explanatory diagram showing a near-field light generating element of an information device of another form and a state in which information is recorded on or reproduced from the information recording medium in the eighth embodiment of the present invention.

Next, an information device of another form shown in FIG. 29 is explained. The information device shown in FIG. 29 has a configuration substantially the same as the configuration of the information device shown in FIG. 28. However, the information device of the other form is different from the information device shown in FIG. 28 in that the near-field light generating element for reproduction 9b and the near-field light generating element for recording 9a are arranged adjacent to each other in the Y direction such that incident surfaces of the recording light 5a and the reproduction light 5b face substantially the same direction.

When a track direction of recording and reproduction is the Y direction, in the information device shown in FIG. 28, the near-field light generating elements for recording and reproduction 9a and 9b cannot simultaneously trace the same track. However, in this example, since the near-field light generating elements for recording and reproduction 9a and 9b are present on the same track, it is possible to immediately reproduce information after recording and it is possible to perform write verification for enabling check of a recording state after recording.

(Ninth Embodiment)

Next, concerning an information device and an information recording medium in a ninth embodiment of the present invention, differences from the information device in the first embodiment are mainly explained with reference to FIGS. 30 and 31.

Figure 30:
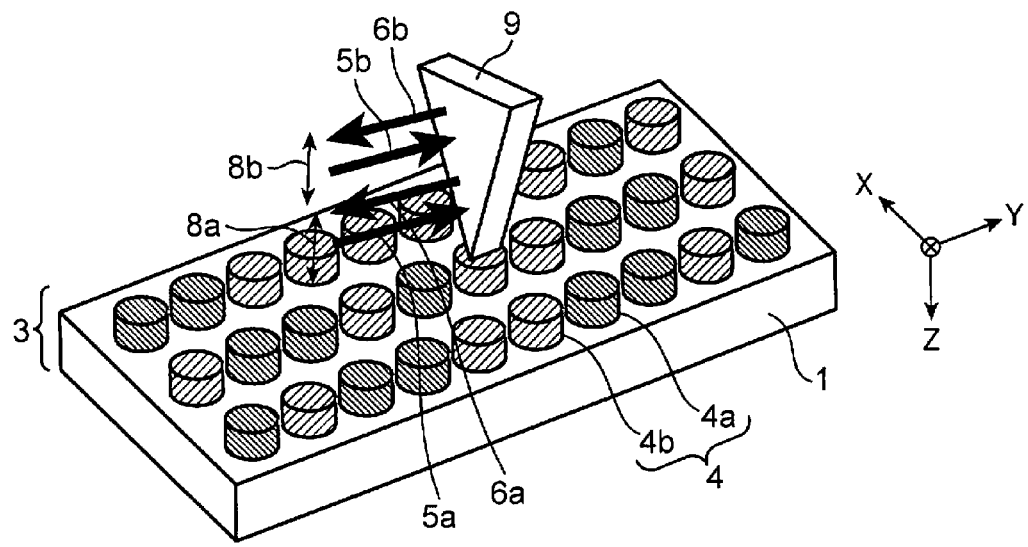
FIG. 30 is an explanatory diagram showing a near-field light generating element of an information device and a state in which information is recorded on or reproduced from an information recording medium in a ninth embodiment of the present invention.

FIG. 30 is an explanatory diagram showing a near-field light generating element of the information device and a state in which information is recorded on or reproduced from an information recording medium in the ninth embodiment of the present invention. FIG. 31 is an explanatory diagram showing a near-field light generating element and a light source of an information device of another form and a state in which information is recorded on or reproduced from the information recording medium in the ninth embodiment of the present invention.

The information device in this embodiment is similar to the configuration of the information device shown in FIGS. 1 to 3 in that the near-field light generating element 9 functions as both the near-field light generating element for recording and the near-field light generating element for reproduction. However, the information device in this embodiment is different from the information device shown in FIGS. 1 to 3 in that, as in the information device shown in FIG. 25, a two-wavelength light source that emits recording light and reproduction light is used as a light source.

Specifically, the wavelength of the recording light 5a is larger than the wavelength of the reproduction light 5b. As a light source, a so-called two-wavelength light source in which, for example, a red semiconductor laser chip having λ1=660 nm satisfying 600 nm≤λ1≤700 nm for reproduction and, for example, an infrared semiconductor laser chip having λ2=860 nm satisfying 700 nm≤λ2≤900 nm for recording are set close to each other and integrated is used.

An incident surface of the recording light 5a on the near-field light generating element 9 and an incident surface of the reproduction light 5b on the near-field light generating element 9 are set the same. With this configuration, it is possible to simplify optical systems for recording and reproduction.

It is preferable to set, with respect to a reproduction wavelength, the length in the longitudinal direction of the near-field light generating element 9 to length for easily causing resonance enhancement with the recording region 4a in the recorded state. It is preferable to set, with respect to a recording wavelength, the length in the longitudinal direction of the near-field light generating element 9 to length for somewhat less easily causing resonance enhancement with the recording region 4a in the recorded state. As a result, a modulation degree of reproduction is obtained and, at the same time, in recording, since resonance enhancement somewhat less easily occurs, it is possible to suppress a difference between recording sensitivities in the recording region 4a in the recorded state and the recording region 4b in the unrecorded state.

Note that, in recording, from the viewpoint of somewhat less easily causing resonance enhancement, a recording wavelength may be set shorter than a reproduction wavelength.

Figure 31:
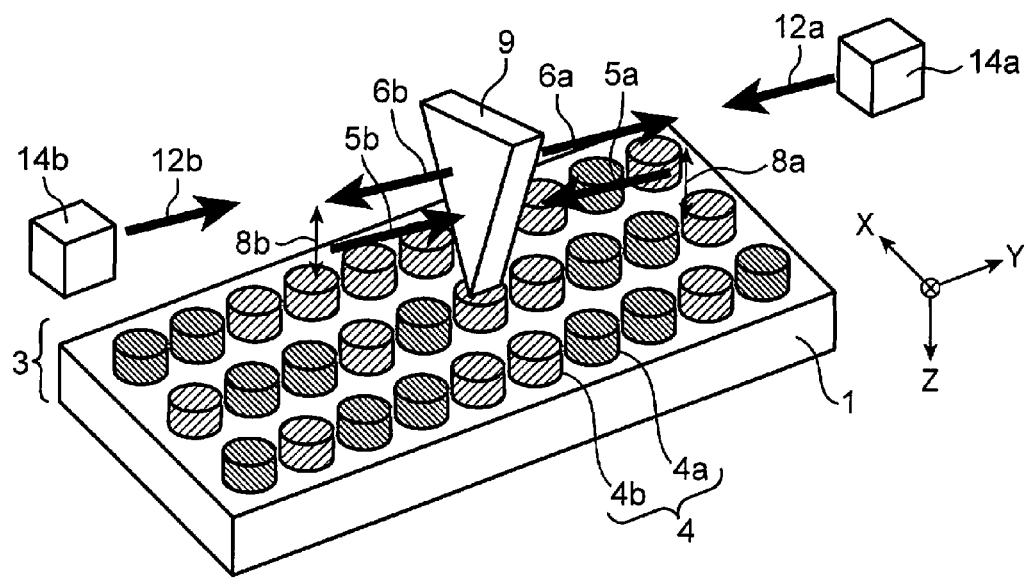
FIG. 31 is an explanatory diagram showing a near-field light generating element and a light source of an information device of another form and a state in which information is recorded on or reproduced from the information recording medium in the ninth embodiment of the present invention.

Next, an information device in another form shown in FIG. 31 is explained. In the information device shown in FIG. 31, an incident surface of the recording light 5a on the near-field light generating element 9 and an incident surface of the reproduction light 5b on the near-field light generating element 9 are different. The light source 14a emits the recording light 5a having the wavelength explained above to one flat surface of the near-field light generating element 9. The light source 14b emits the reproduction light 5b having the wavelength explained above, which is different from the wavelength of the recording light 5a, to the other flat surface of the near-field light generating element 9.

In this embodiment, an optical system for recording is arranged on the right side of the drawing and an optical system for reproduction is arranged on the left side of the drawing, whereby it is possible to separate the optical system for recording and the optical system for reproduction. Therefore, it is easy to arrange the optical systems. Further, since the wavelengths of the light sources 14a and 14b may be respectively single wavelengths, it is possible to easily form a non-reflective coat or the like of an optical component.

(Tenth Embodiment)

Next, concerning an information device and an information recording medium in a tenth embodiment of the present invention, differences from the optical information recording and reproducing device in the first embodiment are mainly explained with reference to FIG. 32. In the embodiments explained above, the information device that records information on and reproduces information from the information recording medium using near-field light without using a magnetic field is explained. However, the information device applied with the present invention is not specifically limited to this example. The present invention can also be applied to an information device that includes a magnetic recording unit and records information in a recording region, which is irradiated with near-field light and heated, with a magnetic field generated by the magnetic recording unit. Effects same as the effects explained above can be obtained.

Figure 32:
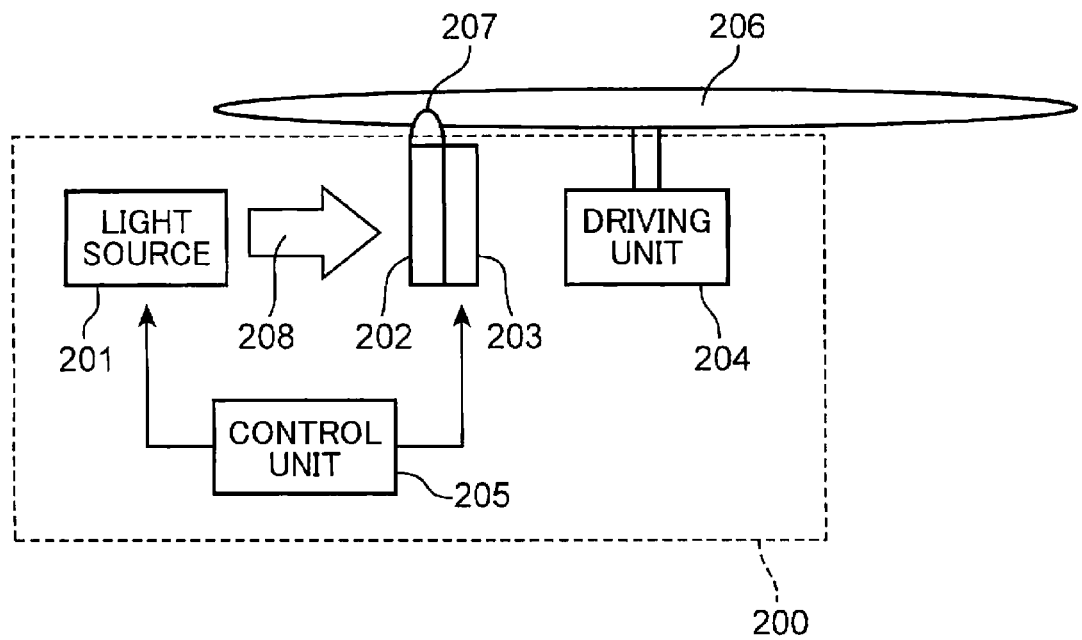
FIG. 32 is a schematic diagram showing the configurations of an information device and an information recording medium in a tenth embodiment of the present invention.

FIG. 32 is a schematic diagram showing the configurations of the information device and the information recording medium in the tenth embodiment of the present invention. An information device 200 includes a light source 201, a near-field light generating element 202, and a magnetic recording unit 203. The information device 200 may further include a driving unit 204 and a control unit 205.

The driving unit 204 is configured by, for example, a motor and rotates a disk-like information recording medium 206. The control unit 205 generates a signal for the near-field light generating element 202 to emit desired light and sends the signal to the light source 201. For example, the control unit 205 may set power and the like of emission light on the basis of recording data generated by a recording date generating unit inside the control unit 205.

The light source 201 generates emission light 208 according to a signal from the control unit 205 and irradiates the near-field light generating element 202. The near-field light generating element 202 generates near-field light 207 with the plasmon resonance according to the irradiated emission light 208. The near-field light 207 is irradiated on a recording region (e.g., a recording film or particulates) of the information recording medium 206.

The recording region of the information recording medium 206 may include a magnetic recording material. In this case, the information device 200 applies a magnetic field generated by the magnetic recording unit 203 on the recording region heated by the irradiation of the near-field light 207 and records information in the recording region. That is, when the near-field light 207 from the near-field light generating element 202 is irradiated and the recording region is heated, a coercive force of the recording region temporarily decreases. Making use of the decrease in the coercive force, the information device 200 changes a magnetic pole or the like of the recording region and records information with the magnetic field generated by the magnetic recording unit 203 in the recording region, the coercive force of which decreases.

In the information device 200 configured as explained above, even in the case of a magnetic recording system, it is possible to attain effects explained below.

First, when the information recording medium 206 includes a resonance enhancing film, and the distance between the near-field light generating element 202 and the resonance enhancing film is sufficiently smaller than the wavelength of the emission light 208, for example, equal to or smaller than 100 nm, it is possible to improve the enhancement degree of the plasmon resonance according to the interaction of the near-field light generating element 202 and the resonance enhancing film. Consequently, it is possible to efficiently perform heating of the recording region by the near-field light generating element 202.

When the information recording medium 206 includes a resonance control film, the spread of near-field light is further suppressed. Therefore, it is possible to increase a condensing degree on the recording region set as a target of heating. Consequently, it is possible to more accurately narrow down a region to be heated. As a result, cross-write to adjacent recording regions by the magnetic recording unit 203 is reduced. Further, it is also possible to further expand a working distance between the near-field light generating element 202 and the information recording medium 206.

When the information recording medium 206 includes an intermediate film and a resonance confining film in addition to the resonance enhancing film, and the distance between the near-field light generating element 202 and the resonance enhancing film and the resonance confining film is sufficiently smaller than the wavelength of the emission light 208, for example, equal to or smaller than 100 nm, in addition to the interaction of the near-field light generating element 202 and the resonance enhancing film, the resonance enhancing film and the resonance confining film interact with each other via the intermediate film. Therefore, it is possible to further improve the enhancement degree of the plasmon resonance. Consequently, it is possible to more efficiently perform heating of the recording region by the near-field light generating element 202.

The information devices and the information recording media in the first to tenth embodiments are explained above. However, the present invention is not limited to these embodiments. Information devices and information recording media obtained by arbitrarily combining the configurations of the information devices and the information recording media in the respective embodiments are also included in the present invention. Effects same as the effects in the embodiments can be attained.

Note that the objective lens, the collimator lens, and the detection lens used in the embodiments are named for convenience. The lenses are the same as a lens in general.

In the embodiments, the optical disk is explained as the information recording medium. However, application to a card-like, drum-like, or tape-like information recording medium designed to be capable of recording or reproducing a plurality of media having different specifications such as thickness and recording density with an information device configured the same as the information devices in the embodiment is also included in the scope of the present invention.

Modes of the present invention are explained below from the embodiments explained above. That is, an information recording medium according to an aspect of the present invention includes: a substrate; a recoding layer which includes recording regions including a recording material and arrayed in an island shape; and a first resonance enhancing film formed between the substrate and the recording layer and configured to enhance plasmon resonance, wherein the first resonance enhancing film includes a material having a dielectric constant with a real part of which sign is negative.

In this information recording medium, the first resonance enhancing film is formed of the material having a dielectric constant with a real part of which sign is negative. The recording regions of the recording layer are arrayed in the island shape. Therefore, a resonating section of a near-field light generating element, the first resonance enhancing film, and the recording region can closely interact with one another. As a result, it is possible to more strongly cause enhancement of the plasmon resonance. Therefore, it is possible to satisfactorily record information in the recording regions arrayed at high density using near-field light.

Desirably, the thickness of the first resonance enhancing film is equal to or larger than 2 nm and equal to or smaller than 25 nm.

In this case, it is possible to increase a difference in the plasmon resonance between the recorded state and the unrecorded state. Therefore, it is possible to improve the modulation degree of reproduction.

Desirably, the information recording medium further includes a resonance control film arranged on the opposite side of the recording regions to the substrate, and the resonance control film includes a material having a dielectric constant with a real part of which sign is negative.

In this case, the resonance control film formed of the material having a dielectric constant with a real part of which sign is negative, is formed between the near-field light generating element and the resonance enhancing film. Therefore, it is possible to suppress the spread of the near-field light in an arrangement surface direction of the recording regions and it is possible to increase a condensing degree on the recording region set as a target. As a result, it is possible to reduce cross-write to adjacent recording regions and it is possible to expand a working distance between the near-field light generating element and the information recording medium.

Desirably, the thickness of the resonance control film is smaller than the thickness of the first resonance enhancing film.

In this case, the plasmon resonance between the near-field light generating element and the resonance control film is not enhanced and does not adversely affect the interaction of the plasmon resonance between the resonance enhancing film and the near-field light generating element. Therefore, it is possible to prevent a decrease in recording sensitivity.

Desirably, the information recording medium further includes: a second resonance enhancing film formed between the substrate and the first resonance enhancing film and configured to enhance the plasmon resonance; and an intermediate film formed between the first resonance enhancing film and the second resonance enhancing film, the second resonance enhancing film includes a material having a dielectric constant with a real part of which sign is negative, and the intermediate film includes a material having a dielectric constant with a real part of which sign is positive.

In this case, in addition to the interaction of the near-field light generating element and the first resonance enhancing film, the first resonance enhancing film and the second resonance enhancing film interact with each other via the intermediate film and near-field light is generated in the intermediate film. Therefore, it is possible to further improve the enhancement degree of the plasmon resonance and further increase recording sensitivity in the recording regions.

Desirably, the thickness of the first resonance enhancing film is smaller than the thickness of the second resonance enhancing film.

In this case, since the thickness of the first resonance enhancing film is smaller than the thickness of the second resonance enhancing film, the plasmon resonance is easily enhanced.

Desirably, a shape of each of the recording regions is a vertically long ellipsoidal shape with respect to an arrangement surface of the recording regions.

In this case, the plasmon resonance more easily occurs. Therefore, it is possible to improve the recording sensitivity and the reproduction modulation degree.

An information device according to another aspect of the present invention is an information device that records information on or reproduces information from the information recording medium explained above, the information device including: a light source; and a near-field light generating element including a resonating section configured such that plasmon resonance occurs between the resonating section and the recording region, wherein the resonating section causes the plasmon resonance when emission light from the light source is irradiated on the near-field light generating element, the first resonance enhancing film enhances the plasmon resonance between the resonating section and the recording region, and the resonating section generates near-field light and irradiates the near-field light on the recording region from the recording layer side.

In the information device, the first resonance enhancing film of the information recording medium is formed of the material having a dielectric constant with a real part of which sign is negative, and the recording regions of the recording layer are arrayed in the island shape. Therefore, the resonating section of the near-field light generating element, the first resonance enhancing film, and the recording region can closely interact with one another. As a result, it is possible to more strongly cause enhancement of the plasmon resonance. Therefore, it is possible to satisfactorily record information in the recording regions arrayed at high density using the near-field light.

Desirably, the material of a main component of the near-field light generating element is the same as the material of a main component of the first resonance enhancing film.

In this case, since the near-field light generating element and the resonance enhancing film are formed of the same material of the main components, the near-field light generating element and the resonance enhancing film interact with each other in the same manner. It is easy to improve the enhancement degree of the plasmon resonance.

Desirably, the amplitude of a polarized component in the vertical direction of the near-field light is larger than the amplitude of a polarized component in the horizontal direction thereof with respect to an arrangement surface of the recording regions, and information is recorded in the recording regions using at least a part of the near-field light generated from the resonating section.

The light source may be arranged such that the amplitude of the polarized component in the vertical direction of the near-field light is larger than the amplitude of the polarized component in the horizontal direction thereof with respect to the arrangement surface of the recording region. Alternatively, the information device may further include a polarization control optical element configured to convert a polarization state of the emission light, and the polarization control optical element may convert a polarization direction of the emission light from the light source such that the amplitude of the polarized component in the vertical direction of the near-field light is larger than the amplitude of the polarized component in the horizontal direction thereof with respect to the arrangement surface of the recording regions.

In this case, the light source or the polarization control optical element is arranged such that the polarization direction of the near-field light generated from the near-field light-emitting element is close to the vertical direction with respect to the arrangement surface of the recording region and the polarized component in the vertical direction increases. Consequently, the direction of the near-field light incidentally generated from the recording region set as a target on which the near-field light from the near-field light generating element is irradiated is a direction substantially perpendicular to the arrangement surface. Therefore, it is possible to reduce cross-write and record and reproduce information satisfactorily and at high density without adversely affecting adjacent recording regions. As a result, it is possible to perform satisfactory recording at high density equal to or lower than a diffraction limit and it is possible to realize a large capacity information device and a large capacity information recording medium.

Desirably, the information device further includes: a photodetector configured to detect reflected light from the near-field light generating element or transmitted light transmitted through the near-field light generating element; and a reproducing unit configured to determine, on the basis of a detection signal from the photodetector, whether the recording region is in a recorded state or an unrecorded state, and reproduce information recorded in the recording region.

In this case, the reproduction light is directly irradiated on the near-field light generating element rather than the near-field light and the reflected light or the transmitted light from the near-field light generating element is detected. Therefore, it is possible to substantially increase a reflected light amount, a transmitted light amount, a light amount change of the reflected light amount, or a light amount change of the transmitted light amount and it is possible to improve the modulation degree of a reproduction signal.

Desirably, an interval between the recording regions is equal to or smaller than the width of each of the recording regions.

In this case, since the interval between the recording regions is equal to or smaller than the width of each of the recording regions, it is possible to increase the density of the recording regions and it is possible to increase a recorded information amount of the information recording medium.

Desirably, the light source includes a two-wavelength light source configured to emit recording light having a first wavelength and reproduction light having a second wavelength different from the first wavelength, and the near-field light generating element includes a near-field light generating element for recording corresponding to the first wavelength and a near-field light generating element for reproduction corresponding to the second wavelength.

In this case, characteristics of the near-field light generating element for recording and the near-field light generating element for reproduction can be optimized according to the wavelengths of the recording light and the reproduction light. Therefore, even when the recording light is irradiated on the near-field light generating element for reproduction by mistake or when the reproduction light is irradiated on the near-field light generating element for recording by mistake, since the plasmon resonance less easily occurs with respect to irradiation of a different wavelength, it is possible to suppress an adverse effect due to wrong irradiation. As a result, it is unnecessary to intentionally separate respective condensing spots of the recording light and the reproduction light on the near-field light generating element for recording and the near-field light generating element for reproduction. It is easy to design and align an optical system.

Desirably, a part or all of the recording region is formed of a recording material, a main component of the recording material is a phase change recording material, each of the recorded state and the unrecorded state of the recording region corresponds to one of amorphous and crystal, and the second wavelength is shorter than the first wavelength.

In this case, since the wavelength of the reproduction light is smaller than the wavelength of the recording light, in a crystalline state, a sign of the dielectric constant of the phase change recording material tends to be negative with respect to the reproduction light having the small wavelength. It is possible to perform a satisfactory reproducing operation using the plasmon resonance. In both crystalline and amorphous states, the sign of the dielectric constant is positive with respect to the recording light having the large wavelength. A difference in the plasmon resonance corresponding to a phase state is reduced. Therefore, it is possible to equalize recording sensitivity in both the crystalline and amorphous states.

Desirably, a part or all of the recording region is formed of a recording material, and a sign of a real part of the dielectric constant of the recording material in a recorded state is the same as a sign of a real part of the dielectric constant of the recording material in an unrecorded state with respect to the first wavelength.

In this case, the sign of the real part of the dielectric constant of the recording material in the recorded state is the same as the sign of the real part of the dielectric constant of the recording material in the unrecorded state with respect to the wavelength of the recording light. Therefore, a difference in the plasmon resonance corresponding to a phase state is reduced with respect to the recording light. It is possible to equalize recording sensitivity in both crystal and amorphous states.

Desirably, the light source includes a one-wavelength light source configured to emit recording light and reproduction light, and the near-field light generating element includes a near-field light generating element for recording and a near-field light generating element for reproduction.

In this case, since the one-wavelength light source is used, it is possible to simplify the configuration of the light source. By arranging the near-field light generating element for recording and the near-field light generating element for reproduction on the same track, it is possible to immediately reproduce information after recording and check a recording state after recording.

Desirably, the length in the longitudinal direction of the near-field light generating element for recording is larger than the length in the longitudinal direction of the near-field light generating element for reproduction.

In this case, when a recording wavelength is larger than a reproduction wavelength, it is possible to properly set characteristics of the near-field light generating element with respect to the respective wavelengths.

Desirably, the near-field light generating element for recording and the near-field light generating element for reproduction are arranged with the rear surfaces thereof opposed to each other.

In this case, since an optical system for recording and an optical system for reproduction can be separated, it is easy to arrange the optical systems. Further, it is possible to arrange the near-field light generating element for recording and the near-field light generating element for reproduction on the same track. Therefore, it is possible to immediately reproduce information after recording and check a recording state after recording.

Desirably, the light source includes a two-wavelength light source configured to emit recording light having a first wavelength and reproduction light having a second wavelength different from the first wavelength, and the near-field light generating element functions as both the near-field light generating element for recording and the near-field light generating element for reproduction.

In this case, an incident surface of the recording light on the near-field light generating element and an incident surface of the reproduction light on the near-field light generating element are the same. It is possible to simplify the optical systems for recording and reproduction.

A method for producing an information recording medium according to another aspect of the present invention is a method for producing an information recording medium including a substrate, the method including: a step of forming a recording layer which includes recording regions including a recording material and arrayed in an island shape; and a step of forming, between the substrate and the recording layer, a first resonance enhancing film that includes a material having a dielectric constant with a real part of which sign is negative, and is configured to enhance plasmon resonance.

With the method for producing the information recording medium, it is possible to produce the information recording medium including the first resonance enhancing film formed of the material having a dielectric constant with a real part of which sign is negative. Therefore, the near-field light generating element, the first resonance enhancing film, and the recording region interact with one another and can improve the enhancement degree of plasmon resonance. As a result, it is possible to satisfactorily record information in the recording regions arrayed at high density using near-field light.

An information device according to another aspect of the present invention is an information device that records information on and reproduces information from an information recording medium including a substrate and a recording layer including recording regions arrayed in an island shape on the substrate, the information device including: a light source; and a near-field light generating element including a resonating section configured such that plasmon resonance occurs between the resonating section and the recording region, wherein the resonating section causes the plasmon resonance when emission light from the light source is irradiated on the near-field light generating element, the amplitude of a polarized component in the vertical direction of the near-field light is larger than the amplitude of a polarized component in the horizontal direction thereof with respect to an arrangement surface of the recording regions, and information is recorded in the recording regions using at least a part of the near-field light generated from the resonating section.

The light source may be arranged such that the amplitude of the polarized component in the vertical direction of the near-field light is larger than the amplitude of the polarized component in the horizontal direction thereof with respect to the arrangement surface of the recording region. Alternatively, the information device may further include a polarization control optical element configured to convert a polarization state of the emission light, and the polarization control optical element may convert a polarization direction of the emission light from the light source such that the amplitude of the polarized component in the vertical direction of the near-field light is larger than the amplitude of the polarized component in the horizontal direction thereof with respect to the arrangement surface of the recording regions.

In the information device, the light source or the polarization control optical element is arranged such that the polarization direction of the near-field light generated from the near-field light-emitting element is close to the vertical direction with respect to the arrangement surface of the recording region and the polarized component in the vertical direction increases. Consequently, the direction of the near-field light incidentally generated from the recording region set as a target on which the near-field light from the near-field light generating element is irradiated is a direction substantially perpendicular to the arrangement surface. Therefore, it is possible to reduce cross-write and record and reproduce information satisfactorily and at high density without adversely affecting adjacent recording regions. As a result, it is possible to perform satisfactory recording at high density equal to or lower than a diffraction limit and it is possible to realize a large capacity information device and a large capacity information recording medium. Therefore, it is possible to satisfactorily record information in the recording regions arrayed at high density using the near-field light.

Industrial Applicability

According to the information recording medium, the information device, and the method for producing the information recording medium of the present invention, information can be satisfactorily recorded in the recording regions arrayed at high density. Therefore, they are useful as, for example, an information recording medium, an information device, and a method for producing the information recording medium for recording information satisfactorily and at high density using near-field light.

The invention claimed is:

1. An information recording medium comprising:

a substrate;

a recording layer which includes an array of recording regions within the recording layer, each of the recording regions having an island shape and including a recording material; and a first resonance enhancing film formed between the substrate and the recording layer, including being formed between the substrate and the recording regions within the recording layer, and between the substrate and portions of the recording layer that are between the recording regions, a second resonance enhancing film formed between the substrate and the first resonance enhancing film and configured to enhance the plasmon resonance; and an intermediate film formed between the first resonance enhancing film and the second resonance enhancing film, wherein the first resonance enhancing film is configured to enhance plasmon resonance and includes a material having a dielectric constant with a real part of which sign is negative, the second resonance enhancing film includes a material having a dielectric constant with a real part of which sign is negative, and the intermediate film includes a material having a dielectric constant with a real part of which sign is positive.

2. The information recording medium according to claim 1, wherein a thickness of the first resonance enhancing film is smaller than a thickness of the second resonance enhancing film.

3. The information recording medium according to claim 1, wherein a shape of each of the recording regions is a vertically long ellipsoidal shape with respect to an arrangement surface of the recording regions.

4. An information device comprising:
the information recording medium according to claim 1;
a light source; and
a near-field light generating element including a resonating section configured such that plasmon resonance occurs between the resonating section and the recording region, wherein
the resonating section causes the plasmon resonance when emission light from the light source is irradiated on the near-field light generating element,
the first resonance enhancing film enhances the plasmon resonance between the resonating section and the recording region, and
the resonating section generates near-field light and irradiates the near-field light on the recording region from the recording layer side.

5. The information device according to claim 4, wherein a material of a main component of the near-field light generating element is the same as a material of a main component of the first resonance enhancing film.

6. The information device according to claim 4, wherein an amplitude of a polarized component in a vertical direction of the near-field light is larger than an amplitude of a polarized component in a horizontal direction thereof with respect to an arrangement surface of the recording regions, and
information is recorded in the recording regions using at least a part of the near-field light generated from the resonating section.

7. The information device according to claim 6, further comprising:
a photodetector configured to detect reflected light from the near-field light generating element or transmitted light transmitted through the near-field light generating element; and
a reproducing unit configured to determine, on the basis of a detection signal from the photodetector, whether the recording region is in a recorded state or an unrecorded state, and reproduce information recorded in the recording region.

8. The information device according to claim 6, wherein an interval between the recording regions is equal to or smaller than a width of each of the recording regions.

9. The information device according to claim 6, wherein
the light source includes a two-wavelength light source configured to emit recording light having a first wavelength and reproduction light having a second wavelength different from the first wavelength, and
the near-field light generating element includes:
a near-field light generating element for recording corresponding to the first wavelength; and
a near-field light generating element for reproduction corresponding to the second wavelength.

10. The information device according to claim 9, wherein
a part or all of the recording region is formed of a recording material,
a main component of the recording material is a phase change recording material,
each of the recorded state and the unrecorded state of the recording region corresponds to one of amorphous and crystal, and
the second wavelength is shorter than the first wavelength.

11. The information device according to claim 9, wherein
a part or all of the recording region is formed of a recording material, and
a sign of a real part of a dielectric constant of the recording material in a recorded state is the same as a sign of a real part of a dielectric constant of the recording material in an unrecorded state with respect to the first wavelength.

12. The information device according to claim 9, wherein a length in a longitudinal direction of the near-field light generating element for recording is larger than a length in a longitudinal direction of the near-field light generating element for reproduction.

13. The information device according to claim 9, wherein the near-field light generating element for recording and the near-field light generating element for reproduction are arranged with rear surfaces thereof opposed to each other.

14. The information device according to claim 6, wherein
the light source includes a one-wavelength light source configured to emit recording light and reproduction light, and
the near-field light generating element includes:
a near-field light generating element for recording; and
a near-field light generating element for reproduction.

15. The information device according to claim 6, wherein
the light source includes a two-wavelength light source configured to emit recording light having a first wavelength and reproduction light having a second wavelength different from the first wavelength, and
the near-field light generating element functions as both the near-field light generating element for recording and the near-field light generating element for reproduction.

16. An information recording medium comprising:
a substrate;
a recording layer which includes an array of recording regions within the recording layer, each of the recording regions having an island shape and including a recording material;
a first resonance enhancing film formed between the substrate and the recording layer, including being formed between the substrate and the recording regions within the recording layer, and between the substrate and portions of the recording layer that are between the recording regions; and
a resonance control film arranged on an opposite side of the recording regions to the substrate, wherein
the first resonance enhancing film is configured to enhance plasmon resonance and includes a material having a dielectric constant with a real part of which sign is negative, and the resonance control film includes a material having a dielectric constant with a real part of which sign is negative , and
a thickness of the resonance control film is smaller than a thickness of the first resonance enhancing film.

* * * * *